(12) United States Patent
Chee

(10) Patent No.: US 12,498,378 B2
(45) Date of Patent: *Dec. 16, 2025

(54) METHODS FOR SPATIAL ANALYSIS OF PROTEINS AND RELATED KITS

(71) Applicant: Encodia, Inc., San Diego, CA (US)

(72) Inventor: Mark S. Chee, San Diego, CA (US)

(*) Notice: Subject to any disclaimer, the term of this patent is extended or adjusted under 35 U.S.C. 154(b) by 917 days.

This patent is subject to a terminal disclaimer.

(21) Appl. No.: 17/605,220

(22) PCT Filed: Apr. 17, 2020

(86) PCT No.: PCT/US2020/028831
§ 371 (c)(1),
(2) Date: Oct. 20, 2021

(87) PCT Pub. No.: WO2020/219365
PCT Pub. Date: Oct. 29, 2020

(65) Prior Publication Data
US 2022/0214353 A1 Jul. 7, 2022

Related U.S. Application Data

(60) Provisional application No. 62/850,274, filed on May 20, 2019, provisional application No. 62/837,721, filed on Apr. 23, 2019.

(51) Int. Cl.
| | | |
|---|---|---|
| *C12Q 1/68* | (2018.01) | |
| *C12Q 1/6804* | (2018.01) | |
| *C12Q 1/6841* | (2018.01) | |
| *G01N 33/68* | (2006.01) | |

(52) U.S. Cl.
CPC ....... *G01N 33/6803* (2013.01); *C12Q 1/6804* (2013.01); *C12Q 1/6841* (2013.01)

(58) Field of Classification Search
None
See application file for complete search history.

(56) References Cited

U.S. PATENT DOCUMENTS

| | | |
|---|---|---|
| 7,824,856 B2 | 11/2010 | Monforte |
| 9,371,598 B2 | 6/2016 | Chee |
| 9,879,313 B2 | 1/2018 | Chee |
| 10,774,372 B2 | 9/2020 | Chee |
| 10,774,374 B2 | 9/2020 | Frisén et al. |
| 2008/0305957 A1 | 12/2008 | Thisted et al. |
| 2009/0264300 A1 | 10/2009 | Franch et al. |
| 2014/0102915 A1 | 4/2014 | Hu et al. |
| 2015/0148239 A1 | 5/2015 | Peter et al. |
| 2016/0253584 A1 | 9/2016 | Fodor et al. |
| 2016/0265046 A1 | 9/2016 | Zhang et al. |
| 2018/0187183 A1 | 7/2018 | Zhang et al. |
| 2018/0201980 A1 | 7/2018 | Chee |
| 2018/0284125 A1 | 10/2018 | Gordon et al. |
| 2019/0145982 A1 | 5/2019 | Chee et al. |
| 2022/0235405 A1 | 7/2022 | Chee et al. |

FOREIGN PATENT DOCUMENTS

| | | | |
|---|---|---|---|
| CN | 102549427 A | 7/2012 | |
| WO | WO-2005/042759 A2 | 5/2005 | |
| WO | WO-2012/106385 | 8/2012 | |
| WO | WO-2014/210223 | 12/2014 | |
| WO | WO-2016/145416 | 9/2016 | |
| WO | WO-2017/192633 | 11/2017 | |
| WO | WO-2017192633 A1 * | 11/2017 | ............. C12N 15/10 |
| WO | 2018091676 A1 | 5/2018 | |
| WO | WO-2019/089836 A1 | 5/2019 | |
| WO | WO-2019/089846 A1 | 5/2019 | |
| WO | WO-2019/089851 A1 | 5/2019 | |
| WO | WO-2020/051162 | 3/2020 | |
| WO | WO-2020/236846 A1 | 11/2020 | |

OTHER PUBLICATIONS

Agasti et al., "Photocleavable DNA Barcode—Antibody Conjugates Allow Sensitive and Multiplexed Protein Analysis in Single Cells", Journal of the American Chemical Society (E-pub Nov. 2, 2012) 134(45):18499-18502.

Giedt et al., "Single-Cell Barcode Analysis Provides A Rapid Readout Of Cellular Signaling Pathways In Clinical Specimens," Nat Commun. (Oct. 31, 2018) 9(1):4550, 10 pages.

Namimatsu et al., "Reversing The Effects Of Formalin Fixation With Citraconic Anhydride And Heat: A Universal Antigen Retrieval Method," J Histochem Cytochem (Jan. 2005) 53(1):3-11.

Zane et al., "Versatile Interacting Peptide (VIP) Tags for Labeling Proteins with Bright Chemical Reporters," Chembiochem (Mar. 2, 2017, e-pub. Jan. 25, 2017) 18(5):470-474.

International Preliminary Report on Patentability for International application PCT/US2020/028831, dated Sep. 28, 2021, 6 pages.

International Search Report for International application PCT/US2020/028831, dated Jul. 28, 2020, 4 pages.

Written Opinion of The International Searching Authority for International application PCT/US2020/028831, dated Jul. 28, 2020, 5 pages.

(Continued)

*Primary Examiner* — Suryaprabha Chunduru
(74) *Attorney, Agent, or Firm* — DLA PIPER LLP (US); Dmitry Kryndushkin

(57) ABSTRACT

Provided herein are methods and compositions for spatial analysis of macromolecules (e.g., proteins, polypeptides, or peptides). In some embodiments, the methods are for analyzing a macromolecule or a plurality of macromolecules, (e.g., peptides, polypeptides, and proteins) including determining spatial information and sequencing the macromolecule. In some embodiments, the analysis employs barcoding and nucleic acid encoding of molecular recognition events, and/or detectable labels. Also provided are compositions, e.g., kits, containing components for performing the provided methods for analysis of the macromolecule.

18 Claims, 1 Drawing Sheet
Specification includes a Sequence Listing.

(56) References Cited

OTHER PUBLICATIONS

Crosetto N, Bienko M, van Oudenaarden A. Spatially resolved transcriptomics and beyond. Nat Rev Genet. Jan. 2015;16(1):57-66.
Vickovic et al., High-density spatial transcriptomics arrays for in situ tissue profiling; Feb. 28, 2019; doi: http://dx.doi.org/10.1101/563338.
Rodriques SG, Stickels RR, Goeva A, Martin CA, Murray E, Vanderburg CR, Welch J, Chen LM, Chen F, Macosko EZ. Slide-seq: A scalable technology for measuring genome-wide expression at high spatial resolution. Science. Mar. 29, 2019;363(6434):1463-1467.
Weinstein et al., DNA microscopy: Optics-free spatio-genetic imaging by a stand-alone chemical reaction; doi: https://doi.org/10.1101/471219; Nov. 19, 2018.
Goltsev, Y. et al. (Aug. 9, 2018). "Deep Profiling of Mouse Splenic Architecture with CODEX Multiplexed Imaging," Cell 174(4):968-981.e15, 30 pages.

* cited by examiner

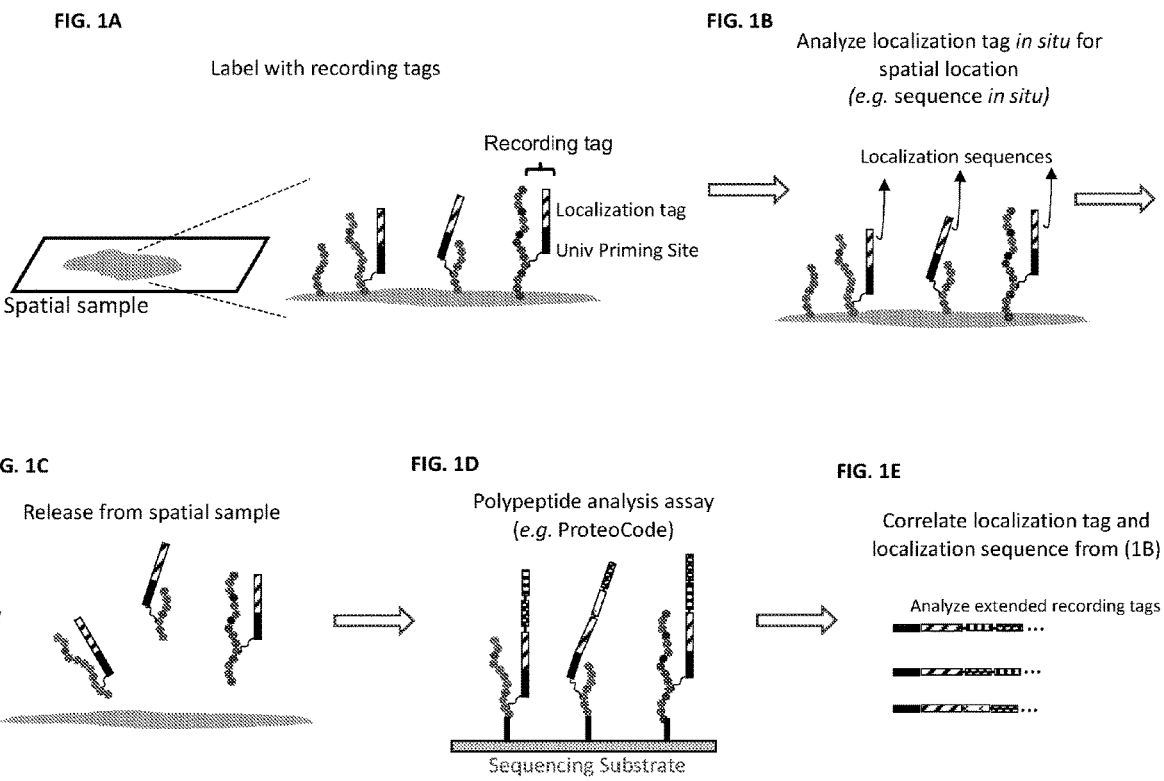

METHODS FOR SPATIAL ANALYSIS OF PROTEINS AND RELATED KITS

RELATED APPLICATIONS

The present application is a national stage application of International Patent Application Serial No. PCT/US2020/028831, filed on Apr. 17, 2020, entitled "METHODS FOR SPATIAL ANALYSIS OF PROTEINS AND RELATED KITS," which claims priority to U.S. provisional patent application No. 62/837,721, filed on Apr. 23, 2019, and U.S. provisional patent application No. 62/850,274, filed on May 20, 2019. The disclosures and contents of the above applications are incorporated by reference in their entireties for all purposes.

SEQUENCE LISTING ON ASCII TEXT

This patent or application file contains a Sequence Listing submitted in computer readable ASCII text format (file name: 4614-2001630_20211018_SeqList_ST25.txt, recorded: Oct. 18, 2021 Apr. 13, 2020, size: 700 bytes). The content of the Sequence Listing file is incorporated herein by reference in its entirety.

TECHNICAL FIELD

The present disclosure relates to method and compositions for spatial analysis of macromolecules (e.g., proteins, polypeptides, or peptides). In some embodiments, the methods are for analyzing a macromolecule or a plurality of macromolecules, (e.g., peptides, polypeptides, and proteins) including determining spatial information and sequencing the macromolecule. In some embodiments, the analysis employs barcoding and nucleic acid encoding of molecular recognition events, and/or detectable labels. Also provided are compositions, e.g., kits, containing components for performing the provided methods for analysis of the macromolecule.

BACKGROUND

Existing methods for identifying molecules from a sample while retaining information regarding its spatial origin (e.g., within a tissue sample) is limited. For example, the use of antibodies or target-specific reagents can be used to identify and visualize the location of a protein within a tissue sample, however, this approach is not appropriate to analyze a large number of unknown proteins within a sample. In some cases, imaging based approaches for large numbers of cells may lack the ability to provide information regarding the cellular features of the sample, such as cell types or phenotypes. Accordingly, there remains a need in the art for improved techniques relating to macromolecule (e.g., polypeptide or polynucleotide) analysis which provides spatial information. In some embodiments, there is a need for method of analyzing proteins that is highly-parallelized, accurate, sensitive, and/or high-throughput.

BRIEF SUMMARY

The summary is not intended to be used to limit the scope of the claimed subject matter. Other features, details, utilities, and advantages of the claimed subject matter will be apparent from the detailed description including those aspects disclosed in the accompanying drawings and in the appended claims.

Provided herein are methods for analyzing a polypeptide, e.g., a protein, comprising: (a) providing a polypeptide in a spatial sample with a recording tag comprising a localization tag; (b) analyzing the localization tag to generate a localization sequence comprising information of the spatial location of the polypeptide in the sample; (c) performing a polypeptide analysis assay on the polypeptide to generate an extended recording tag, wherein the polypeptide is associated with the recording tag; (d) determining the sequence of the extended recording tag and the sequence of the localization tag associated with the polypeptide; and (e) correlating the sequence of the localization tag determined in step (d) with the localization sequence generated in step (b); thereby associating information from the sequence of the extended recording tag determined in step (d) with the spatial location of the polypeptide in the sample. In some embodiments, the localization tag comprises a barcode. In some embodiments, the localization tag comprises a unique molecular identifier (UMI).

In some embodiments, a plurality of the polypeptides in a region of the spatial sample is provided with a recording tag. In some embodiments, the region of the spatial sample comprises one or more cells. In some embodiments, one or more polypeptides from one, some or each region of the spatial sample is labeled with localization tags that comprise the same barcode. In some cases, where multiple polypeptides are labeled from a region in the spatial sample, more than one polypeptide is labeled with the same barcode.

Provided herein are methods for analyzing a polypeptide, e.g., a protein, comprising (a) providing a protein in a spatial sample with a localization tag comprising a unique molecular identifier (UMI); (b) analyzing the localization tag to generate a localization sequence comprising information of the spatial location of the protein in the sample; (c) performing a protein analysis assay, wherein the protein is associated with a recording tag and the localization tag; (d) determining the sequence of the associated extended recording tag and localization tag; and (e) correlating the recording tag and the associated localization tag determined in step (d) with the information of the spatial location of the protein in the sample via the localization sequence generated in step (b); thereby determining the sequence of the protein and the spatial location of the protein in the spatial sample. In some embodiments, a localization tag comprising a UMI is used to achieve labeling on the single molecule level.

In one aspect, the polypeptides with attached recording tags are released from the spatial sample prior to the polypeptide analysis assay. In some of any such embodiments, the protein or polypeptide analysis assay includes one or more cycles of contacting the protein or polypeptide with a binding agent capable of binding to the protein or polypeptide, wherein the binding agent comprises a coding tag with identifying information regarding the binding agent; and transferring the information of the coding tag to the recording tag to generate an extended recording tag.

Also provided herein are kits and reagents for performing any of the methods for analyzing polypeptides, e.g., proteins, provided herein. In some embodiments, the kits comprise one or more of the following components: localization tag(s), reagent(s) for sequencing, recoding tag(s), reagent(s) for attaching the recording tag, reagent(s) for attaching the localization tag to protein(s), binding agent(s), reagent(s) for transferring identifying information from the coding tag to the recording tag, sequencing reagent(s), and/or solid support(s).

BRIEF DESCRIPTION OF THE DRAWINGS

Non-limiting embodiments of the present invention will be described by way of example with reference to the accompanying figures, which are schematic and are not intended to be drawn to scale. For purposes of illustration, not every component is labeled in every figure, nor is every component of each embodiment of the invention shown where illustration is not necessary to allow those of ordinary skill in the art to understand the invention.

FIG. 1A-1E is a schematic depicting an exemplary workflow for providing polypeptides in a tissue section with recording tags containing localization tags (DNA barcode) and steps for spatial analysis, followed by a polypeptide analysis assay.

DETAILED DESCRIPTION

Provided herein are methods and kits for analyzing a macromolecule or a plurality of macromolecules, e.g., peptides, polypeptides, and proteins including determining spatial information of the macromolecule. In some embodiments, the analysis employs barcoding and nucleic acid encoding of molecular recognition events, and/or detectable labels. In some embodiments, the method provides at least a partial sequence of the polypeptide or the protein in the spatial sample and information regarding its spatial location.

Provided herein are methods and kits for analyzing a polypeptide including steps: (a) providing a polypeptide in a spatial sample with a recording tag comprising a localization tag; (b) analyzing the localization tag to generate a localization sequence comprising information of the spatial location of the polypeptide in the sample; (c) performing a polypeptide analysis assay on the polypeptide to generate an extended recording tag, wherein the polypeptide is associated with the recording tag; (d) determining the sequence of the extended recording tag and the sequence of the localization tag associated with the polypeptide; and (e) correlating the sequence of the localization tag determined in step (d) with the localization sequence generated in step (b); thereby associating information from the sequence of the extended recording tag determined in step (d) with the spatial location of the polypeptide in the sample. In some embodiments, a plurality of the polypeptides in a region of the spatial sample is provided with a recording tag. In some embodiments, the region of the spatial sample comprises one or more cells. In some embodiments, a plurality of the polypeptides from one, some or each region of the spatial sample can be labeled with a localization tag comprising the same barcode. In some aspects, the localization tag is added to a recording tag attached to a polypeptide.

In some embodiments, the method for analyzing a polypeptide, e.g. a protein, comprises (a) providing a protein in a spatial sample with a localization tag comprising a unique molecular identifier (UMI); (b) analyzing the localization tag to generate a localization sequence comprising information of the spatial location of the protein in the sample; (c) performing a protein analysis assay, wherein the protein is associated with a recording tag and the localization tag; (d) determining the sequence of the associated extended recording tag and localization tag; and (e) correlating the recording tag and the associated localization tag determined in step (d) with the information of the spatial location of the protein in the sample via the localization sequence generated in step (b); thereby determining the sequence of the protein and the spatial location of the protein in the spatial sample. In some embodiments, the localization tag in step (a) may be added to a recording tag attached to the protein.

Current methods for identifying molecules from a sample while retaining information regarding its spatial origin (e.g., within a tissue sample) are limited. For example, the use of antibodies or target specific reagents can be used to identify and visualize the location of a protein within a tissue sample, however, this approach is not appropriate to analyze a large number of unknown proteins within a sample. In some cases, existing methods are not compatible with further downstream processing and analysis of the molecules from the sample while retaining spatial information. Accordingly, there remains a need in the art for improved techniques relating to macromolecule (e.g., polypeptide or polynucleotide) analysis which provides spatial information. In some embodiments, there is a need for proteomics technology that is highly-parallelized, accurate, sensitive, and/or high-throughput. In some embodiments, the provided methods for macromolecule preparation allow for sequencing and/or analysis that overcomes constraints to achieve highly-parallelized, accurate, sensitive, and/or high-throughput macromolecule (e.g., polypeptide or polynucleotide) sequencing and/or analysis while also providing spatial information.

In some embodiments, the present disclosure provides, in part, methods for analyzing macromolecules including obtaining spatial information related to the macromolecule to use with methods of highly-parallel, high throughput digital macromolecule (e.g., polypeptide) characterization and quantitation, with direct applications to protein and peptide characterization and sequencing. In some embodiments, the method provides spatial information (e.g., position) of one or more polypeptides in a spatial sample and the identity or a partial sequence of the polypeptide(s) analyzed.

Numerous specific details are set forth in the following description in order to provide a thorough understanding of the present disclosure. These details are provided for the purpose of example and the claimed subject matter may be practiced according to the claims without some or all of these specific details. It is to be understood that other embodiments can be used and structural changes can be made without departing from the scope of the claimed subject matter. It should be understood that the various features and functionality described in one or more of the individual embodiments are not limited in their applicability to the particular embodiment with which they are described. They instead can, be applied, alone or in some combination, to one or more of the other embodiments of the disclosure, whether or not such embodiments are described, and whether or not such features are presented as being a part of a described embodiment. For the purpose of clarity, technical material that is known in the technical fields related to the claimed subject matter has not been described in detail so that the claimed subject matter is not unnecessarily obscured.

All publications, including patent documents, scientific articles and databases, referred to in this application are incorporated by reference in their entireties for all purposes to the same extent as if each individual publication were individually incorporated by reference. Citation of the publications or documents is not intended as an admission that any of them is pertinent prior art, nor does it constitute any admission as to the contents or date of these publications or documents.

All headings are for the convenience of the reader and should not be used to limit the meaning of the text that follows the heading, unless so specified.

Definitions

Unless defined otherwise, all technical and scientific terms used herein have the same meaning as is commonly understood by one of ordinary skill in the art to which the present disclosure belongs. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, the singular forms "a," "an" and "the" include plural referents unless the context clearly dictates otherwise. Thus, for example, reference to "a peptide" includes one or more peptides, or mixtures of peptides. Also, and unless specifically stated or obvious from context, as used herein, the term "or" is understood to be inclusive and covers both "or" and "and".

The term "about" as used herein refers to the usual error range for the respective value readily known to the skilled person in this technical field. Reference to "about" a value or parameter herein includes (and describes) embodiments that are directed to that value or parameter per se. For example, description referring to "about X" includes description of "X.

As used herein, the term "macromolecule" encompasses large molecules composed of smaller subunits. Examples of macromolecules include, but are not limited to peptides, polypeptides, proteins, nucleic acids, carbohydrates, lipids, macrocycles. A macromolecule also includes a chimeric macromolecule composed of a combination of two or more types of macromolecules, covalently linked together (e.g., a peptide linked to a nucleic acid). A macromolecule may also include a "macromolecule assembly", which is composed of non-covalent complexes of two or more macromolecules. A macromolecule assembly may be composed of the same type of macromolecule (e.g., protein-protein) or of two more different types of macromolecules (e.g., protein-DNA).

As used herein, the term "polypeptide" encompasses peptides and proteins, and refers to a molecule comprising a chain of two or more amino acids joined by peptide bonds. In some embodiments, a polypeptide comprises 2 to 50 amino acids, e.g., having more than 20-30 amino acids. In some embodiments, a peptide does not comprise a secondary, tertiary, or higher structure. In some embodiments, the polypeptide is a protein. In some embodiments, a protein comprises 30 or more amino acids, e.g. having more than 50 amino acids. In some embodiments, in addition to a primary structure, a protein comprises a secondary, tertiary, or higher structure. The amino acids of the polypeptides are most typically L-amino acids, but may also be D-amino acids, modified amino acids, amino acid analogs, amino acid mimetics, or any combination thereof. Polypeptides may be naturally occurring, synthetically produced, or recombinantly expressed. Polypeptides may be synthetically produced, isolated, recombinantly expressed, or be produced by a combination of methodologies as described above. Polypeptides may also comprise additional groups modifying the amino acid chain, for example, functional groups added via post-translational modification. The polymer may be linear or branched, it may comprise modified amino acids, and it may be interrupted by non-amino acids. The term also encompasses an amino acid polymer that has been modified naturally or by intervention; for example, disulfide bond formation, glycosylation, lipidation, acetylation, phosphorylation, or any other manipulation or modification, such as conjugation with a labeling component.

As used herein, the term "amino acid" refers to an organic compound comprising an amine group, a carboxylic acid group, and a side-chain specific to each amino acid, which serve as a monomeric subunit of a peptide. An amino acid includes the 20 standard, naturally occurring or canonical amino acids as well as non-standard amino acids. The standard, naturally-occurring amino acids include Alanine (A or Ala), Cysteine (C or Cys), Aspartic Acid (D or Asp), Glutamic Acid (E or Glu), Phenylalanine (F or Phe), Glycine (G or Gly), Histidine (H or His), Isoleucine (I or Ile), Lysine (K or Lys), Leucine (L or Leu), Methionine (M or Met), Asparagine (N or Asn), Proline (P or Pro), Glutamine (Q or Gln), Arginine (R or Arg), Serine (S or Ser), Threonine (T or Thr), Valine (V or Val), Tryptophan (W or Trp), and Tyrosine (Y or Tyr). An amino acid may be an L-amino acid or a D-amino acid. Non-standard amino acids may be modified amino acids, amino acid analogs, amino acid mimetics, non-standard proteinogenic amino acids, or non-proteinogenic amino acids that occur naturally or are chemically synthesized. Examples of non-standard amino acids include, but are not limited to, selenocysteine, pyrrolysine, and N-formylmethionine, (3-amino acids, Homo-amino acids, Proline and Pyruvic acid derivatives, 3-substituted alanine derivatives, glycine derivatives, ring-substituted phenylalanine and tyrosine derivatives, linear core amino acids, N-methyl amino acids.

As used herein, the term "post-translational modification" refers to modifications that occur on a peptide after its translation by ribosomes is complete. A post-translational modification may be a covalent chemical modification or enzymatic modification. Examples of post-translation modifications include, but are not limited to, acylation, acetylation, alkylation (including methylation), biotinylation, butyrylation, carbamylation, carbonylation, deamidation, deiminiation, diphthamide formation, disulfide bridge formation, eliminylation, flavin attachment, formylation, gamma-carboxylation, glutamylation, glycylation, glycosylation, glypiation, heme C attachment, hydroxylation, hypusine formation, iodination, isoprenylation, lipidation, lipoylation, malonylation, methylation, myristolylation, oxidation, palmitoylation, pegylation, phosphopantetheinylation, phosphorylation, prenylation, propionylation, retinylidene Schiff base formation, S-glutathionylation, S-nitrosylation, S-sulfenylation, selenation, succinylation, sulfination, ubiquitination, and C-terminal amidation. A post-translational modification includes modifications of the amino terminus and/or the carboxyl terminus of a peptide. Modifications of the terminal amino group include, but are not limited to, des-amino, N-lower alkyl, N-di-lower alkyl, and N-acyl modifications. Modifications of the terminal carboxy group include, but are not limited to, amide, lower alkyl amide, dialkyl amide, and lower alkyl ester modifications (e.g., wherein lower alkyl is $C_1$-$C_4$ alkyl). A post-translational modification also includes modifications, such as but not limited to those described above, of amino acids falling between the amino and carboxy termini. The term post-translational modification can also include peptide modifications that include one or more detectable labels.

As used herein, the term "binding agent" refers to a nucleic acid molecule, a peptide, a polypeptide, a protein, carbohydrate, or a small molecule that binds to, associates, unites with, recognizes, or combines with a polypeptide or a component or feature of a polypeptide. A binding agent may form a covalent association or non-covalent association with the polypeptide or component or feature of a polypeptide. A binding agent may also be a chimeric binding agent, composed of two or more types of molecules, such as a nucleic acid molecule-peptide chimeric binding agent or a carbohydrate-peptide chimeric binding agent. A binding agent may be a naturally occurring, synthetically produced, or recombinantly expressed molecule. A binding agent may bind to a single monomer or subunit of a polypeptide (e.g., a single amino acid of a polypeptide) or bind to a plurality of linked subunits of a polypeptide (e.g., a di-peptide, tri-peptide, or higher order peptide of a longer peptide, polypeptide, or protein molecule). A binding agent may bind to a linear molecule or a molecule having a three-dimensional structure (also referred to as conformation). For example, an antibody binding agent may bind to linear peptide, polypeptide, or protein, or bind to a conformational peptide, polypeptide, or protein. A binding agent may bind to an N-terminal peptide, a C-terminal peptide, or an intervening peptide of a peptide, polypeptide, or protein molecule. A binding agent may bind to an N-terminal amino acid, C-terminal amino acid, or an intervening amino acid of a peptide molecule. A binding agent may bind to an N-terminal or C-terminal diamino acid moiety. A binding agent may preferably bind to a chemically modified or labeled amino acid (e.g., an amino acid that has been functionalized by a reagent comprising a compound of any one of Formula (I)-(VII) as described in International Patent Application No. PCT/US2018/58575) over a non-modified or unlabeled amino acid. For example, a binding agent may preferably bind to an amino acid that has been functionalized with an acetyl moiety, Cbz moiety, guanyl moiety, dansyl moiety, PTC moiety, DNP moiety, SNP moiety, diheterocyclic methanimine moiety, etc., over an amino acid that does not possess said moiety. A binding agent may bind to a post-translational modification of a peptide molecule. A binding agent may exhibit selective binding to a component or feature of a polypeptide (e.g., a binding agent may selectively bind to one of the 20 possible natural amino acid residues and with bind with very low affinity or not at all to the other 19 natural amino acid residues). A binding agent may exhibit less selective binding, where the binding agent is capable of binding a plurality of components or features of a polypeptide (e.g., a binding agent may bind with similar affinity to two or more different amino acid residues). A binding agent comprises a coding tag, which may be joined to the binding agent by a linker.

As used herein, the term "fluorophore" refers to a molecule which absorbs electromagnetic energy at one wavelength and re-emits energy at another wavelength. A fluorophore may be a molecule or part of a molecule including fluorescent dyes and proteins. Additionally, a fluorophore may be chemically, genetically, or otherwise connected or fused to another molecule to produce a molecule that has been "tagged" with the fluorophore.

As used herein, the term "linker" refers to one or more of a nucleotide, a nucleotide analog, an amino acid, a peptide, a polypeptide, or a non-nucleotide chemical moiety that is used to join two molecules. A linker may be used to join a binding agent with a coding tag, a recording tag with a polypeptide, a polypeptide with a solid support, a recording tag with a solid support, etc. In certain embodiments, a linker joins two molecules via enzymatic reaction or chemistry reaction (e.g., click chemistry).

The term "ligand" as used herein refers to any molecule or moiety connected to the compounds described herein. "Ligand" may refer to one or more ligands attached to a compound. In some embodiments, the ligand is a pendant group or binding site (e.g., the site to which the binding agent binds).

As used herein, the term "proteome" can include the entire set of proteins, polypeptides, or peptides (including conjugates or complexes thereof) expressed by a genome, cell, tissue, or organism at a certain time, of any organism. In one aspect, it is the set of expressed proteins in a given type of cell or organism, at a given time, under defined conditions. Proteomics is the study of the proteome. For example, a "cellular proteome" may include the collection of proteins found in a particular cell type under a particular set of environmental conditions, such as exposure to hormone stimulation. An organism's complete proteome may include the complete set of proteins from all of the various cellular proteomes. A proteome may also include the collection of proteins in certain sub-cellular biological systems. For example, all of the proteins in a virus can be called a viral proteome. As used herein, the term "proteome" include subsets of a proteome, including but not limited to a kinome; a secretome; a receptome (e.g., GPCRome); an immunoproteome; a nutriproteome; a proteome subset defined by a post-translational modification (e.g., phosphorylation, ubiquitination, methylation, acetylation, glycosylation, oxidation, lipidation, and/or nitrosylation), such as a phosphoproteome (e.g., phosphotyrosine-proteome, tyrosine-kinome, and tyrosine-phosphatome), a glycoproteome, etc.; a proteome subset associated with a tissue or organ, a developmental stage, or a physiological or pathological condition; a proteome subset associated a cellular process, such as cell cycle, differentiation (or de-differentiation), cell death, senescence, cell migration, transformation, or metastasis; or any combination thereof. As used herein, the term "proteomics" refers to analysis of the proteome within cells, tissues, and bodily fluids, and the corresponding spatial distribution of the proteome within the cell and within tissues. Additionally, proteomics studies include the dynamic state of the proteome, continually changing in time as a function of biology and defined biological or chemical stimuli.

The terminal amino acid at one end of the peptide chain that has a free amino group is referred to herein as the "N-terminal amino acid" (NTAA). The terminal amino acid at the other end of the chain that has a free carboxyl group is referred to herein as the "C-terminal amino acid" (CTAA). An N-terminal diamino acid may comprise the N-terminal amino acid and the penultimate N-terminal amino acid. A C-terminal diamino acid is similarly defined for the C-terminus. The amino acids making up a peptide may be numbered in order, with the peptide being "n" amino acids in length. As used herein, NTAA is considered the $n^{th}$ amino acid (also referred to herein as the "n NTAA"). Using this nomenclature, the next amino acid is the n-1 amino acid, then the n-2 amino acid, and so on down the length of the peptide from the N-terminal end to C-terminal end. In certain embodiments, an NTAA, CTAA, or both may be functionalized with a chemical moiety.

As used herein, the term "barcode" refers to a nucleic acid molecule of about 2 to about 30 bases (e.g., 2, 3, 4, 5, 6, 7, 8, 9, 10, 11, 12, 13, 14, 15, 16, 17, 18, 19, 20, 21, 22, 23, 24, 25, 26, 27, 28, 29 or 30 bases) providing a unique identifier tag or origin information for a polypeptide, a binding agent, a set of binding agents from a binding cycle, a sample polypeptides, a set of samples, polypeptides within a compartment (e.g., droplet, bead, or separated location), polypeptides within a set of compartments, a fraction of polypeptides, a set of polypeptide fractions, a spatial region or set of spatial regions, a library of polypeptides, or a library of binding agents. A barcode can be an artificial sequence or a naturally occurring sequence. In certain embodiments, each barcode within a population of barcodes is different. In other embodiments, a portion of barcodes in a population of barcodes is different, e.g., at least about 10%, 15%, 20%, 25%, 30%, 35%, 40%, 45%, 50%, 55%, 60%, 65%, 70%, 75%, 80%, 85%, 90%, 95%, 97%, or 99% of the barcodes in a population of barcodes is different. A population of barcodes may be randomly generated or non-randomly generated. In certain embodiments, a population of barcodes are error correcting barcodes. Barcodes can be used to computationally deconvolute the multiplexed sequencing data and identify sequence reads derived from an individual polypeptide, sample, library, etc. A barcode can also be used for deconvolution of a collection of polypeptides that have been distributed into small compartments for enhanced mapping. For example, rather than mapping a peptide back to the proteome, the peptide is mapped back to its originating protein molecule or protein complex.

A "sample barcode", also referred to as "sample tag" identifies from which sample a polypeptide derives.

As used herein, the term "coding tag" refers to a polynucleotide with any suitable length, e.g., a nucleic acid molecule of about 2 bases to about 100 bases, including any integer including 2 and 100 and in between, that comprises identifying information for its associated binding agent. A "coding tag" may also be made from a "sequenceable polymer" (see, e.g., Niu et al., 2013, Nat. Chem. 5:282-292; Roy et al., 2015, Nat. Commun. 6:7237; Lutz, 2015, Macromolecules 48:4759-4767; each of which are incorporated by reference in its entirety). A coding tag may comprise an encoder sequence, which is optionally flanked by one spacer on one side or optionally flanked by a spacer on each side. A coding tag may also be comprised of an optional UMI and/or an optional binding cycle-specific barcode. A coding tag may be single stranded or double stranded. A double stranded coding tag may comprise blunt ends, overhanging ends, or both. A coding tag may refer to the coding tag that is directly attached to a binding agent, to a complementary sequence hybridized to the coding tag directly attached to a binding agent (e.g., for double stranded coding tags), or to coding tag information present in an extended recording tag. In certain embodiments, a coding tag may further comprise a binding cycle specific spacer or barcode, a unique molecular identifier, a universal priming site, or any combination thereof.

As used herein, the term "encoder sequence" or "encoder barcode" refers to a nucleic acid molecule of about 2 bases to about 30 bases (e.g., 2, 3, 4, 5, 6, 7, 8, 9, 10, 11, 12, 13, 14, 15, 16, 17, 18, 19, 20, 21, 22, 23, 24, 25, 26, 27, 28, 29 or 30 bases) in length that provides identifying information for its associated binding agent. The encoder sequence may uniquely identify its associated binding agent. In certain embodiments, an encoder sequence is provides identifying information for its associated binding agent and for the binding cycle in which the binding agent is used. In other embodiments, an encoder sequence is combined with a separate binding cycle-specific barcode within a coding tag. Alternatively, the encoder sequence may identify its associated binding agent as belonging to a member of a set of two or more different binding agents. In some embodiments, this level of identification is sufficient for the purposes of analysis. For example, in some embodiments involving a binding agent that binds to an amino acid, it may be sufficient to know that a peptide comprises one of two possible amino acids at a particular position, rather than definitively identify the amino acid residue at that position. In another example, a common encoder sequence is used for polyclonal antibodies, which comprises a mixture of antibodies that recognize more than one epitope of a protein target, and have varying specificities. In other embodiments, where an encoder sequence identifies a set of possible binding agents, a sequential decoding approach can be used to produce unique identification of each binding agent. This is accomplished by varying encoder sequences for a given binding agent in repeated cycles of binding (see, Gunderson et al., 2004, Genome Res. 14:870-7). The partially identifying coding tag information from each binding cycle, when combined with coding information from other cycles, produces a unique identifier for the binding agent, e.g., the particular combination of coding tags rather than an individual coding tag (or encoder sequence) provides the uniquely identifying information for the binding agent. Preferably, the encoder sequences within a library of binding agents possess the same or a similar number of bases.

As used herein the term "binding cycle specific tag", "binding cycle specific barcode", or "binding cycle specific sequence" refers to a unique sequence used to identify a library of binding agents used within a particular binding cycle. A binding cycle specific tag may comprise about 2 bases to about 8 bases (e.g., 2, 3, 4, 5, 6, 7, or 8 bases) in length. A binding cycle specific tag may be incorporated within a binding agent's coding tag as part of a spacer sequence, part of an encoder sequence, part of a UMI, or as a separate component within the coding tag.

As used herein, the term "spacer" (Sp) refers to a nucleic acid molecule of about 1 base to about 20 bases (e.g., 1, 2, 3, 4, 5, 6, 7, 8, 9, 10, 11, 12, 13, 14, 15, 16, 17, 18, 19, or 20 bases) in length that is present on a terminus of a recording tag or coding tag. In certain embodiments, a spacer sequence flanks an encoder sequence of a coding tag on one end or both ends. Following binding of a binding agent to a polypeptide, annealing between complementary spacer sequences on their associated coding tag and recording tag, respectively, allows transfer of binding information through a primer extension reaction or ligation to the recording tag, coding tag, or a di-tag construct. Sp' refers to spacer sequence complementary to Sp. Preferably, spacer sequences within a library of binding agents possess the same number of bases. A common (shared or identical) spacer may be used in a library of binding agents. A spacer sequence may have a "cycle specific" sequence in order to track binding agents used in a particular binding cycle. The spacer sequence (Sp) can be constant across all binding cycles, be specific for a particular class of polypeptides, or be binding cycle number specific. Polypeptide class-specific spacers permit annealing of a cognate binding agent's coding tag information present in an extended recording tag from a completed binding/extension cycle to the coding tag of another binding agent recognizing the same class of polypeptides in a subsequent binding cycle via the class-specific spacers. Only the sequential binding of correct cognate pairs results in interacting spacer elements and effective primer extension. A spacer sequence may comprise sufficient number of bases to anneal to a complementary spacer sequence in a recording tag to initiate a primer extension (also referred to as polymerase extension) reaction, or provide a "splint" for a ligation reaction, or mediate a "sticky end" ligation reaction. A spacer sequence may comprise a fewer number of bases than the encoder sequence within a coding tag.

As used herein, the term "recording tag" refers to a moiety, e.g., a chemical coupling moiety, a nucleic acid molecule, or a sequenceable polymer molecule (see, e.g., Niu et al., 2013, Nat. Chem. 5:282-292; Roy et al., 2015, Nat. Commun. 6:7237; Lutz, 2015, Macromolecules 48:4759-4767; each of which are incorporated by reference in its entirety) to which identifying information of a coding tag can be transferred, or from which identifying information about the macromolecule (e.g., UMI information) associated with the recording tag can be transferred to the coding tag. Identifying information can comprise any information characterizing a molecule such as information pertaining to sample, fraction, partition, spatial location, interacting neighboring molecule(s), cycle number, etc. Additionally, the presence of UMI information can also be classified as identifying information. In certain embodiments, after a binding agent binds a polypeptide, information from a coding tag linked to a binding agent can be transferred to the recording tag associated with the polypeptide while the binding agent is bound to the polypeptide. In other embodiments, after a binding agent binds a polypeptide, information from a recording tag associated with the polypeptide can be transferred to the coding tag linked to the binding agent while the binding agent is bound to the polypeptide. A recoding tag may be directly linked to a polypeptide, linked to a polypeptide via a multifunctional linker, or associated with a polypeptide by virtue of its proximity (or co-localization) on a solid support. A recording tag may be linked via its 5' end or 3' end or at an internal site, as long as the linkage is compatible with the method used to transfer coding tag information to the recording tag or vice versa. A recording tag may further comprise other functional components, e.g., a universal priming site, unique molecular identifier, a barcode (e.g., a sample barcode, a fraction barcode, spatial barcode, a compartment tag, etc.), a spacer sequence that is complementary to a spacer sequence of a coding tag, or any combination thereof. The spacer sequence of a recording tag is preferably at the 3'-end of the recording tag in embodiments where polymerase extension is used to transfer coding tag information to the recording tag.

As used herein, the term "primer extension", also referred to as "polymerase extension", refers to a reaction catalyzed by a nucleic acid polymerase (e.g., DNA polymerase) whereby a nucleic acid molecule (e.g., oligonucleotide primer, spacer sequence) that anneals to a complementary strand is extended by the polymerase, using the complementary strand as template.

As used herein, the term "unique molecular identifier" or "UMI" refers to a nucleic acid molecule of about 3 to about 40 bases (3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 bases in length providing a unique identifier tag for each polypeptide or binding agent to which the UMI is linked. A polypeptide UMI can be used to computationally deconvolute sequencing data from a plurality of extended recording tags to identify extended recording tags that originated from an individual polypeptide. A polypeptide UMI can be used to accurately count originating polypeptide molecules by collapsing NGS reads to unique UMIs. A binding agent UMI can be used to identify each individual molecular binding agent that binds to a particular polypeptide. For example, a UMI can be used to identify the number of individual binding events for a binding agent specific for a single amino acid that occurs for a particular peptide molecule. It is understood that when UMI and barcode are both referenced in the context of a binding agent or polypeptide, that the barcode refers to identifying information other that the UMI for the individual binding agent or polypeptide (e.g., sample barcode, compartment barcode, binding cycle barcode).

As used herein, the term "universal priming site" or "universal primer" or "universal priming sequence" refers to a nucleic acid molecule, which may be used for library amplification and/or for sequencing reactions. A universal priming site may include, but is not limited to, a priming site (primer sequence) for PCR amplification, flow cell adaptor sequences that anneal to complementary oligonucleotides on flow cell surfaces enabling bridge amplification in some next generation sequencing platforms, a sequencing priming site, or a combination thereof. Universal priming sites can be used for other types of amplification, including those commonly used in conjunction with next generation digital sequencing. For example, extended recording tag molecules may be circularized and a universal priming site used for rolling circle amplification to form DNA nanoballs that can be used as sequencing templates (Drmanac et al., 2009, Science 327:78-81). Alternatively, recording tag molecules may be circularized and sequenced directly by polymerase extension from universal priming sites (Korlach et al., 2008, Proc. Natl. Acad. Sci. 105:1176-1181). The term "forward" when used in context with a "universal priming site" or "universal primer" may also be referred to as "5" or "sense". The term "reverse" when used in context with a "universal priming site" or "universal primer" may also be referred to as "3'" or "antisense".

As used herein, the term "extended recording tag" refers to a recording tag to which information of at least one binding agent's coding tag (or its complementary sequence) has been transferred following binding of the binding agent to a polypeptide. Information of the coding tag may be transferred to the recording tag directly (e.g., ligation) or indirectly (e.g., primer extension). Information of a coding tag may be transferred to the recording tag enzymatically or chemically. An extended recording tag may comprise binding agent information of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 45, 50, 55, 60, 65, 70, 75, 80, 85, 90, 95, 100, 125, 150, 175, 200 or more coding tags. The base sequence of an extended recording tag may reflect the temporal and sequential order of binding of the binding agents identified by their coding tags, may reflect a partial sequential order of binding of the binding agents identified by the coding tags, or may not reflect any order of binding of the binding agents identified by the coding tags. In certain embodiments, the coding tag information present in the extended recording tag represents with at least 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99%, or 100% identity the polypeptide sequence being analyzed. In certain embodiments where the extended recording tag does not represent the polypeptide sequence being analyzed with 100% identity, errors may be due to off-target binding by a binding agent, or to a "missed" binding cycle (e.g., because a binding agent fails to bind to a polypeptide during a binding cycle, because of a failed primer extension reaction), or both.

As used herein, the term "extended coding tag" refers to a coding tag to which information of at least one recording tag (or its complementary sequence) has been transferred following binding of a binding agent, to which the coding tag is joined, to a polypeptide, to which the recording tag is associated. Information of a recording tag may be transferred to the coding tag directly (e.g., ligation), or indirectly (e.g., primer extension). Information of a recording tag may be transferred enzymatically or chemically. In certain embodiments, an extended coding tag comprises information of one recording tag, reflecting one binding event. As used herein, the term "di-tag" or "di-tag construct" or "di-tag molecule" refers to a nucleic acid molecule to which information of at least one recording tag (or its complementary sequence) and at least one coding tag (or its complementary sequence) has been transferred following binding of a binding agent, to which the coding tag is joined, to a polypeptide, to which the recording tag is associated (see, e.g., FIG. 11B of International Patent Publication No. WO 2017/192633). Information of a recording tag and coding tag may be transferred to the di-tag indirectly (e.g., primer extension). Information of a recording tag may be transferred enzymatically or chemically. In certain embodiments, a di-tag comprises a UMI of a recording tag, a compartment tag of a recording tag, a universal priming site of a recording tag, a UMI of a coding tag, an encoder sequence of a coding tag, a binding cycle specific barcode, a universal priming site of a coding tag, or any combination thereof.

As used herein, the term "solid support", "solid surface", or "solid substrate", or "sequencing substrate", or "substrate" refers to any solid material, including porous and non-porous materials, to which a polypeptide can be associated directly or indirectly, by any means known in the art, including covalent and non-covalent interactions, or any combination thereof. A solid support may be two-dimensional (e.g., planar surface) or three-dimensional (e.g., gel matrix or bead). A solid support can be any support surface including, but not limited to, a bead, a microbead, an array, a glass surface, a silicon surface, a plastic surface, a filter, a membrane, nylon, a silicon wafer chip, a flow through chip, a flow cell, a biochip including signal transducing electronics, a channel, a microtiter well, an ELISA plate, a spinning interferometry disc, a nitrocellulose membrane, a nitrocellulose-based polymer surface, a polymer matrix, a nanoparticle, or a microsphere. Materials for a solid support include but are not limited to acrylamide, agarose, cellulose, nitrocellulose, glass, gold, quartz, polystyrene, polyethylene vinyl acetate, polypropylene, polymethacrylate, polyethylene, polyethylene oxide, polysilicates, polycarbonates, Teflon, fluorocarbons, nylon, silicon rubber, polyanhydrides, polyglycolic acid, polyactic acid, polyorthoesters, functionalized silane, polypropylfumerate, collagen, glycosaminoglycans, polyamino acids, dextran, or any combination thereof. Solid supports further include thin film, membrane, bottles, dishes, fibers, woven fibers, shaped polymers such as tubes, particles, beads, microspheres, microparticles, or any combination thereof. For example, when solid surface is a bead, the bead can include, but is not limited to, a ceramic bead, polystyrene bead, a polymer bead, a methylstyrene bead, an agarose bead, an acrylamide bead, a solid core bead, a porous bead, a paramagnetic bead, a glass bead, or a controlled pore bead. A bead may be spherical or an irregularly shaped. A bead or support may be porous. A bead's size may range from nanometers, e.g., 100 nm, to millimeters, e.g., 1 mm. In certain embodiments, beads range in size from about 0.2 micron to about 200 microns, or from about 0.5 micron to about 5 micron. In some embodiments, beads can be about 1, 1.5, 2, 2.5, 2.8, 3, 3.5, 4, 4.5, 5, 5.5, 6, 6.5, 7, 7.5, 8, 8.5, 9, 9.5, 10, 10.5, 15, or 20 µm in diameter. In certain embodiments, "a bead" solid support may refer to an individual bead or a plurality of beads. In some embodiments, the solid surface is a nanoparticle. In certain embodiments, the nanoparticles range in size from about 1 nm to about 500 nm in diameter, for example, between about 1 nm and about 20 nm, between about 1 nm and about 50 nm, between about 1 nm and about 100 nm, between about 10 nm and about 50 nm, between about 10 nm and about 100 nm, between about 10 nm and about 200 nm, between about 50 nm and about 100 nm, between about 50 nm and about 150, between about 50 nm and about 200 nm, between about 100 nm and about 200 nm, or between about 200 nm and about 500 nm in diameter. In some embodiments, the nanoparticles can be about 10 nm, about 50 nm, about 100 nm, about 150 nm, about 200 nm, about 300 nm, or about 500 nm in diameter. In some embodiments, the nanoparticles are less than about 200 nm in diameter.

As used herein, the term "nucleic acid molecule" or "polynucleotide" refers to a single- or double-stranded polynucleotide containing deoxyribonucleotides or ribonucleotides that are linked by 3'-5' phosphodiester bonds, as well as polynucleotide analogs. A nucleic acid molecule includes, but is not limited to, DNA, RNA, and cDNA. A polynucleotide analog may possess a backbone other than a standard phosphodiester linkage found in natural polynucleotides and, optionally, a modified sugar moiety or moieties other than ribose or deoxyribose. Polynucleotide analogs contain bases capable of hydrogen bonding by Watson-Crick base pairing to standard polynucleotide bases, where the analog backbone presents the bases in a manner to permit such hydrogen bonding in a sequence-specific fashion between the oligonucleotide analog molecule and bases in a standard polynucleotide. Examples of polynucleotide analogs include, but are not limited to xeno nucleic acid (XNA), bridged nucleic acid (BNA), glycol nucleic acid (GNA), peptide nucleic acids (PNAs), γPNAs, morpholino polynucleotides, locked nucleic acids (LNAs), threose nucleic acid (TNA), 2'-O-Methyl polynucleotides, 2'-O-alkyl ribosyl substituted polynucleotides, phosphorothioate polynucleotides, and boronophosphate polynucleotides. A polynucleotide analog may possess purine or pyrimidine analogs, including for example, 7-deaza purine analogs, 8-halopurine analogs, 5-halopyrimidine analogs, or universal base analogs that can pair with any base, including hypoxanthine, nitroazoles, isocarbostyril analogues, azole carboxamides, and aromatic triazole analogues, or base analogs with additional functionality, such as a biotin moiety for affinity binding. In some embodiments, the nucleic acid molecule or oligonucleotide is a modified oligonucleotide. In some embodiments, the nucleic acid molecule or oligonucleotide is a DNA with pseudo-complementary bases, a DNA with protected bases, an RNA molecule, a BNA molecule, an XNA molecule, a LNA molecule, a PNA molecule, a γPNA molecule, or a morpholino DNA, or a combination thereof. In some embodiments, the nucleic acid molecule or oligonucleotide is backbone modified, sugar modified, or nucleobase modified. In some embodiments, the nucleic acid molecule or oligonucleotide has nucleobase protecting groups such as Alloc, electrophilic protecting groups such as thiranes, acetyl protecting groups, nitrobenzyl protecting groups, sulfonate protecting groups, or traditional base-labile protecting groups.

As used herein, "nucleic acid sequencing" means the determination of the order of nucleotides in a nucleic acid molecule or a sample of nucleic acid molecules.

As used herein, "next generation sequencing" refers to high-throughput sequencing methods that allow the sequencing of millions to billions of molecules in parallel. Examples of next generation sequencing methods include sequencing by synthesis, sequencing by ligation, sequencing by hybridization, polony sequencing, ion semiconductor sequencing, and pyrosequencing. By attaching primers to a solid substrate and a complementary sequence to a nucleic acid molecule, a nucleic acid molecule can be hybridized to the solid substrate via the primer and then multiple copies can be generated in a discrete area on the solid substrate by using polymerase to amplify (these groupings are sometimes referred to as polymerase colonies or polonies). Consequently, during the sequencing process, a nucleotide at a particular position can be sequenced multiple times (e.g., hundreds or thousands of times)—this depth of coverage is referred to as "deep sequencing." Examples of high throughput nucleic acid sequencing technology include platforms provided by Illumina, BGI, Qiagen, Thermo-Fisher, and Roche, including formats such as parallel bead arrays, sequencing by synthesis, sequencing by ligation, capillary electrophoresis, electronic microchips, "biochips," microarrays, parallel microchips, and single-molecule arrays, as reviewed by Service (*Science* 311:1544-1546, 2006).

As used herein, "single molecule sequencing" or "third generation sequencing" refers to next-generation sequencing methods wherein reads from single molecule sequencing instruments are generated by sequencing of a single molecule of DNA. Unlike next generation sequencing methods that rely on amplification to clone many DNA molecules in parallel for sequencing in a phased approach, single molecule sequencing interrogates single molecules of DNA and does not require amplification or synchronization. Single molecule sequencing includes methods that need to pause the sequencing reaction after each base incorporation ('wash-and-scan' cycle) and methods which do not need to halt between read steps. Examples of single molecule sequencing methods include single molecule real-time sequencing (Pacific Biosciences), nanopore-based sequencing (Oxford Nanopore), duplex interrupted nanopore sequencing, and direct imaging of DNA using advanced microscopy.

As used herein, "analyzing" the polypeptide means to identify, quantify, characterize, distinguish, or a combination thereof, all or a portion of the components of the polypeptide. For example, analyzing a peptide, polypeptide, or protein includes determining all or a portion of the amino acid sequence (contiguous or non-continuous) of the peptide. Analyzing a polypeptide also includes partial identification of a component of the polypeptide. For example, partial identification of amino acids in the polypeptide protein sequence can identify an amino acid in the protein as belonging to a subset of possible amino acids. Analysis typically begins with analysis of the n NTAA, and then proceeds to the next amino acid of the peptide (i.e., n-1, n-2, n-3, and so forth). This is accomplished by elimination of the n NTAA, thereby converting the n-1 amino acid of the peptide to an N-terminal amino acid (referred to herein as the "n-1 NTAA"). Analyzing the peptide may also include determining the presence and frequency of post-translational modifications on the peptide, which may or may not include information regarding the sequential order of the post-translational modifications on the peptide. Analyzing the peptide may also include determining the presence and frequency of epitopes in the peptide, which may or may not include information regarding the sequential order or location of the epitopes within the peptide. Analyzing the peptide may include combining different types of analysis, for example obtaining epitope information, amino acid sequence information, post-translational modification information, or any combination thereof.

It is understood that aspects and embodiments of the invention described herein include "consisting" and/or "consisting essentially of" aspects and embodiments.

Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Other objects, advantages and features of the present invention will become apparent from the following specification taken in conjunction with the accompanying drawings.

I. METHOD OF ANALYZING PROTEINS IN A SPATIAL SAMPLE

Provided herein are methods for analyzing a polypeptide, e.g., a protein, comprising (a) providing a polypeptide in a spatial sample with a recording tag comprising a localization tag; (b) analyzing the localization tag to generate a localization sequence comprising information of the spatial location of the polypeptide in the sample; (c) performing a polypeptide analysis assay on the polypeptide to generate an extended recording tag, wherein the polypeptide is associated with the recording tag; (d) determining the sequence of the extended recording tag and the sequence of the localization tag associated with the polypeptide; and (e) correlating the sequence of the localization tag determined in step (d) with the localization sequence generated in step (b); thereby associating information from the sequence of the extended recording tag determined in step (d) with the spatial location of the polypeptide in the sample. In some embodiments, the localization tag comprises a barcode. In some embodiments, the localization tag comprises a unique molecular identifier (UMI). In some embodiments, a plurality of the polypeptides in a region of the spatial sample is provided with a recording tag. A plurality of polypeptides within a region of the spatial sample may be labeled with the same localization tag. In some embodiments, the provided methods allow for multiplexing and is useful for analyzing a plurality of polypeptides simultaneously. In some aspects, the method is used to determine at least a partial sequence of the polypeptide and the spatial location of the polypeptide in the spatial sample. In some examples, the method is used to determine at least a partial sequence(s) of a plurality of polypeptides in a spatial sample and the spatial location(s) of a plurality of polypeptides in the spatial sample.

Provided herein are methods for analyzing a polypeptide (e.g. protein) comprising steps: (a) providing a polypeptide, e.g., a protein in a spatial sample with a localization tag comprising a barcode or unique molecular identifier (UMI); (b) analyzing the localization tag to generate a localization sequence comprising information of the spatial location of the protein in the sample; (c) performing a protein analysis assay, wherein the protein is associated with a recording tag and the localization tag; (d) determining the sequence of the associated recording tag and the localization tag, both of which associated with or released from the same protein; and (e) correlating the recording tag and the associated localization tag determined in step (d) with the information of the spatial location of the protein in the sample via the localization sequence generated in step (b); thereby determining at least a partial sequence of the protein and the spatial location of the protein in the spatial sample. In some embodiments, in step (a), a plurality of polypeptides from a region of the spatial sample is labeled with a recording tag comprising a localization tag, wherein a plurality of polypeptides from the same region is labeled with localization tags with the same barcode. In some embodiments, a localization tag comprising a UMI is used for labeling on the single molecule level.

In some embodiments, the region of the spatial sample comprises one or more cells. In some embodiments, one or more polypeptides from one, some or each region of the spatial sample is labeled with localization tags comprising the same barcode. A region of the spatial sample may refer to a contiguous region of the spatial sample. In some embodiments, a region of the spatial sample is an anatomical or morphological region, which may have some boundaries defined by cellular features or tissue features. In some aspects, a region of the spatial sample can refer to one cell or one cluster of cells. In some aspects, a region of the spatial sample can refer to one subcellular compartment or an organelle. In some cases, the region of the spatial sample is contained within a structure (e.g., a membrane). In some embodiments, information regarding polypeptides within or across regions of the spatial sample may provide information regarding ligand-receptor pairs across neighboring cells.

In some embodiments, the protein (e.g., polypeptide) analysis assay of step (c) comprises contacting the protein with a binding agent capable of binding to the protein, wherein the binding agent comprises a coding tag with identifying information regarding the binding agent; and transferring the information of the coding tag to the recording tag to generate an extended recording tag. In some embodiments, the binding agent is configured to bind to or is capable of binding to a terminal amino acid of a polypeptide. In some embodiments, the protein analysis assay of step (c) comprises multiple cycles of contacting the protein with a binding agent capable of binding to the protein, wherein the binding agent comprises a coding tag with identifying information regarding the binding agent; and transferring the information of the coding tag to the recording tag to generate an extended recording tag.

In some embodiments, step (a) is performed prior to step (b); step (a) is performed prior to step (c); step (a) is performed prior to step (d); step (a) is performed prior to step (e); step (b) is performed prior to step (c); step (b) is performed prior to step (d); step (b) is performed prior to step (e); step (c) is simultaneously with, prior to, or after steps (a) and/or step (b); step (d) is performed after step (c); step (d) is simultaneously with, prior to, or after steps (a) and/or step (b); step (e) is performed after steps (a), (b), (c), and/or (d). In some embodiments, step (c) is performed prior to step (b). In some embodiments, step (d) is performed prior to step (b). In some embodiments, steps (a), (b), (c), (d), and (e) occur in sequential order.

In some embodiments, the polypeptide analysis assay of step (c) is performed after the polypeptides are released from the spatial sample. In some examples, the polypeptides released from the spatial sample are attached to a recording tag. The recording tag attached to each released polypeptide may comprise a localization tag. In some cases, step (a) includes attaching a localization tag comprising a barcode to the recording tag attached to the polypeptide. In some embodiments, step (b) including analyzing the localization tag to generate a localization sequence is performed in situ, and the polypeptide analysis assay of step (c) is not performed in situ. In some embodiments, step (d) is performed after the polypeptides are released from the spatial sample. In some embodiments, step (d) is performed on polypeptides released from the spatial sample with extended recording tags attached.

In some embodiments, the polypeptide analysis assay of step (c) is performed in situ. In these cases, the polypeptide analysis assay of step (c) may be performed prior to performing step (b).

In some embodiments, the analysis methods comprise determining the sequence of at least a portion of the proteins (e.g., polypeptide or peptides). In some cases, the analysis method may include performing any of the methods as described in International Patent Publication Nos. WO 2017/192633, WO 2019/089836, WO 2019/089846, or WO 2019/089851. In some cases, the sequence of a polypeptide is analyzed by construction of an extended nucleic acid sequence which represents the polypeptide sequence or a portion thereof, such as an extended nucleic acid onto the recording tag (or any additional barcodes or tags attached thereto).

An exemplary workflow may include the following: a spatial sample is provided on a solid support. In step (a), the polypeptides in a plurality of spatial regions of the spatial sample are labeled with recording tags. Each of the recording tags contains one or more localization tags, wherein the localization tags comprise a barcode. The recording tags also include a universal priming site that is useful for later amplification. In some cases, a plurality of polypeptides within each region is labeled with the same barcode. In step (b), the localization tags are analyzed to generate a localization sequence comprising information of the spatial location of the polypeptide in the sample. After the localization sequence is generated, the polypeptides and attached recording tags are released from the spatial sample. In an optional step, the polypeptides are digested. Prior to performing the polypeptide analysis assay, the polypeptides and associated recording tags (comprising localization tags) can be immobilized randomly on a single molecule sequencing substrate (e.g., beads) at an appropriate intramolecular spacing. In step (c), a polypeptide analysis assay is performed on the polypeptides associated with the recording tag. In step (d), at least a portion of the sequence of the extended recording tag (and the localization tag comprised therein) is determined. In step (e) the sequence of localization tag determined in step (d) is correlated with the localization sequence generated in step (b); thereby associating information from the sequence of the recording tag determined in step (d) with the spatial location of the polypeptide in the sample. Using this exemplary workflow, the identity or partial sequence of the polypeptide is associated with spatial location of the polypeptide in the spatial sample where it is originated.

A. Spatial Samples

In some embodiments, the macromolecules (e.g., proteins or peptides) are obtained from a spatial sample that is a biological sample. For example, the sample may be isolated from an individual. In some embodiments, the sample comprises but is not limited to, mammalian cells, yeast cells, and/or bacterial cells. In some embodiments, the sample contains cells that are from a sample obtained from a multicellular organism. In some embodiments, the sample comprises multiple cell types, or comprise multiple subcellular components within each cell. The spatial sample may refer to the spatial arrangement or location of anatomical components, cells or subcellular components, or macromolecules, within the sample.

In some embodiments, the sample is a tissue sample. A tissue can be prepared in any convenient or desired way for its use in a method or with a kit or composition described herein. Fresh, frozen, fixed or unfixed tissues can be used. A tissue can be prepared, fixed or embedded using methods described herein or known in the art (See e.g., Fischer et al., CSH Protoc (2008) pdb prot4991; Fischer et al., CSH Protoc (2008) pdb top36; Fischer et al., CSH Protoc. (2008) pdb-.prot4988). The tissue can be freshly excised from an organism or it may have been previously preserved for example by freezing, embedding in a material such as paraffin (e.g. formalin fixed paraffin embedded samples), formalin fixation, infiltration, dehydration or the like. In some examples, a matrix-forming material can be used to encapsulate a biological sample, such as a tissue sample. In some cases, the sample is embedded in a paraffin block. Optionally, a tissue section can be attached to a solid support, for example, using techniques and compositions exemplified herein with regard to attaching nucleic acids, cells, viruses, beads or the like to a solid support. As a further option, a tissue can be permeabilized and the cells of the tissue lysed when the tissue is in contact with a solid support (See e.g., Ramos-Vera et al., J Vet Diagn Invest. (2008) 20(4):393-413). Standard conditions and reagents may be used for tissue permeabilization including incubation with any suitable detergents, e.g., Triton X-100, ethoxylated nonylphenol (Tergitol-type NP-40), Tween 20, Saponin, Digitonin, or acetone (Fischer et al., CSH Protoc (2008) pdb top36).

The spatial sample may refer to a biological sample arranged such that constituents, portions, or regions of the sample may be referenced spatially (e.g. arranged in a planar format such as a tissue section on a slide). In some embodiments, the sample is a "planar sample" that is substantially planar, i.e., two dimensional. In some embodiments, a sample is deposited in a substrate or deposited on a solid surface. In some embodiments, the sample is a three dimensional sample. In some examples, a material or substrate (e.g. glass, metal, ceramics, organic polymer surface or gel) may contain cells or any combination of biomolecules derived from cells, such as proteins, nucleic acids, lipids, oligo/polysaccharides, biomolecule complexes, cellular organelles, extracellular vesicles (exosomes, micro vesicles), cellular debris or excretions. In some embodiments, the planar cellular sample can be made by, e.g., depositing cells on a planar surface, e.g., by centrifugation, by cutting a three dimensional object that contains cells into sections and mounting the sections onto a planar surface, i.e., producing a tissue section. In some embodiments, the sample is a tissue section that refers to a piece of tissue that has been obtained from a subject, fixed, sectioned (e.g., cryosectioned), and mounted on a planar surface, e.g., a microscope slide. In some embodiments, the spatial sample (e.g., specimen or tissue sample) is treated to expand the sample. In some aspects, the spatial sample is preserved and expanded isotropically using a chemical process. For example, a tissue sample may be treated to attach anchors to biomolecules in the spatial sample, perform in situ polymer synthesis, perform mechanical homogenization, and perform specimen expansion (See e.g., Zhao et al., Nature Biotechnology (2017) 35(8):757-764; Chang et al., Nature Methods (2017) 14:593-599; Chang et al., Nature Methods (2016) 13(8):679-84; Tillberg et al., Nature Biotechnology (2016) 34:987-992; Chen et al., Science (2015) 347(6221): 543-548; Asano et al., Current Protocols in Cell Biology (2018) 80(1):e56; Wassie et al., Nature Methods (2018) 16(1):33-41; Boyden et al., Mater. Horiz., (2019) 6, 11-13; Alon et al., FEBS J. 2019 April; 286(8):1482-1494. Karagiannis et al., Current Opinion in Neurobiology (2018) 50:56-63; Gao et al., BMC Biology (2017) 15:50).

In some examples, a suitable source or sample, may include but is not limited to: biological samples, such as biopsy samples, cells (both primary cells and cultured cell lines), sample comprising cell organelles or vesicles, including exosomes, tissues and tissue extracts; samples obtained from an abscess or any other site of infection or inflammation) or samples obtained from a joint (normal joint or a joint affected by disease such as rheumatoid arthritis, osteoarthritis, gout or septic arthritis) of virtually any organism, with mammalian-derived samples, including microbiome-containing samples, being preferred and human-derived samples, including microbiome-containing samples, being particularly preferred; environmental samples (such as air, agricultural, water and soil samples); microbial samples including samples derived from microbial biofilms and/or communities, as well as microbial spores; tissue samples including tissue sections, research samples including extracellular fluids, extracellular supernatants from cell cultures, inclusion bodies in bacteria, cellular components including mitochondria and cellular periplasm.

In some embodiments, the biological sample may contain whole cells and/or live cells and/or cell debris. In some examples, a suitable source or sample, may include but is not limited to: biological samples, such as biopsy samples, cell cultures, cells (both primary cells and cultured cell lines), sample comprising cell organelles or vesicles, tissues and tissue extracts; of virtually any organism. For example, a suitable source or sample, may include but is not limited to: biopsy; fecal matter; bodily fluids (such as blood, whole blood, serum, plasma, urine, lymph, bile, aqueous humor, breast milk, cerumen (earwax), chyle, chyme, endolymph, perilymph, exudates, cerebrospinal fluid, interstitial fluid, aqueous or vitreous humor, colostrum, sputum, amniotic fluid, saliva, anal and vaginal secretions, gastric acid, gastric juice, lymph, mucus (including nasal drainage and phlegm), pericardial fluid, peritoneal fluid, pleural fluid, pus, rheum, saliva, sebum (skin oil), sputum, synovial fluid, perspiration and semen, a transudate, vomit and mixtures of one or more thereof, an exudate (e.g., fluid obtained from an abscess or any other site of infection or inflammation) or fluid obtained from a joint (normal joint or a joint affected by disease such as rheumatoid arthritis, osteoarthritis, gout or septic arthritis) of virtually any organism, with mammalian-derived samples, including microbiome-containing samples, being preferred and human-derived samples, including microbiome-containing samples, being particularly preferred; environmental samples (such as air, agricultural, water and soil samples); microbial samples including samples derived from microbial biofilms and/or communities, as well as microbial spores; tissue samples including tissue sections, research samples including extracellular fluids, extracellular supernatants from cell cultures, inclusion bodies in bacteria, cellular components including mitochondria and cellular periplasm. In some embodiments, the biological sample comprises a body fluid or is derived from a body fluid, wherein the body fluid is obtained from a mammal. In some embodiments, the sample includes bodily fluids, or cell cultures from bodily fluids. In some of any of the provided embodiments, a sample, such as a fluid sample, may be deposited on a surface. For example, a liquid sample may be processed to prepare a cell spread on a solid surface such as a slide. In some embodiments, a sample or a portion thereof (such as analytes or cells obtained from the sample) may be deposited in a polymer resin. In some cases, the polymer resin comprises a hydrogel-forming natural or synthetic polymer.

In some embodiments, the biological sample may contain whole cells and/or live cells and/or cell debris. In some embodiments, the sample is further processed by methods known in the art. For example, a sample is processed to remove, clear, or isolate cellular material (e.g., by centrifugation, filtration, etc.).

In some embodiments, the method includes obtaining and preparing macromolecules from a single cell type or multiple cell types. In some embodiments, the sample comprises a population of cells. In some embodiments, the macromolecules are from a vesicle or subcellular component, an extracellular vesicle, an organelle, or an organized subcomponent thereof. In some embodiments, the macromolecules (e.g., proteins) are from one or more packaging of molecules (e.g., separate components of a single cell or separate components isolated from a population of cells). The macromolecules (e.g., proteins) may be from organelles, for example, mitochondria, nuclei, or cellular vesicles. In one embodiment, one or more specific type of single cells or subtypes thereof may be isolated.

In some embodiments, the spatial samples may include but are not limited to cellular organelles, (e.g., nucleus, golgi apparatus, ribosomes, mitochondria, endoplasmic reticulum, chloroplast, cell membrane, vesicles, etc.). In some embodiments, the sample comprises two or more cells. In some embodiments, the sample comprises vesicles which include but are not limited to transport vesicles and secretory vesicles (e.g., synaptic vesicles, extracellular vesicles including exosomes, microvesicles, membranous vesicles, or blebbing vesicles).

1. Fixation and Permeabilization

In some embodiments, the methods provided herein further include one or more fixing (e.g., cross linking) and/or permeabilizing steps. In certain embodiments, the sample comprising macromolecules or proteins for analysis may be fixed and/or permeabilized. For example, holes or openings may be formed in membranes of the cells and/or any subcellular components. The cells, subcellular structures and components, or biomolecules may be fixed using any number of reagents including but not limited to formalin, methanol, ethanol, paraformaldehyde, formaldehyde, methanol: acetic acid, glutaraldehyde, bifunctional crosslinkers such as bis(succinimidyl)suberate, bis(succinimidyl) polyethyleneglycole etc.

In some examples, the methods of treating proteins and analyzing proteins provided herein may comprise fixing the sample at any step in the analysis method. In some cases, fixing the sample is prior to permeabilizing the sample (e.g., permeabilizing the cells or other membranes). In some examples, fixing the sample is performed after permeabilizing the sample. In some embodiments, the sample is fixed or cross linked prior to providing a protein in a spatial sample with a recording tag comprising a localization tag, wherein the localization tag comprises a barcode or a UMI. In some embodiments, the sample is permeabilized prior to providing a protein in a spatial sample with a recording tag comprising a localization tag, wherein the localization tag comprising a barcode or a UMI. In some embodiments, the spatial sample is treated with a fixation reagent prior to or during step (a). In some embodiments, a tissue sample will be treated to remove embedding material (e.g. to remove paraffin or formalin) from the sample prior to treating with a permeabilization reagent.

In some embodiments, the samples may be fixed or cross-linked such that the cellular and subcellular components are immobilized or held in place. In some embodiments, the analytes in the sample (e.g., DNA, RNA, proteins, polypeptides) may be fixed or cross-linked within the subcellular component such that the molecules contained are immobilized within the cellular or subcellular component. In some embodiments, the sample (e.g., cells and subcellular components) is fixed such that the spatial location of the molecules within the sample are maintained.

In some cases, the subcellular components undergo fixation to crosslink proteins within a cellular or subcellular component (e.g., organelle, vesicle) and may stabilize the lipid membrane. In some examples, the sample (e.g., containing cells and subcellular components) is fixed using formaldehyde in phosphate buffered saline (PBS). Standard methods of fixation are known and include incubation with 0.5-5% formaldehyde in 1×PBS for 10-30 min. In some embodiments, the sample (e.g., cells and subcellular components) is fixed by incubation in methanol or ethanol. In some embodiments, after fixation, the subcellular components are permeabilized to allow access to the interior of the subcellular component by enzymes and DNA tags (e.g., recording tags, barcodes, UMI, localization tags, or other nucleic acids).

In some embodiments, one or more washing steps are performed before and/or after fixation and/or permeabilization. Commercial fixation and permeabilization kits can be used to prepare the sample. In some embodiments, the fixing or cross-linking of the sample containing cells and/or subcellular components may be reversed.

In some embodiments, reversal of fixation or crosslinking of polypeptide analytes is performed prior to isolating the polypeptide analytes from the subcellular component structures where the polypeptide analytes are contained. For example, crosslinking may be reversed by incubating the cross-linked sample in high salt (approximately 200 mM NaCl) at 65° C. for about four hours or more.

In some embodiments, a tissue sample will be treated to remove embedding material (e.g. to remove paraffin or formalin) from the sample prior to release, capture or modification of polypeptides. This can be achieved by contacting the sample with an appropriate solvent (e.g. xylene and ethanol washes). Treatment can occur prior to contacting the tissue sample with a solid support set forth herein or the treatment can occur while the tissue sample is on the solid support.

2. Attaching a Localization Tag and Generating a Localization Polymer (e.g., Sequence)

Provided here are methods for providing spatial information of one or more macromolecules (e.g., proteins, polypeptides, or peptides) obtained from a spatial sample. In some embodiments, the methods are for analysis of proteins or protein complexes from the sample. In some embodiments, a plurality of polypeptides from one or more regions or portions of the spatial sample is labeled with a recording tag. In some embodiments, the methods include providing a plurality of polypeptides each with a recording tag. For example, in step (a) of the provided methods, a polypeptide in a spatial sample in a region of the spatial sample is provided with a recording tag comprising a localization tag. In some embodiments, a plurality of polypeptides are provided with recording tags each comprising a localization tag. In other embodiments, the localization tag (e.g., barcode) is added or transferred to a recording tag previously attached to the polypeptide. The recording tags are attached to the polypeptides using any suitable means. In some embodiments, the localization tag comprises a barcode. In some embodiments, the localization tag and the recording tag are part of the same nucleic acid molecule.

An exemplary workflow for providing a plurality of polypeptides with recording tags comprising localization tags includes: attaching DNA barcodes to beads via a photocleavable linker which enables removal and subsequent diffusive transfer of the barcodes to the tissue section; providing the barcoded beads which attach non-specifically to the tissue surface through adhesive forces such as charge interactions, DNA hybridization, or reversible chemical coupling; decoding or sequencing the tissue-attached barcoded DNA beads; releasing the DNA barcodes by enzymatic, chemical, or photocleavage of the cleavable linker; and allowing barcodes to permeate the tissue slice and anneal to the DNA recording tags attached to proteins within the tissue slice; the barcode information is transferred from the hybridized barcode to the DNA recording tag associated with the protein by exposing the sample to enzymes (e.g., polymerase extension mix).

The recording tag may comprise a localization tag and other nucleic acid components. In some embodiments, the recording tag may comprise a unique molecular identifier, a compartment tag, a partition barcode, sample barcode, a fraction barcode, localization tag, a spacer sequence, or any combination thereof. In some embodiments, the recording tag can further comprise other information including information from a polypeptide analysis assay, such as binder identifier (e.g., from a coding tag), cycle identifier (e.g., from a coding tag), etc. In some embodiments, a common DNA tag comprising a suitable architecture configured as a recording tag is attached to the polypeptides in the spatial sample. For example, the configuration of the DNA tag for functioning as a recording tag allows for transfer of a barcode (e.g., localization tag) to the recording tag.

At least one recording tag is associated or co-localized directly or indirectly with the polypeptide. A recording tag may comprise DNA, RNA, or polynucleotide analog(s) including PNA, γPNA, GNA, BNA, XNA, TNA, polynucleotide analogs, or a combination thereof. A recording tag may be single stranded, or partially or completely double stranded. A recording tag may have a blunt end or overhanging end. In certain embodiments, all or a substantial amount of the polypeptides (e.g., at least 50%, 55%, 60%, 65%, 70%, 75%, 80%, 85%, 90%, 95%, 96%, 97%, 98%, 99%, or 100%) within a sample are labeled with a recording tag. In other embodiments, a subset of polypeptides within a sample are labeled with recording tags. In a particular embodiment, a subset of polypeptides from a sample undergo targeted (analyte specific) labeling with recording tags. Targeted recording tag labeling of proteins may be achieved using target protein-specific binding agents (e.g., antibodies, aptamers, etc.). In some embodiments, the recording tags are attached to the polypeptides in the spatial sample in situ.

The recording tags may comprise a reactive moiety for a cognate reactive moiety present on the target protein (e.g., click chemistry labeling, photoaffinity labeling). For example, recording tags may comprise an azide moiety for interacting with alkyne-derivatized proteins, or recording tags may comprise a benzophenone for interacting with native proteins, etc. Upon binding of the target protein by the target protein specific binding agent, the recording tag and target protein are coupled via their corresponding reactive moieties. After the target protein is labeled with the recording tag, the target-protein specific binding agent may be removed by digestion of the DNA capture probe linked to the target-protein specific binding agent. For example, the DNA capture probe may be designed to contain uracil bases, which are then targeted for digestion with a uracil-specific excision reagent (e.g., USER™), and the target-protein specific binding agent may be dissociated from the target protein.

In the aforementioned embodiments, other types of linkages besides hybridization can be used to link the target specific binding agent and the recording tag. For example, the two moieties can be covalently linked, using a linker that is designed to be cleaved and release the binding agent once the captured target protein (or other polypeptide) is covalently linked to the recording tag. A suitable linker can be attached to various positions of the recording tag, such as the 3' end, at an internal position, or within the linker attached to the 5' end of the recording tag.

In some cases, polypeptides in the spatial sample are chemically activated by incubation with an amine bifunctional bioconjugation reagent such as methyltetrazine-sulfo-NHS ester (Click Chemistry Tools, U.S.A.) or other bifunctional amine reactive bioconjugation reagents (Hermanson, Bioconjugate Techniques, (2013) Academic Press). In some examples, the recording tag comprises an iEDDA coupling label such as trans-cyclooctene (TCO), norbornene, or vinyl boronic acid. In some aspects, the recording tags are incubated with the tissue section containing polypeptides activated with mTet moieties (Knall et al., Tetrahedron Lett (2014) 55(34): 4763-4766).

Various tags may comprise a functional moiety capable of reacting with an internal amino acid, the peptide backbone, or N-terminal amino acid on the plurality of protein complexes, proteins, or polypeptides. In some embodiments, the functional moiety is an aldehyde, an azide/alkyne, or a malemide/thiol, or an epoxide/nucleophile, or an inverse electron demand Diels-Alder (iEDDA) group, or a moiety for a Staudinger reaction.

In a particular embodiment, a single recording tag is attached to a polypeptide, preferably via the attachment to a N- or C-terminal amino acid. In another embodiment, multiple recording tags are attached to the polypeptide, such as to the lysine residues or peptide backbone. In some embodiments, a polypeptide labeled with multiple recording tags is fragmented or digested into smaller peptides, with each peptide labeled on average with one recording tag.

In some embodiments, a localization tag is included in the recording tag associated with the polypeptides in the spatial sample. In some embodiments, a localization tag is a nucleic acid tag comprising a barcode that is transferred to the recording tag associated with the polypeptides in the spatial sample. In some embodiments, a localization tag is generated in situ on the recoding tag associated with the polypeptide in the spatial sample. In some examples, the method includes generating in situ a sequence on the recording tag that contains a barcode sequence. In some cases, the localization tag is generated or attached using chemical/enzymatic reactions, such as ligation or polymerase extension, onto the recording tag. In some embodiments, the localization tag is included in the recording tag when the polypeptides of the spatial sample are provided with the recording tag.

A plurality of polypeptides in each region of the spatial sample can be labeled with a localization tag comprising the same barcode. In some embodiments, a region or portion of the sample is an anatomical or morphological region of the spatial sample. In some embodiments, a region or portion of the sample may contain one or more cells. In some embodiments, the region contains a plurality of cells. In some embodiments, a region or portion of the sample may contain one or more subcellular compartments. In some examples, a plurality of polypeptides within a cell may be labeled with localization tags with the same barcode. In some examples, a plurality of polypeptides within a cluster of cells may be labeled with localization tags with the same barcode. In some examples, a plurality of polypeptides within an organelle may be labeled with localization tags with the same barcode. In some embodiments, the plurality of polypeptides are from various regions in the spatial sample and each region of the spatial sample comprising one or more polypeptides is labeled with localization tags comprising the same barcode. In some embodiments, a localization tag comprising a UMI is used for labeling individual polypeptides such that each polypeptide is labeled with a different tag.

A region of the spatial sample may refer to a contiguous region of the spatial sample. In some embodiments, the region of the spatial sample comprises one or more cells. In some embodiments, a region of the spatial sample is an anatomical or morphological region, which may have boundaries defined by cellular features or tissue features. In some aspects, a region of the spatial sample can refer to one cell or one cluster of cells. In some aspects, a region of the spatial sample can refer to one subcellular compartment or an organelle. In some cases, the region of the spatial sample is contained within a structure (e.g., a membrane). In some embodiments, the regions of the spatial sample comprises non-contiguous regions. In some aspects, the spatial sample comprises regions which contain artificially constructed regions of cell or tissue samples deposited on a planar surface.

In some embodiments, the density or number of polypeptides provided with a recording tag is controlled or titrated. For example, it may be desirable to space the recording tags associated with polypeptides in the spatial sample appropriately to accommodate methods to be used to assess the spatial location of the polypeptides. In some embodiments, the method includes providing a plurality of polypeptides in a spatial sample with recording tags comprising localization tags in a manner which results in a desired density of recording tags. In some embodiments, the desired density of recording tags is compatible with the methods for analyzing the localization tag to generate a localization sequence. In some cases, the amount or density of localization tags associated with polypeptides in the spatial sample is titrated on the surface of the sample or within the volume of the sample.

In some examples, the desired spacing, density, and/or amount of recording tags in the sample may be titrated by providing a diluted or controlled number of recording tags. In some examples, the desired spacing, density, and/or amount of recording tags may be achieved by spiking a competitor or "dummy" competitor molecule when providing, associating, and/or attaching the recording tags. In some cases, the "dummy" competitor molecule reacts in the same way as a recording tag being associated or attached to a polypeptide in the sample but the competitor molecule does not function as a recording tag (or localization tag). In some specific examples, if a desired density is 1 functional recording tag per 1,000 available sites for attachment in the sample, then spiking in 1 functional recording tag for every 1,000 "dummy" competitor molecules is used to achieve the desired spacing. In some examples, the ratio of functional recording tags (or localization tags) is adjusted based on the reaction rate of the functional recording tags compared to the reaction rate of the competitor molecules. In some examples, the density of recording tags is controlled by titrating in non-activated amine modifying reagent such as mPEG-NHS ester.

In some embodiments, the method includes providing a protein in a spatial sample with a localization tag comprising a barcode or UMI and analyzing the localization tag to generate a localization sequence comprising information of the spatial location of the protein in the sample.

In some embodiments, the localization tag is a part of the recording tag that is attached to the proteins in the spatial sample wherein the proteins are immobilized in the spatial sample. In some embodiments, the localization tag comprises information regarding spatial location of the protein within the spatial sample. In some embodiments, the localization tag comprises a barcode which can be used to provide information regarding the spatial location of the protein within the spatial sample. This barcode may allow for multiplex sequencing of a plurality of samples or libraries from tissue section(s).

The localization tag may be any suitable tag that can be used to uniquely identify the spatial location of the protein. In some examples, the localization tag comprises a DNA molecule, DNA with pseudo-complementary bases, an RNA molecule, a BNA molecule, an XNA molecule, a LNA molecule, a PNA molecule, or a γPNA molecule. In some embodiments, the localization tag comprises a non-nucleic acid sequenceable polymer, e.g., a polysaccharide, a polypeptide, a peptide, or a polyamide, or a combination thereof. In some embodiments, the localization tag is a nucleic acid. In some embodiments, the localization tag comprises a nucleic acid molecule of about 3 to about 40 bases (3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 bases in length. A localization tag may comprise a barcode, which is optionally flanked by one spacer on one side or flanked by a spacer on each side. A localization tag may be single stranded or double stranded. A double stranded localization tag may comprise blunt ends, overhanging ends, or both. A localization tag may refer to the localization tag comprised within the recording tag, to a complementary sequence of the localization tag attached to a support for transferring to or extending the recording tag, or to localization tag information present in an extended recording tag.

In certain embodiments, a localization tag comprises a barcode. A barcode is a nucleic acid molecule of about 3 to about 30 bases, about 3 to about 25 bases, about 3 to about 20 bases, about 3 to about 10 bases, about 3 to about 10 bases, about 3 to about 8 bases in length. In some embodiments, a barcode is about 3 bases, 4 bases, 5 bases, 6 bases, 7 bases, 8 bases, 9 bases, 10 bases, 11 bases, 12 bases, 13 bases, 14 bases, 15 bases, 20 bases, 25 bases, or 30 bases in length. In one embodiment, a barcode allows for multiplex sequencing of a plurality of samples or libraries. Barcodes can be used to de-convolute multiplexed sequence data and identify sequence reads from an individual sample or library. In some embodiments, the localization tag comprises more than one barcode. For example, the localization tag can be comprised of a string of 2 or more tags, each being a barcode. In some aspects, a concatenated string of barcodes can allow increased diversity of barcodes for labeling. For example, if 10 different tags are used and concatenated in a random way into a string of 3 tags as a barcode, then the concatenated barcode would have $10^3=1000$ possible sequences by using 10 tags arranged in a combinatorial manner.

In some aspects, the recording tag can also include a compartment tag in which a compartment, such as a droplet, microwell, physical region on a solid support, etc. is assigned a unique barcode. The association of a compartment with a specific barcode can be achieved in any number of ways such as by encapsulating a single barcoded bead in a compartment, e.g., by direct merging or adding a barcoded droplet to a compartment, by directly printing or injecting a barcode reagent to a compartment, etc. The barcode reagents within a compartment are used to add compartment-specific barcodes to the polypeptide or fragments thereof within the compartment. Applied to protein partitioning into compartments, the barcodes can be used to map analysed peptides back to their originating protein molecules in the compartment. In some embodiments, compartment barcodes can also be used to identify protein complexes.

In some embodiments, the recording tag can also include a sample identifying barcode. A sample barcode is useful in the multiplexed analysis of a set of samples in a single reaction vessel or immobilized to a single solid substrate or collection of solid substrates (e.g., a planar slide, population of beads contained in a single tube or vessel, etc.). Polypeptides from many different samples can be labeled with recording tags with sample-specific barcodes, and then all the samples pooled together prior to immobilization to a solid support, cyclic binding, and recording tag analysis. Alternatively, the samples can be kept separate until after creation of a DNA-encoded library, and sample barcodes attached during PCR amplification of the DNA-encoded library, and then mixed together prior to sequencing. This approach could be useful when assaying analytes (e.g., proteins) of different abundance classes. For example, the sample can be split and barcoded, and one portion processed using binding agents to low abundance analytes, and the other portion processed using binding agents to higher abundance analytes.

In certain embodiments, a recording tag comprises an optional, unique molecular identifier (UMI), which provides a unique identifier tag for each polypeptide to which the UMI is associated with. In some embodiments, the localization tag comprises a UMI. A UMI can be about 3 to about 40 bases, about 3 to about 30 bases, about 3 to about 20 bases, or about 3 to about 10 bases, or about 3 to about 8 bases. In some embodiments, a UMI is about 3 bases, 4 bases, 5 bases, 6 bases, 7 bases, 8 bases, 9 bases, 10 bases, 11 bases, 12 bases, 13 bases, 14 bases, 15 bases, 16 bases, 17 bases, 18 bases, 19 bases, 20 bases, 25 bases, 30 bases, 35 bases, or 40 bases in length. A UMI can be used to de-convolute sequencing data from a plurality of extended recording tags to identify sequence reads from individual polypeptides. In some embodiments, within a library of polypeptides, each polypeptide is associated with a single recording tag, with each recording tag comprising a unique UMI. In other embodiments, multiple copies of a recording tag are associated with a single polypeptide, with each copy of the recording tag comprising the same UMI. In some embodiments, a UMI has a different base sequence than the spacer or encoder sequences within the binding agents' coding tags to facilitate distinguishing these components during sequence analysis. In some embodiments, the UMI may provide function as a location identifier and also provide information in the polypeptide analysis assay. For example, the UMI may be used to identify molecules that are identical by descent, and therefore originated from the same initial molecule. In some aspects, this information can be used to correct for variations in amplification, and to detect and correct sequencing errors.

In some embodiments, the localization tag comprises a barcode. In some aspects, a plurality of polypeptides in a region of the spatial sample are labeled with the same barcode. In some embodiments, to label each polypeptide in the sample uniquely, the localization tag provides a unique identifier tag for each macromolecule (e.g., peptide) to which the localization tag is linked. The localization tag may comprise a unique molecule identifier (UMI) or is a UMI.

In certain embodiments, a recording tag comprises a universal priming site, e.g., a forward or 5' universal priming site. A universal priming site is a nucleic acid sequence that may be used for priming a library amplification reaction and/or for sequencing. A universal priming site may include, but is not limited to, a priming site for PCR amplification, flow cell adaptor sequences that anneal to complementary oligonucleotides on flow cell surfaces (e.g., Illumina next generation sequencing), a sequencing priming site, or a combination thereof. A universal priming site can be about 10 bases to about 60 bases. In some embodiments, a universal priming site comprises an Illumina P5 primer (5'-AATGATACGGCGACCACCGA-3'—SEQ ID NO:1) or an Illumina P7 primer (5'-CAAGCAGAAGACGGCATACGAGAT-3'—SEQ ID NO:2).

In some aspects, a region of the spatial sample comprises one or more cells. In some embodiments, each region of the spatial sample comprising one or more polypeptides is labeled with localization tags comprising the same barcode. For example, a plurality of polypeptides from the same cell is labeled with localization tags comprising the same barcode. Various suitable methods for attaching the localization tag or transferring the localization tag to the recording tag can be used.

In some embodiments, the localization tags (e.g., barcodes) are transferred from a solid substrate to the sample. For example, the barcodes are transferred from microparticles (e.g., beads) to the polypeptides in the sample. In some examples, a tissue sample on a surface is exposed to a plurality of beads with barcodes attached and the barcodes are transferred to the polypeptides. Each bead may contain multiple barcodes with the same sequence. In some examples, the barcodes transferred from the barcoded beads are randomly attached to the polypeptides of the spatial sample. In some embodiments, the beads are delivered to the polypeptides in a spatial sample by embedding the barcoded beads in a hydrogel coated over the tissue section surface.

Any suitable bead material and size may be used to deliver barcodes to the polypeptides in the sample, including but not limited to porous or non-solid beads. In some examples, the beads are porous to accommodate a higher loading of barcodes on a bead. In some examples, the beads are about 0.5-10 μm in diameter. In some aspects, each bead has a single population of DNA barcodes. DNA barcodes are attached to the bead using any suitable methods. In some embodiments, DNA barcodes are attached to beads via a photocleavable linker which enables removal and subsequent diffusive transfer of the barcodes to the tissue section. DNA barcodes may be released by enzymatic, chemical, or photocleavage of a cleavable linker. Various methods can be used to generate the barcoded beads including a split-pool synthesis strategy as described in Klein et al., Lab Chip (2017) 17(15): 2540-2541 or Rodrigues et al., Science (2019) 363(6434):1463-1467.

In one example, barcoded beads form an array which are spatially indexed by SOLiD sequencing prior to transferring the barcodes to the polypeptides (See e.g., Rodrigues et al., Science (2019) 363(6434):1463-1467). In some embodiments, a capillary gap flow cell may be used to deliver or distribute barcoded beads to the spatial sample. In some cases, the localization tags (e.g., barcodes) are cleaved from the beads and transferred to the polypeptides. In some embodiments, the cleavage of the barcode from the bead is photocleavage.

In some embodiments, the localization tag is added or transferred to a recording tag previously attached to the polypeptide. In some embodiments for transferring the barcodes from beads to the recording tags attached to polypeptides, the barcodes may be photo-cleaved from the support (e.g., bead) such as by exposure to long wavelength UV. The cleaved barcodes diffuse into the tissue section of the spatial sample and hybridize to recording tags attached to proteins. In some embodiments, a polymerase extension mix is added to the spatial sample to transfer barcode information from the hybridized barcode to the DNA recording tag.

In one embodiment, the polypeptides in the spatial sample are provided with a recording tag which comprises a sequence of nucleotides that is complementary to at least a portion of the localization tag. In some embodiments, the localization tag comprises a barcode and a sequence of nucleotides complementary to the recording tag. In some embodiments, the complementary sequence shared by the recoding tag and localization tag is useful for transferring a barcode from the localization tag to the recording tag associated with the polypeptide. In some cases, the complementary sequence allows association of the barcode from the localization tag and the recording tag. In some embodiments for providing and transferring a localization tag to a recording tag attached to polypeptides, the barcode on the bead is flanked by an upstream spacer sequence and a downstream primer extension sequence complementary to the at least a portion of the recording tag attached to the polypeptides.

In other embodiments, the method includes a step in which the barcodes transferred to the polypeptides are sequenced, assessed, identified, or determined in situ. The transfer of the barcodes from the bead to the polypeptides may utilize any suitable methods, such as transfer by ligation or extension. In some embodiments, the beads are released after transfer of the barcode to the polypeptides. In some cases, the barcodes are analyzed, decoded and/or sequenced in situ after the barcodes are randomly transferred to the spatial sample. Spatial decoding of the barcoded beads on the tissue sample may be performed before the barcodes are attached to the recording tags attached to polypeptides in the spatial sample. The assembled barcoded beads may be spatially decoded in situ using fluorescent imaging and combinatorial hybridization-based approaches or in situ NGS sequencing (See e.g., Gunderson et al., Genome Res (2004) 14(5): 870-877; Lee et al., Nat Protoc. (2015) 10(3): 442-458 Rodrigues et al., Science (2019) 363(6434): 1463-1467). In some embodiments, the decoding of barcoded beads is performed to generate localization sequences as described herein.

In some embodiments, droplets are used to transfer barcodes to polypeptides in a region of the spatial sample. In some examples, barcoding may be performed such that polypeptides within a region of the spatial sample (e.g., within a single cell or subcellular component) are labeled with the same identifier (Klein et al. (2015) Cell 161(5): 1187-1201; PCT Publication WO 2016/130704; and Zilionis et al., (2017) Nat Protoc 12(1): 44-73). For example, a liquid dispenser such as an inkjet printer can be used to deliver droplets containing barcodes to a surface (Barbulovic-Nad et al. Crit Rev Biotechnol. (2006) 26(4):237-59).

In some embodiments, the localization tag is or comprises an antibody or a binding agent or fragment thereof attached to a DNA. In some cases, an antibody binds the protein in the spatial sample and the antibody is attached to a barcode (See e.g., Goltsev et al., Cell. 2018 Aug. 9; 174(4):968-981). In some embodiments, the method includes applying antibodies in a multiplex manner. In some embodiments, the antibody is attached to a barcode or a UMI.

In some embodiments, the localization tag further comprises other nucleic acid components. In some embodiments, the localization tag further comprises a universal priming site. In some embodiments, analyzing the localization tag to generate a localization sequence comprising information of the spatial location of the protein in the sample comprises an amplification step (e.g., amplifying the nucleic acid). In some embodiments, the localization sequence generated is ligated e.g., circularized. In some embodiments, the localization sequence generated is or comprises a circular or circularized nucleic acid (e.g., using a ligase such as CircLigase). See e.g., PCT Patent Publication WO 2016/007839 or Lee et al., Nat Protoc. (2015) 10(3): 442-458.

In some embodiments, analyzing the localization tag attached to the polypeptide as part of the recording tag is performed in situ. For example, the analyzing of the localization tag is performed using a microscope based method. In some cases, the analyzing of the localization tag is performed using a fluorescence based method. In some cases, the analyzing of the localization tag is performed using a multiplex microscope or fluorescence based method. In some embodiments, the analyzing of the localization tag generates a visual signal. In some aspects, the generated localization sequence can be mapped visually to the spatial location where the protein attached to the localization originated. In some embodiments, the methods includes in situ sequencing or labeling of the protein. The analyzing of the localization tag comprises generating a localization polymer (e.g. localization sequence) comprising information of the spatial location of the protein in the sample. In some examples, the localization polymer comprises position information (e.g., spatial position information in reference to the spatial sample).

In some embodiments, sequencing techniques used for analyzing RNA transcripts can be modified for analyzing localization sequences (e.g., barcodes) as described herein, see Eng et al., Nature. (2019) 568(7751):235-239 and Rodrigues et al., Science (2019) 363(6434):1463-1467. In some cases, an approach including sequential detecting of nucleic acid molecules can be used. These approaches may include multiplex imaging of nucleic acids.

In some embodiments, the analyzing of the localization tag involves performing ligation based sequencing. In some cases, the analyzing of the localization tag involves rolling circle amplification. For example, the localization tags are attached to polypeptides using a method which includes the steps of providing a sample containing a cell that expresses an RNA comprising a barcode and that expresses a protein comprising an RNA binding domain, allowing the RNA and the protein to interact, reverse transcribing the RNA to produce DNA, circularizing the DNA, and performing rolling circle amplification (RCA) to produce an amplicon. The method optionally includes the step of detecting the amplicon. See e.g., International Patent Publication No. WO 2016/007839). In some embodiments, the method includes the steps of providing a sample containing a cell or cells expressing proteins that contain a reactive label (Dieterich et al., Proc Natl Acad Sci USA. (2006) 103(25):9482-7), which can then be used for covalent attachment of DNA molecules comprising a barcode. In some embodiments, the method also includes fluorescent sequencing of barcode labels that are combined to create a composite image in which all channels and images over time are spatially registered.

A method set forth herein can further include a step of acquiring an image of a spatial sample (e.g., biological specimen). The imaging may be performed on a spatial sample that is in contact with a solid support. An image can be obtained using detection devices known in the art. Examples include microscopes configured for light, bright field, dark field, phase contrast, fluorescence, reflection, interference, or confocal imaging. A biological specimen can be stained prior to imaging to provide contrast between different regions or cells. In some embodiments, more than one stain can be used to image different aspects of the specimen (e.g., different regions of a tissue, different cells, specific subcellular components or the like). In other embodiments, a biological specimen can be imaged without staining.

In particular embodiments, a fluorescence microscope (e.g. a confocal fluorescent microscope) can be used to detect a biological specimen that is fluorescent, for example, by virtue of a fluorescent label. Fluorescent specimens can also be imaged using a nucleic acid sequencing device having optics for fluorescent detection such as a Genome Analyzer®, MiSeq®, NextSeq® or HiSeq® platform device commercialized by Illumina, Inc. (San Diego, CA); or a SOLiD™ sequencing platform commercialized by Life Technologies (Carlsbad, CA). Other imaging optics that can be used include those that are found in the detection devices described in Bentley et al., Nature 456:53-59 (2008), PCT Publ. Nos. WO 91/06678, WO 04/018497 or WO 07/123744; U.S. Pat. Nos. 7,057,026, 7,329,492, 7,211,414, 7,315,019 or 7,405,281, and US Pat. App. Publ. No. 2008/0108082, each of which is incorporated herein by reference.

In some embodiments, the method includes correlating locations in an image of a spatial sample with barcode sequences that are attached to the polypeptides. Accordingly, characteristics of the biological specimen of the spatial sample that are identifiable in the image can be correlated with the nucleic acids that are found to be present in their proximity. Any of a variety of morphological characteristics can be used in such a correlation, including for example, cell shape, cell size, tissue shape, staining patterns, presence of particular proteins (e.g. as detected by immunohistochemical stains) or other characteristics that are routinely evaluated in pathology or research applications. Accordingly, the biological state of a tissue or its components as determined by visual observation can be correlated with molecular biological characteristics as determined by spatially resolved nucleic acid analysis.

In some embodiments, analyzing the localization tag is performed on polypeptides (e.g., proteins) that are fixed and/or immobilized in the spatial sample (e.g., in the tissue sample). In some embodiments, the localization polymer comprises a localization sequence. For example, the localization sequence can be generated using chemical/enzymatic ligation or polymerase extension. In some cases, the localization sequence is generated by sequencing. In some examples, generating the localization sequence comprises sequencing by ligation (e.g., SOLiD (Sequencing by Oligonucleotide Ligation and Detection)), single molecule sequencing, single molecule fluorescent sequencing (e.g., Helicos single molecule fluorescent sequencing), or sequencing involving probe hybridization and detection (e.g., NanoString Technologies, Inc., Geiss et al., Nat Biotechnol. (2008) 26(3):317-25). In some embodiments, the sequencing is performed sufficiently to generate a unique identification as the localization sequence. In some cases, the sequencing need not be complete, but sufficient to uniquely identify proteins in the spatial sample. In some embodiments, microscopy is used to generate an image of the spatial sample. In some cases, a spatial map of the proteins is generated.

In some embodiments, a mass spectrometry based approach is used to analyze the localization tag (e.g., scanning mass spectrometry or mass spectrometry imaging; Buchberger et al., Anal Chem. (2018) 90(1): 240-265). In some embodiments, the localization polymer comprises information from performing mass spectrometry (e.g., a mass tag).

Optionally, a spatial sample can be removed from a solid support after polypeptides are labeled with barcodes and after an image has been obtained. Thus, a method of the present disclosure can include a step of washing a solid support to remove macromolecules, cells, tissue or other materials from the spatial sample. Removal of the sample or portions thereof can be performed using any suitable technique and will be dependent on the tissue sample. In some cases, the solid support can be washed with water containing various additives, such as surfactants, detergents, enzymes (e.g., proteases and collagenases), cleavage reagents, or the like, to facilitate removal of the specimen. In some embodiments, the solid support is treated with a solution comprising a proteinase enzyme. In some embodiments, polypeptides are released during or after the specimen is removed from the solid support.

B. Protein (e.g., Polypeptide or Peptide) Analysis Assay

In the methods provided, the proteins associated with a recording tag comprising a localization tag are used in a protein (e.g., polypeptide) analysis assay. In an exemplary preparation method, a planar sample is prepared for spatial analysis including fixing and embedding a tissue sample in paraffin analysis (e.g., FFPE (formalin-fixed, paraffin-embedded sample), followed by sectioning the embedded tissue sample as described in Section I.A.1. The planar sections may then be attached to a slide. Following the sample preparation, polypeptides in the spatial sample in a region of the spatial sample are provided with a recording tag comprising a localization tag. As described in Section I.A.2, the associated recording tag comprises the localization tag, and optionally other nucleic acid components. The method also includes analyzing the localization tag to generate a localization sequence comprising information of the spatial location of the polypeptide in the sample. The polypeptides with the associated recording tags are subjected to a polypeptide analysis assay. In some examples, the polypeptide analysis assay is performed on polypeptides released from the spatial sample. In a preferred embodiment, polypeptides with attached recording tags (each comprising a localization tag) are released from the sample prior to performing the polypeptide analysis assay. The polypeptide analysis assay is performed to identify, determine, or assess at least a partial sequence of the polypeptide. In some aspects, the provided methods combine the information from analyzing the localization tag with the information from performing a polypeptide analysis assay.

In some cases, one or more of the steps in the provided methods may be performed in various orders. In some examples, attaching of the recording tag (comprising localization tag) is performed before the analysis of the localization tag to generate a localization sequence, and releasing the polypeptides and associated recording tags from the spatial sample to perform the polypeptide analysis assay. In another example, attaching of the recording tag (comprising localization tag) is performed before the analysis of the localization tag to generate a localization sequence and performing the polypeptide analysis assay on polypeptides in situ without releasing the polypeptides from the spatial sample. In another example, recording tags (comprising localization tag) are attached to the polypeptides, the polypeptide analysis assay is performed on polypeptides in situ without releasing the polypeptides from the spatial sample, then analysis of the localization tag in situ to generate a localization sequence is performed.

In some embodiments, the sequence (or a portion of the sequence thereof) and/or the identity of the protein is determined using a protein (e.g., polypeptide) analysis assay. In some embodiments, the proteins from the spatial sample may be processed or further treated, such as with one or more enzymes and/or reagents. In some examples, the polypeptide analysis assay includes assessing at least a partial sequence or identity of the polypeptide using suitable techniques or procedures. For example, at least a partial sequence of the polypeptide can be assessed by N-terminal amino acid analysis or C-terminal amino acid analysis. In some embodiments, at least a partial sequence of the polypeptide can be assessed using a ProteoCode assay. In some examples, at least a partial sequence of the polypeptide can be assessed by the techniques or procedures disclosed and/or claimed in U.S. Provisional Patent Application Nos. 62/330, 841, 62/339,071, 62/376,886, 62/579,844, 62/582,312, 62/583,448, 62/579,870, 62/579,840, and 62/582,916, and International Patent Application No. PCT/US2017/030702, published as WO 2017/192633. In certain embodiments, the polypeptide analysis assay includes binding of a binding agent to a polypeptide (associated with a recording tag) and transferring identifying information of the binding agent's coding tag to the recording tag to generate an extended recording tag. Further extensions to the extended recording tag can be made in subsequent binding cycles.

In some embodiments, the method optionally comprises collecting the protein with the associated recording tag (comprising the localization tag) prior to performing the protein (e.g., polypeptide) analysis assay. In some embodiments, the methods optionally comprise releasing the proteins from the spatial sample after generating a localization sequence in situ.

In some embodiments, the method comprises fragmenting the proteins labeled with a recording tag (comprising a localization tag) obtained from the spatial sample. In some embodiments, the fragmenting of the proteins is performed after analyzing the localization tag to generate a localization sequence comprising information of the spatial location of the protein in the sample. In some embodiments, the fragmenting is performed prior to the protein (e.g., polypeptide) analysis assay. In some examples, the proteins are from a proteolytic digest, or were treated with a protease. In some cases, the protease is trypsin, LysN, or LysC. In some embodiments, the proteins remain intact. In some embodiments, the protein analysis assay is performed on an intact spatial sample. In some embodiments, the protein analysis assay comprises binding agents for target proteins (or portions thereof).

In one exemplary embodiment of a workflow, recording tags comprising localization tags are covalently attached to polypeptides in a lightly fixed planar tissue section on a solid support. For example, the recording tags are attached to lysine residues. Next, the localization tags are sequenced in situ using for example, fluorescent in situ sequencing (FISSEQ) (Lee et al., Nature Protocols (2015) 10: 442-458). For the in situ sequencing, the recording tag is flanked by common sequences to which can be hybridized a circularization probe and the circle is closed by polymerase extension and ligation. Rolling circle amplification is then carried out. In this exemplary method, the multiple copies of the localization tag are then analyzed by cyclic sequencing (ligation-based or pol-based) using fluorescently labeled probes or nucleotides respectively. After each cycle, the section is imaged, and the collection of images over multiple cycles provides a partial or complete sequence sufficient to identify uniquely the location tag. Protein fragments are then released e.g. by reversing the crosslinking and/or trypsinization or other enzymatic cleavage. The protein fragments attached to recording/localization tags are then recovered and used in a ProteoCode assay to generate extended recording tags comprising localization tags that are then sequenced using NGS.

In embodiments relating to methods of analyzing peptides or polypeptides, the method generally includes contacting and binding of a binding agent to terminal amino acid (e.g., NTAA) of a peptide and transferring the binding agent's coding tag information to the recording tag associated with the peptide, thereby generating a first order extended recording tag. The terminal amino acid bound by the binding agent may be a chemically labeled or modified terminal amino acid. The terminal amino acid (e.g., NTAA) is eliminated. The terminal amino acid eliminated may be a chemically labeled or modified terminal amino acid. Removal of the NTAA by contacting with an enzyme or chemical reagents converts penultimate amino acid of the peptide to a terminal amino acid. The polypeptide analysis method may include one or more cycles of binding with additional binding agents to the terminal amino acid, transferring information from the additional binding agents to the extended nucleic acid thereby generating higher order extended nucleic acid, and eliminating the terminal amino acid. Additional binding, transfer, labeling, and removal, can occur as described above up to n amino acids to generate an $n^{th}$ order extended nucleic acid, which collectively represent the peptide. In some embodiments, steps including the NTAA in the described exemplary approach can be performed instead with a C terminal amino acid (CTAA).

In some embodiments, the polypeptides released from the spatial sample are joined to a surface of a solid support before performing a polypeptide analysis assay. A solid support can be any support surface including, but not limited to, a bead, a microbead, an array, a glass surface, a silicon surface, a plastic surface, a filter, a membrane, a PTFE membrane, nylon, a silicon wafer chip, a flow cell, a flow through chip, a biochip including signal transducing electronics, a microtiter well, an ELISA plate, a spinning interferometry disc, a nitrocellulose membrane, a nitrocellulose-based polymer surface, a nanoparticle, or a microsphere. Materials for a solid support include but are not limited to acrylamide, agarose, cellulose, dextran, nitrocellulose, glass, gold, quartz, polystyrene, polyethylene vinyl acetate, polypropylene, polyester, polymethacrylate, polyacrylate, polyethylene, polyethylene oxide, polysilicates, polycarbonates, poly vinyl alcohol (PVA), Teflon, fluorocarbons, nylon, silicon rubber, silica, polyanhydrides, polyglycolic acid, polyvinylchloride, polylactic acid, polyorthoesters, functionalized silane, polypropylfumerate, collagen, glycosaminoglycans, polyamino acids, or any combination thereof. In certain embodiments, a solid support is a bead, for example, a polystyrene bead, a polymer bead, a polyacrylate bead, an agarose bead, a cellulose bead, a dextran bead, an acrylamide bead, a solid core bead, a porous bead, a paramagnetic bead, a glass bead, a silica-based bead, or a controlled pore bead, or any combinations thereof.

As used herein, the term "solid support", "solid surface", or "solid substrate", or "sequencing substrate", or "substrate" refers to any solid material, including porous and non-porous materials, to which a polypeptide can be associated directly or indirectly, by any means known in the art, including covalent and non-covalent interactions, or any combination thereof. A solid support may be two-dimensional (e.g., planar surface) or three-dimensional (e.g., gel matrix or bead). A solid support can be any support surface including, but not limited to, a bead, a microbead, an array, a glass surface, a silicon surface, a plastic surface, a filter, a membrane, a PTFE membrane, a PTFE membrane, a nitrocellulose membrane, a nitrocellulose-based polymer surface, nylon, a silicon wafer chip, a flow through chip, a flow cell, a biochip including signal transducing electronics, a channel, a microtiter well, an ELISA plate, a spinning interferometry disc, a polymer matrix, a nanoparticle, or a microsphere. Materials for a solid support include but are not limited to acrylamide, agarose, cellulose, dextran, nitrocellulose, glass, gold, quartz, polystyrene, polyethylene vinyl acetate, polypropylene, polyester, polymethacrylate, polyacrylate, polyethylene, polyethylene oxide, polysilicates, polycarbonates, poly vinyl alcohol (PVA), Teflon, fluorocarbons, nylon, silicon rubber, polyanhydrides, polyglycolic acid, polyvinylchloride, polylactic acid, polyorthoesters, functionalized silane, polypropylfumerate, collagen, glycosaminoglycans, polyamino acids, dextran, or any combination thereof. Solid supports further include thin film, membrane, bottles, dishes, fibers, woven fibers, shaped polymers such as tubes, particles, beads, microspheres, microparticles, or any combination thereof. For example, when solid surface is a bead, the bead can include, but is not limited to, a ceramic bead, a polystyrene bead, a polymer bead, a polyacrylate bead, a methylstyrene bead, an agarose bead, a cellulose bead, a dextran bead, an acrylamide bead, a solid core bead, a porous bead, a paramagnetic bead, a glass bead, or a controlled pore bead, a silica-based bead, or any combinations thereof. A bead may be spherical or an irregularly shaped. A bead or support may be porous. A bead's size may range from nanometers, e.g., 100 nm, to millimeters, e.g., 1 mm. In certain embodiments, beads range in size from about 0.2 micron to about 200 microns, or from about 0.5 micron to about 5 micron. In some embodiments, beads can be about 1, 1.5, 2, 2.5, 2.8, 3, 3.5, 4, 4.5, 5, 5.5, 6, 6.5, 7, 7.5, 8, 8.5, 9, 9.5, 10, 10.5, 15, or 20 µm in diameter. In certain embodiments, "a bead" solid support may refer to an individual bead or a plurality of beads. In some embodiments, the solid surface is a nanoparticle. In certain embodiments, the nanoparticles range in size from about 1 nm to about 500 nm in diameter, for example, between about 1 nm and about 20 nm, between about 1 nm and about 50 nm, between about 1 nm and about 100 nm, between about 10 nm and about 50 nm, between about 10 nm and about 100 nm, between about 10 nm and about 200 nm, between about 50 nm and about 100 nm, between about 50 nm and about 150, between about 50 nm and about 200 nm, between about 100 nm and about 200 nm, or between about 200 nm and about 500 nm in diameter. In some embodiments, the nanoparticles can be about 10 nm, about 50 nm, about 100 nm, about 150 nm, about 200 nm, about 300 nm, or about 500 nm in diameter. In some embodiments, the nanoparticles are less than about 200 nm in diameter.

In some embodiments, a plurality of proteins is attached to a solid support prior to the protein (e.g., polypeptide) analysis assay. In some embodiments, the surface of the solid support is passivated (blocked). A "passivated" surface refers to a surface that has been treated with outer layer of material. Methods of passivating surfaces include standard methods from the fluorescent single molecule analysis literature, including passivating surfaces with polymer like polyethylene glycol (PEG) (Pan et al., 2015, Phys. Biol. 12:045006), polysiloxane (e.g., Pluronic F-127), star polymers (e.g., star PEG) (Groll et al., 2010, Methods Enzymol. 472:1-18), hydrophobic dichlorodimethylsilane (DDS)+ self-assembled Tween-20 (Hua et al., 2014, Nat. Methods 11:1233-1236), diamond-like carbon (DLC), DLC+PEG (Stavis et al., 2011, Proc. Natl. Acad. Sci. USA 108:983-988), and zwitterionic moiety (e.g., U.S. Patent Application Publication US 2006/0183863). In addition to covalent surface modifications, a number of passivating agents can be employed as well including surfactants like Tween-20, polysiloxane in solution (Pluronic series), poly vinyl alcohol (PVA), and proteins like BSA and casein. Alternatively, density of analytes (e.g., proteins, polypeptide, or peptides) can be titrated on the surface or within the volume of a solid substrate by spiking a competitor or "dummy" reactive molecule when immobilizing the proteins, polypeptides or peptides to the solid substrate.

In certain embodiments where multiple proteins are immobilized on the same solid support, the proteins can be spaced appropriately to accommodate methods of analysis to be used to assess the proteins. For example, it may be advantageous to space the proteins that optimally to allow a nucleic acid-based method for assessing and sequencing the proteins to be performed. In some embodiments, the method for assessing and sequencing the proteins involve a binding agent which binds to the protein and the binding agent comprises a coding tag with information that is transferred to a nucleic acid attached to the proteins (e.g., recording tag). In some cases, information transfer from a coding tag of a binding agent bound to one protein may reach a neighboring protein.

To control protein spacing on the solid support, the density of functional coupling groups for attaching the protein (e.g., TCO or carboxyl groups (COOH)) may be titrated on the substrate surface. In some embodiments, multiple proteins are spaced apart on the surface or within the volume (e.g., porous supports) of a solid support such that adjacent proteins are spaced apart at a distance of about 50 nm to about 500 nm, or about 50 nm to about 400 nm, or about 50 nm to about 300 nm, or about 50 nm to about 200 nm, or about 50 nm to about 100 nm. In some embodiments, multiple a proteins are spaced apart on the surface of a solid support with an average distance of at least 50 nm, at least 60 nm, at least 70 nm, at least 80 nm, at least 90 nm, at least 100 nm, at least 150 nm, at least 200 nm, at least 250 nm, at least 300 nm, at least 350 nm, at least 400 nm, at least 450 nm, or at least 500 nm. In some embodiments, multiple a proteins are spaced apart on the surface of a solid support with an average distance of at least 50 nm. In some embodiments, proteins are spaced apart on the surface or within the volume of a solid support such that, empirically, the relative frequency of inter- to intra-molecular events (e.g. transfer of information) is <1:10; <1:100; <1:1,000; or <1:10,000.

In some embodiments, the plurality of proteins is coupled on the solid support spaced apart at an average distance between two adjacent proteins which ranges from about 50 to 100 nm, from about 50 to 250 nm, from about 50 to 500 nm, from about 50 to 750 nm, from about 50 to 1000 nm, from about 50 to 1500 nm, from about 50 to 2000 nm, from about 100 to 250 nm, from about 100 to 500 nm, from about 200 to 500 nm, from about 300 to 500 nm, from about 100 to 1000 nm, from about 500 to 600 nm, from about 500 to 700 nm, from about 500 to 800 nm, from about 500 to 900 nm, from about 500 to 1000 nm, from about 500 to 2000 nm, from about 500 to 5000 nm, from about 1000 to 5000 nm, or from about 3000 to 5000 nm.

Various reactions may be used to attach the polypeptides to a solid support. The polypeptides may be attached directly or indirectly to the solid support. In some cases, the polypeptide is attached to the solid support via a nucleic acid. Exemplary reactions include the copper catalyzed reaction of an azide and alkyne to form a triazole (Huisgen 1, 3-dipolar cycloaddition), strain-promoted azide alkyne cycloaddition (SPAAC), reaction of a diene and dienophile (Diels-Alder), strain-promoted alkyne-nitrone cycloaddition, reaction of a strained alkene with an azide, tetrazine or tetrazole, alkene and azide [3+2] cycloaddition, alkene and tetrazine inverse electron demand Diels-Alder (IEDDA) reaction (e.g., m-tetrazine (mTet) or phenyl tetrazine (pTet) and trans-cyclooctene (TCO)); or pTet and an alkene), alkene and tetrazole photoreaction, Staudinger ligation of azides and phosphines, and various displacement reactions, such as displacement of a leaving group by nucleophilic attack on an electrophilic atom (Horisawa 2014, Knall, Hollauf et al. 2014). Exemplary displacement reactions include reaction of an amine with: an activated ester; an N-hydroxysuccinimide ester; an isocyanate; an isothioscyanate, an aldehyde, an epoxide, or the like.

In some embodiments, appropriate spacing of the polypeptides on the solid support is accomplished by titrating the ratio of available attachment molecules on the substrate surface. In some examples, the substrate surface (e.g., bead surface) is functionalized with a carboxyl group (COOH) which is treated with an activating agent (e.g., activating agent is EDC and Sulfo-NHS). In some examples, the substrate surface (e.g., bead surface) comprises NHS moieties. In some embodiments, a mixture of mPEGn-$NH_2$ and $NH_2$-PEGn-mTet is added to the activated beads (wherein n is any number, such as 1-100). The ratio between the mPEG$_3$-$NH_2$ (not available for coupling) and $NH_2$-PEG$_{24}$-mTet (available for coupling) is titrated to generate an appropriate density of functional moieties available to attach the polypeptides on the substrate surface. In certain embodiments, the mean spacing between coupling moieties (e.g., $NH_2$-PEG$_4$-mTet) on the solid surface is at least 50 nm, at least 100 nm, at least 250 nm, or at least 500 nm. In some specific embodiments, the ratio of $NH_2$-PEG$_n$-mTet to mPEG$_3$-$NH_2$ is about or greater than 1:1000, about or greater than 1:10,000, about or greater than 1:100,000, or about or greater than 1:1,000,000. In some further embodiments, the recording tag attaches to the $NH_2$-PEG$_n$-mTet. In some embodiments, the spacing of the polypeptides on the solid support is achieved by controlling the concentration and/or number of available COOH or other functional groups on the solid support.

1. Cyclic Transfer of Coding Tag Information to Recording Tags

In some embodiments, the method comprises attaching a recording tag to the protein as described in Section I.A.2 and performing an assay which utilizes the recording tag. In some embodiments, the recording tag is associated with a protein that is already associated with a localization tag. In other embodiments, the localization tag is added to or transferred to a recording tag associated with a protein.

The recording tag associated with the polypeptide is used in the polypeptide analysis assay which includes transferring identifying information from a coding tag to a recording tag. In some embodiments, the recording tag comprises a spacer polymer. In certain embodiments, a recording tag comprises a spacer at its terminus, e.g., 3' end. As used herein reference to a spacer sequence in the context of a recording tag includes a spacer sequence that is identical to the spacer sequence associated with its cognate binding agent, or a spacer sequence that is complementary to the spacer sequence associated with its cognate binding agent. The terminal, e.g., 3', spacer on the recording tag permits transfer of identifying information of a cognate binding agent from its coding tag to the recording tag during the first binding cycle (e.g., via annealing of complementary spacer sequences for primer extension or sticky end ligation). In one embodiment, the spacer sequence is about 1-20 bases in length, about 2-12 bases in length, or 5-10 bases in length. The length of the spacer may depend on factors such as the temperature and reaction conditions of the primer extension reaction for transferring coding tag information to the recording tag.

In some embodiments, the recording tags associated with a library of polypeptides share a common spacer sequence. In other embodiments, the recording tags associated with a library of polypeptides have binding cycle specific spacer sequences that are complementary to the binding cycle specific spacer sequences of their cognate binding agents.

In some aspects, the spacer sequence in the recording is designed to have minimal complementarity to other regions in the recording tag; likewise, the spacer sequence in the coding tag should have minimal complementarity to other regions in the coding tag. In other words, the spacer sequence of the recording tags and coding tags should have minimal sequence complementarity to components such unique molecular identifiers, barcodes (e.g., compartment, partition, sample, spatial location), universal primer sequences, encoder sequences, cycle specific sequences, etc. present in the recording tags or coding tags.

In some embodiments, a recording tag comprises from 5' to 3' direction: a universal forward (or 5') priming sequence, a localization tag, and a spacer sequence. In some embodiments, a recording tag comprises from 5' to 3' direction: a universal forward (or 5') priming sequence, a localization tag, optionally other barcodes (e.g., sample barcode, partition barcode, compartment barcode, or any combination thereof), and a spacer sequence. In some other embodiments, a recording tag comprises from 5' to 3' direction: a universal forward (or 5') priming sequence, a localization tag, optionally other barcodes (e.g., sample barcode, partition barcode, compartment barcode, or any combination thereof), an optional UMI, and a spacer sequence.

In some embodiments, the protein (e.g., polypeptide) analysis assay comprises cyclic rounds of amino acid recognition, information transfer, and amino acid removal. In an exemplary workflow for analysis of the proteins (e.g., polypeptides or peptides), the treatment and analysis of the peptides is as follows: a large collection of polypeptides (e.g., 50 million-1 billion or more) are immobilized randomly on a single molecule sequencing substrate (e.g., beads) at an appropriate intramolecular spacing. In some embodiments, the peptides are attached to a recording tag which is associated to a localization tag. In a cyclic manner, the terminal amino acid (e.g., N-terminal amino acid or NTAA) of each peptide is labeled (e.g., PTC, modified-PTC, Cbz, DNP, SNP, acetyl, guanidinyl, diheterocyclic methanimine, etc.). In some cases, the labeling of the terminal amino acid can be performed as a later step. The N-terminal amino acid (or labeled N-terminal amino acid, e.g., PITC-NTAA, Cbz-NTAA, DNP-NTAA, SNP-NTAA, acetyl-NTAA, guanidinylated-NTAA, diheterocyclic methanimine modified-NTAA) of each immobilized peptide is bound by a cognate NTAA binding agent which is attached to a coding tag, and identifying information from the coding tag associated with the bound NTAA binding agent is transferred to the recording tag associated with the immobilized peptide, thereby generating an extended recording tag containing information from the coding tag. In some embodiments, the one or more binding agents is removed or released from the polypeptides. The labeled NTAA is removed enzymatically or chemically. One or more cycles of the labeling, contacting with the binding agent, transferring identifying information, and removal of the terminal amino acid can be performed.

The protein (e.g., polypeptide) analysis assay can be performed as described in International Patent Publication No. WO 2017/192633.

The coding tag associated with the binding agent is or comprises a polynucleotide with any suitable length, e.g., a nucleic acid molecule of about 2 bases to about 100 bases, including any integer including 2 and 100 and in between, that comprises identifying information for its associated binding agent. A "coding tag" may also be made from a "sequenceable polymer" (see, e.g., Niu et al., 2013, Nat. Chem. 5:282-292; Roy et al., 2015, Nat. Commun. 6:7237; Lutz, 2015, Macromolecules 48:4759-4767; each of which are incorporated by reference in its entirety). A coding tag may comprise an encoder sequence or a sequence with identifying information, which is optionally flanked by one spacer on one side or optionally flanked by a spacer on each side. A coding tag may also be comprised of an optional UMI and/or an optional binding cycle-specific barcode. A coding tag may be single stranded or double stranded. A double stranded coding tag may comprise blunt ends, overhanging ends, or both. A coding tag may refer to the coding tag that is directly attached to a binding agent, to a complementary sequence hybridized to the coding tag directly attached to a binding agent (e.g., for double stranded coding tags), or to coding tag information present in an extended nucleic acid on the recording tag. In certain embodiments, a coding tag may further comprise a binding cycle specific spacer or barcode, a unique molecular identifier, a universal priming site, or any combination thereof.

In certain embodiments, a coding tag further comprises a spacer sequence at one end or both ends. A spacer sequence is about 1 base to about 20 bases, about 1 base to about 10 bases, about 5 bases to about 9 bases, or about 4 bases to about 8 bases. In some embodiments, a spacer is about 1 base, 2 bases, 3 bases, 4 bases, 5 bases, 6 bases, 7 bases, 8 bases, 9 bases, 10 bases, 11 bases, 12 bases, 13 bases, 14 bases, 15 bases or 20 bases in length. In some embodiments, a spacer within a coding tag is shorter than the encoder sequence, e.g., at least 1 base, 2, bases, 3 bases, 4 bases, 5 bases, 6, bases, 7 bases, 8 bases, 9 bases, 10 bases, 11 bases, 12 bases, 13 bases, 14 bases, 15 bases, 20 bases, or 25 bases shorter than the encoder sequence. In other embodiments, a spacer within a coding tag is the same length as the encoder sequence. In certain embodiments, the spacer is binding agent specific so that a spacer from a previous binding cycle only interacts with a spacer from the appropriate binding agent in a current binding cycle. An example would be pairs of cognate antibodies containing spacer sequences that only allow information transfer if both antibodies sequentially bind to the polypeptide. A spacer sequence may be used as the primer annealing site for a primer extension reaction, or a splint or sticky end in a ligation reaction. A 5' spacer on a coding tag may optionally contain pseudo complementary bases to a 3' spacer on the recording tag to increase $T_m$ (Lehoud et al., 2008, Nucleic Acids Res. 36:3409-3419). In other embodiments, the coding tags within a library of binding agents do not have a binding cycle specific spacer sequence.

In one example, two or more binding agents that each bind to different targets have associated coding tags share the same spacers. In some cases, coding tags associated with two or more binding agents share coding tags with the same sequence or a portion thereof.

In some embodiments, the coding tags within a collection of binding agents share a common spacer sequence used in an assay (e.g. the entire library of binding agents used in a multiple binding cycle method possess a common spacer in their coding tags). In another embodiment, the coding tags are comprised of a binding cycle tags, identifying a particular binding cycle. In other embodiments, the coding tags within a library of binding agents have a binding cycle specific spacer sequence. In some embodiments, a coding tag comprises one binding cycle specific spacer sequence. For example, a coding tag for binding agents used in the first binding cycle comprise a "cycle 1" specific spacer sequence, a coding tag for binding agents used in the second binding cycle comprise a "cycle 2" specific spacer sequence, and so on up to "n" binding cycles. In further embodiments, coding tags for binding agents used in the first binding cycle comprise a "cycle 1" specific spacer sequence and a "cycle 2" specific spacer sequence, coding tags for binding agents used in the second binding cycle comprise a "cycle 2" specific spacer sequence and a "cycle 3" specific spacer sequence, and so on up to "n" binding cycles. In some embodiments, a spacer sequence comprises a sufficient number of bases to anneal to a complementary spacer sequence in a recording tag or extended recording tag to initiate a primer extension reaction or sticky end ligation reaction.

A cycle specific spacer sequence can also be used to concatenate information of coding tags onto a single recording tag when a population of recording tags is associated with a polypeptide. The first binding cycle transfers information from the coding tag to a randomly-chosen recording tag, and subsequent binding cycles can prime only the extended recording tag using cycle dependent spacer sequences. More specifically, coding tags for binding agents used in the first binding cycle comprise a "cycle 1" specific spacer sequence and a "cycle 2" specific spacer sequence, coding tags for binding agents used in the second binding cycle comprise a "cycle 2" specific spacer sequence and a "cycle 3" specific spacer sequence, and so on up to "n" binding cycles. Coding tags of binding agents from the first binding cycle are capable of annealing to recording tags via complementary cycle 1 specific spacer sequences. Upon transfer of the coding tag information to the recording tag, the cycle 2 specific spacer sequence is positioned at the 3' terminus of the extended recording tag at the end of binding cycle 1. Coding tags of binding agents from the second binding cycle are capable of annealing to the extended recording tags via complementary cycle 2 specific spacer sequences. Upon transfer of the coding tag information to the extended recording tag, the cycle 3 specific spacer sequence is positioned at the 3' terminus of the extended recording tag at the end of binding cycle 2, and so on through "n" binding cycles. This embodiment provides that transfer of binding information in a particular binding cycle among multiple binding cycles will only occur on (extended) recording tags that have experienced the previous binding cycles. However, sometimes a binding agent will fail to bind to a cognate polypeptide. Oligonucleotides comprising binding cycle specific spacers after each binding cycle as a "chase" step can be used to keep the binding cycles synchronized even if the event of a binding cycle failure. For example, if a cognate binding agent fails to bind to a polypeptide during binding cycle 1, adding a chase step following binding cycle 1 using oligonucleotides comprising both a cycle 1 specific spacer, a cycle 2 specific spacer, and a "null" encoder sequence. The "null" encoder sequence can be the absence of an encoder sequence or, preferably, a specific barcode that positively identifies a "null" binding cycle. The "null" oligonucleotide is capable of annealing to the recording tag via the cycle 1 specific spacer, and the cycle 2 specific spacer is transferred to the recording tag.

Thus, binding agents from binding cycle 2 are capable of annealing to the extended recording tag via the cycle 2 specific spacer despite the failed binding cycle 1 event. The "null" oligonucleotide marks binding cycle 1 as a failed binding event within the extended recording tag.

In one embodiment, binding cycle-specific encoder sequences are used in coding tags. Binding cycle-specific encoder sequences may be accomplished either via the use of completely unique analyte (e.g., NTAA)-binding cycle encoder barcodes or through a combinatoric use of an analyte (e.g., NTAA) encoder sequence joined to a cycle-specific barcode. The advantage of using a combinatoric approach is that fewer total barcodes need to be designed. For a set of 20 analyte binding agents used across 10 cycles, only 20 analyte encoder sequence barcodes and 10 binding cycle specific barcodes need to be designed. In contrast, if the binding cycle is embedded directly in the binding agent encoder sequence, then a total of 200 independent encoder barcodes may need to be designed. An advantage of embedding binding cycle information directly in the encoder sequence is that the total length of the coding tag can be minimized when employing error-correcting barcodes. The use of error-tolerant barcodes allows highly accurate barcode identification using sequencing platforms and approaches that are more error-prone, but have other advantages such as rapid speed of analysis, lower cost, and/or more portable instrumentation.

In some embodiments, coding tags associated with binding agents used to bind in an alternating cycle(s) comprises different binding cycle specific spacer sequences. For example, a coding tag for binding agents used in the first binding cycle comprise a "cycle 1" specific spacer sequence, a coding tag for binding agents used in the second binding cycle comprise a "cycle 2" specific spacer sequence, a coding tag for binding agents used in the third binding cycle also comprises the "cycle 1" specific spacer sequence, a coding tag for binding agents used in the fourth binding cycle comprises the "cycle 2" specific spacer sequence. In this manner, cycle specific spacers are not needed for every cycle.

In some embodiments, a coding tag comprises a cleavable or nickable DNA strand within the second (3') spacer sequence proximal to the binding agent. For example, the 3' spacer may have one or more uracil bases that can be nicked by uracil-specific excision reagent (USER). USER generates a single nucleotide gap at the location of the uracil. In another example, the 3' spacer may comprise a recognition sequence for a nicking endonuclease that hydrolyzes only one strand of a duplex. Preferably, the enzyme used for cleaving or nicking the 3' spacer sequence acts only on one DNA strand (the 3' spacer of the coding tag), such that the other strand within the duplex belonging to the (extended) recording tag is left intact. These embodiments is particularly useful in assays analysing proteins in their native conformation, as it allows the non-denaturing removal of the binding agent from the (extended) recording tag after primer extension has occurred and leaves a single stranded DNA spacer sequence on the extended recording tag available for subsequent binding cycles.

The coding tags may also be designed to contain palindromic sequences. Inclusion of a palindromic sequence into a coding tag allows a nascent, growing, extended recording tag to fold upon itself as coding tag information is transferred. The extended recording tag is folded into a more compact structure, effectively decreasing undesired intermolecular binding and primer extension events.

In some embodiments, a coding tag comprises analyte-specific spacer that is capable of priming extension only on recording tags previously extended with binding agents recognizing the same analyte. An extended recording tag can be built up from a series of binding events using coding tags comprising analyte-specific spacers and encoder sequences. In one embodiment, a first binding event employs a binding agent with a coding tag comprised of a generic 3' spacer primer sequence and an analyte-specific spacer sequence at the 5' terminus for use in the next binding cycle; subsequent binding cycles then use binding agents with encoded analyte-specific 3' spacer sequences. This design results in amplifiable library elements being created only from a correct series of cognate binding events. Off-target and cross-reactive binding interactions will lead to a non-amplifiable extended recording tag. In one example, a pair of cognate binding agents to a particular polypeptide analyte is used in two binding cycles to identify the analyte. The first cognate binding agent contains a coding tag comprised of a generic spacer 3' sequence for priming extension on the generic spacer sequence of the recording tag, and an encoded analyte-specific spacer at the 5' end, which will be used in the next binding cycle. For matched cognate binding agent pairs, the 3' analyte-specific spacer of the second binding agent is matched to the 5' analyte-specific spacer of the first binding agent. In this way, only correct binding of the cognate pair of binding agents will result in an amplifiable extended recording tag. Cross-reactive binding agents will not be able to prime extension on the recording tag, and no amplifiable extended recording tag product generated. This approach greatly enhances the specificity of the methods disclosed herein. The same principle can be applied to triplet binding agent sets, in which 3 cycles of binding are employed. In a first binding cycle, a generic 3' Sp sequence on the recording tag interacts with a generic spacer on a binding agent coding tag. Primer extension transfers coding tag information, including an analyte specific 5' spacer, to the recording tag. Subsequent binding cycles employ analyte specific spacers on the binding agents' coding tags.

In certain embodiments, a coding tag may further comprise a unique molecular identifier for the binding agent to which the coding tag is linked. A UMI for the binding agent may be useful in embodiments utilizing extended coding tags or di-tag molecules for sequencing readouts, which in combination with the encoder sequence provides information regarding the identity of the binding agent and number of unique binding events for a polypeptide.

A coding tag may include a terminator nucleotide incorporated at the 3' end of the 3' spacer sequence. After a binding agent binds to a polypeptide and their corresponding coding tag and recording tags anneal via complementary spacer sequences, it is possible for primer extension to transfer information from the coding tag to the recording tag, or to transfer information from the recording tag to the coding tag. Addition of a terminator nucleotide on the 3' end of the coding tag prevents transfer of recording tag information to the coding tag. It is understood that for embodiments described herein involving generation of extended coding tags, it may be preferable to include a terminator nucleotide at the 3' end of the recording tag to prevent transfer of coding tag information to the recording tag.

A coding tag may be a single stranded molecule, a double stranded molecule, or a partially double stranded. A coding tag may comprise blunt ends, overhanging ends, or one of each. In some embodiments, a coding tag is partially double stranded, which prevents annealing of the coding tag to internal encoder and spacer sequences in a growing extended recording tag. In some embodiments, the coding tag may comprise a hairpin. In certain embodiments, the hairpin comprises mutually complementary nucleic acid regions are connected through a nucleic acid strand. In some embodiments, the nucleic acid hairpin can also further comprise 3' and/or 5' single-stranded region(s) extending from the double-stranded stem segment. In some examples, the hairpin comprises a single strand of nucleic acid.

A coding tag is joined to a binding agent directly or indirectly, by any means known in the art, including covalent and non-covalent interactions. In some embodiments, a coding tag may be joined to binding agent enzymatically or chemically. In some embodiments, a coding tag may be joined to a binding agent via ligation. In other embodiments, a coding tag is joined to a binding agent via affinity binding pairs (e.g., biotin and streptavidin).

A coding tag comprises an encoder sequence that provides identifying information regarding the associated binding agent. An encoder sequence is about 3 bases to about 30 bases, about 3 bases to about 20 bases, about 3 bases to about 10 bases, or about 3 bases to about 8 bases. In some embodiments, an encoder sequence is about 3 bases, 4 bases, 5 bases, 6 bases, 7 bases, 8 bases, 9 bases, 10 bases, 11 bases, 12 bases, 13 bases, 14 bases, 15 bases, 20 bases, 25 bases, or 30 bases in length. The length of the encoder sequence determines the number of unique encoder sequences that can be generated. Shorter encoding sequences generate a smaller number of unique encoding sequences, which may be useful when using a small number of binding agents. In a specific embodiment, a set of >50 unique encoder sequences are used for a binding agent library.

In some embodiments, the order of the steps in the process for a degradation-based peptide or polypeptide sequencing assay can be reversed or be performed in various orders. For example, in some embodiments, the terminal amino acid labeling can be conducted before and/or after the polypeptide is bound to the binding agent.

In some embodiments, the identifying information from the coding tag comprises information regarding the identity of the amino acid on the peptide bound by the binding agent.

In some examples, the final extended recording tag (including any additional tags attached thereto) containing information from one or more binding agents is optionally flanked by universal priming sites to facilitate downstream amplification and/or DNA sequencing. The forward universal priming site (e.g., Illumina's P5-S1 sequence) can be part of the original design of the recording tag and the reverse universal priming site (e.g., Illumina's P7-S2' sequence) can be added as a final step in the extension of the nucleic acid. In some embodiments, the addition of forward and reverse priming sites can be done independently of a binding agent.

In the methods described herein, upon binding of a binding agent to a protein or peptide, identifying information of its linked coding tag is transferred to a nucleic acid (e.g., recording tag) associated with the peptide, thereby generating an extended recording tag. In some embodiments, the recording tag (and extensions thereof) is associated with the localization tag on the same protein. The nucleic acid associated with the protein or peptide for analysis can comprise the recording tag and the associated localization tag. In some embodiments, the recording tag further comprises barcodes and/or other nucleic acid components. In particular embodiments, the identifying information from the coding tag of the binding agent is transferred to the recording tag or added to any existing barcodes (or other nucleic acid components) attached thereto. The transfer of the identifying information may be performed using extension or ligation. In some embodiments, a spacer is added to the end of the recording tag, and the spacer comprises a sequence that is capable of hybridizing with a sequence on the coding tag to facilitate transfer of the identifying information.

The extended nucleic acid (e.g., recording tag) is any nucleic acid molecule or sequenceable polymer molecule (see, e.g., Niu et al., 2013, Nat. Chem. 5:282-292; Roy et al., 2015, Nat. Commun. 6:7237; Lutz, 2015, Macromolecules 48:4759-4767; each of which are incorporated by reference in its entirety) that comprises identifying information for a polypeptide to which it is associated. In certain embodiments, after a binding agent binds a polypeptide, information from a coding tag linked to a binding agent can be transferred to the nucleic acid associated with the polypeptide while the binding agent is bound to the polypeptide.

An extended nucleic acid associated with the peptide with identifying information from the coding tag may comprise information from a binding agent's coding tag representing each binding cycle performed. However, in some cases, an extended nucleic acid may also experience a "missed" binding cycle, e.g., if a binding agent fails to bind to the polypeptide, because the coding tag was missing, damaged, or defective, because the primer extension reaction failed. Even if a binding event occurs, transfer of information from the coding tag may be incomplete or less than 100% accurate, e.g., because a coding tag was damaged or defective, because errors were introduced in the primer extension reaction). Thus, an extended nucleic acid may represent 100%, or up to 95%, 90%, 85%, 80%, 75%, 70%, 65%, 60%, 65%, 55%, 50%, 45%, 40%, 35%, 30%, or any subrange thereof, of binding events that have occurred on its associated polypeptide. Moreover, the coding tag information present in the extended nucleic acid may have at least 30%, 35%, 40%, 45%, 50%, 55%, 60%, 65%, 70%, 75%, 80%, 85%, 90%, 95%, or 100% identity the corresponding coding tags.

In certain embodiments, an extended recording tag associated with the immobilized peptide may comprise information from multiple coding tags representing multiple, successive binding events. In these embodiments, a single, concatenated extended recording tag associated with the immobilized peptide can be representative of a single polypeptide. As referred to herein, transfer of coding tag information to the recording tag associated with the immobilized peptide also includes transfer to an extended recording tag as would occur in methods involving multiple, successive binding events.

In certain embodiments, the binding event information is transferred from a coding tag to the recording tag associated with the immobilized peptide in a cyclic fashion. Cross-reactive binding events can be informatically filtered out after sequencing by requiring that at least two different coding tags, identifying two or more independent binding events, map to the same class of binding agents (cognate to a particular protein). The coding tag may contain an optional UMI sequence in addition to one or more spacer sequences. Universal priming sequences may also be included in extended nucleic acids on the recording tag associated with the immobilized peptide for amplification and NGS sequencing.

Coding tag information associated with a specific binding agent may be transferred using a variety of methods. In certain embodiments, information of a coding tag is transferred to a recording tag associated with the immobilized peptide via primer extension (Chan et al., "Novel selection methods for DNA-encoded chemical libraries," Curr Opin Chem Biol. (2015) 26: 55-61). A spacer sequence on the 3'-terminus of a recording tag anneals with complementary spacer sequence on the 3' terminus of a coding tag and a polymerase (e.g., strand-displacing polymerase) extends the nucleic acid sequence on the recording tag, using the annealed coding tag as a template. In some embodiments, oligonucleotides complementary to coding tag encoder sequence and 5' spacer can be pre-annealed to the coding tags to prevent hybridization of the coding tag to internal encoder and spacer sequences present in an extended nucleic acid. The 3' terminal spacer, on the coding tag, remaining single stranded, preferably binds to the terminal 3' spacer on the recording tag (or any barcodes or other nucleic acid components associated). In other embodiments, a nascent recording tag associated with the immobilized peptide can be coated with a single stranded binding protein to prevent annealing of the coding tag to internal sites.

In any of the preceding embodiments, the transfer of identifying information (e.g., from a coding tag to a recording tag) can be accomplished by ligation (e.g., an enzymatic or chemical ligation, a splint ligation, a sticky end ligation, a single-strand (ss) ligation such as a ssDNA ligation, or any combination thereof), a polymerase-mediated reaction (e.g., primer extension of single-stranded nucleic acid or double-stranded nucleic acid), or any combination thereof.

In some embodiments, a DNA polymerase that is used for primer extension possesses strand-displacement activity and has limited or is devoid of 3'-5 exonuclease activity. Several of many examples of such polymerases include Klenow exo-(Klenow fragment of DNA Pol 1), T4 DNA polymerase exo-, T7 DNA polymerase exo (Sequenase 2.0), Pfu exo-, Vent exo-, Deep Vent exo-, Bst DNA polymerase large fragment exo-, Bca Pol, 9° N Pol, and Phi29 Pol exo-. In a preferred embodiment, the DNA polymerase is active at room temperature and up to 45° C. In another embodiment, a "warm start" version of a thermophilic polymerase is employed such that the polymerase is activated and is used at about 40° C.-50° C. An exemplary warm start polymerase is Bst 2.0 Warm Start DNA Polymerase (New England Biolabs).

Additives useful in strand-displacement replication include any of a number of single-stranded DNA binding proteins (SSB proteins) of bacterial, viral, or eukaryotic origin, such as SSB protein of E. coli, phage T4 gene 32 product, phage T7 gene 2.5 protein, phage Pf3 SSB, replication protein A RPA32 and RPA14 subunits (Wold, Annu. Rev. Biochem. (1997) 66:61-92); other DNA binding proteins, such as adenovirus DNA-binding protein, herpes simplex protein ICP8, BMRF1 polymerase accessory sub-unit, herpes virus UL29 SSB-like protein; any of a number of replication complex proteins known to participate in DNA replication, such as phage T7 helicase/primase, phage T4 gene 41 helicase, E. coli Rep helicase, E. coli recBCD helicase, recA, E. coli and eukaryotic topoisomerases (Annu Rev Biochem. (2001) 70:369-413).

Mis-priming or self-priming events, such as when the terminal spacer sequence of the recoding tag primes extension self-extension may be minimized by inclusion of single stranded binding proteins (T4 gene 32, E. coli SSB, etc.), DMSO (1-10%), formamide (1-10%), BSA (10-100 ug/ml), TMACl (1-5 mM), ammonium sulfate (10-50 mM), betaine (1-3 M), glycerol (5-40%), or ethylene glycol (5-40%), in the primer extension reaction.

Most type A polymerases are devoid of 3' exonuclease activity (endogenous or engineered removal), such as Klenow exo-, T7 DNA polymerase exo-(Sequenase 2.0), and Taq polymerase catalyzes non-templated addition of a nucleotide, preferably an adenosine base (to lesser degree a G base, dependent on sequence context) to the 3' blunt end of a duplex amplification product. For Taq polymerase, a 3' pyrimidine (C>T) minimizes non-templated adenosine addition, whereas a 3' purine nucleotide (G>A) favours non-templated adenosine addition. In some embodiments, using Taq polymerase for primer extension, placement of a thymidine base in the coding tag between the spacer sequence distal from the binding agent and the adjacent barcode sequence (e.g., encoder sequence or cycle specific sequence) accommodates the sporadic inclusion of a non-templated adenosine nucleotide on the 3' terminus of the spacer sequence of the recording tag. In this manner, the extended recording tag associated with the immobilized peptide (with or without a non-templated adenosine base) can anneal to the coding tag and undergo primer extension.

Alternatively, addition of non-templated base can be reduced by employing a mutant polymerase (mesophilic or thermophilic) in which non-templated terminal transferase activity has been greatly reduced by one or more point mutations, especially in the O-helix region (see U.S. Pat. No. 7,501,237) (Yang et al., Nucleic Acids Res. (2002) 30(19): 4314-4320). Pfu exo-, which is 3' exonuclease deficient and has strand-displacing ability, also does not have non-templated terminal transferase activity.

In another embodiment, polymerase extension buffers are comprised of 40-120 mM buffering agent such as Tris-Acetate, Tris-HCl, HEPES, etc. at a pH of 6-9.

In some embodiments, to minimize non-specific interaction of the coding tag labeled binding agents in solution with the nucleic acids of immobilized proteins, competitor (also referred to as blocking) oligonucleotides complementary to nucleic acids containing spacer sequences (e.g., on the recording tag) can be added to binding reactions to minimize non-specific interactions. In some embodiments, the blocking oligonucleotides contain a sequence that is complementary to the coding tag or a portion thereof attached to the binding agent. In some embodiments, blocking oligonucleotides are relatively short. Excess competitor oligonucleotides are washed from the binding reaction prior to primer extension, which effectively dissociates the annealed competitor oligonucleotides from the nucleic acids on the recording tag, especially when exposed to slightly elevated temperatures (e.g., 30-50° C.). Blocking oligonucleotides may comprise a terminator nucleotide at its 3' end to prevent primer extension.

In certain embodiments, the annealing of the spacer sequence on the recording tag to the complementary spacer sequence on the coding tag is metastable under the primer extension reaction conditions (i.e., the annealing Tm is similar to the reaction temperature). This allows the spacer sequence of the coding tag to displace any blocking oligonucleotide annealed to the spacer sequence of the recording tag (or extensions thereof).

Coding tag information associated with a specific binding agent may also be transferred to a nucleic acid on the recording tag associated with the immobilized peptide via ligation. Ligation may be a blunt end ligation or sticky end ligation. Ligation may be an enzymatic ligation reaction. Examples of ligases include, but are not limited to CV DNA ligase, T4 DNA ligase, T7 DNA ligase, T3 DNA ligase, Taq DNA ligase, E. coli DNA ligase, 9° N DNA ligase, Electroligase® (See e.g., U.S. Patent Publication No. US20140378315). Alternatively, a ligation may be a chemical ligation reaction. In some embodiments as illustrated in International Patent Publication No. WO 2017/192633, a spacer-less ligation is accomplished by using hybridization of a "recording helper" sequence with an arm on the coding tag. The annealed complement sequences are chemically ligated using standard chemical ligation or "click chemistry" (Gunderson et al., Genome Res (1998) 8(11): 1142-1153; Peng et al., European J Org Chem (2010) (22): 4194-4197; El-Sagheer et al., Proc Natl Acad Sci USA (2011) 108(28): 11338-11343; El-Sagheer et al., Org Biomol Chem (2011) 9(1): 232-235; Sharma et al., Anal Chem (2012) 84(14): 6104-6109; Roloff et al., Bioorg Med Chem (2013) 21(12): 3458-3464; Litovchick et al., Artif DNA PNA XNA (2014) 5(1): e27896; Roloff et al., Methods Mol Biol (2014) 1050: 131-141).

In another embodiment, transfer of PNAs can be accomplished with chemical ligation using published techniques. The structure of PNA is such that it has a 5' N-terminal amine group and an unreactive 3' C-terminal amide. Chemical ligation of PNA requires that the termini be modified to be chemically active. This is typically done by derivitizing the 5' N-terminus with a cysteinyl moiety and the 3' C-terminus with a thioester moiety. Such modified PNAs easily couple using standard native chemical ligation conditions (Roloff et al., (2013) Bioorgan. Med. Chem. 21:3458-3464).

In some embodiments, coding tag information can be transferred using topoisomerase. Topoisomerase can be used be used to ligate a topo-charged 3' phosphate on the recording tag (or extensions thereof or any nucleic acids attached) to the 5' end of the coding tag, or complement thereof (Shuman et al., 1994, J. Biol. Chem. 269:32678-32684).

As described herein, a binding agent may bind to a post-translationally modified amino acid. Thus, in certain embodiments, an extended nucleic acid associated with the comprises coding tag information relating to amino acid sequence and post-translational modifications of the polypeptide. In some embodiments, detection of internal post-translationally modified amino acids (e.g., phosphorylation, glycosylation, succinylation, ubiquitination, S-Nitrosylation, methylation, N-acetylation, lipidation, etc.) is be accomplished prior to detection and elimination of terminal amino acids (e.g., NTAA or CTAA). In one example, a peptide is contacted with binding agents for PTM modifications, and associated coding tag information are transferred to the recording tag associated with the immobilized peptide. Once the detection and transfer of coding tag information relating to amino acid modifications is complete, the PTM modifying groups can be removed before detection and transfer of coding tag information for the primary amino acid sequence using N-terminal or C-terminal degradation methods. Thus, resulting extended nucleic acids indicate the presence of post-translational modifications in a peptide sequence, though not the sequential order, along with primary amino acid sequence information.

In some embodiments, detection of internal post-translationally modified amino acids may occur concurrently with detection of primary amino acid sequence. In one example, an NTAA (or CTAA) is contacted with a binding agent specific for a post-translationally modified amino acid, either alone or as part of a library of binding agents (e.g., library composed of binding agents for the 20 standard amino acids and selected post-translational modified amino acids). Successive cycles of terminal amino acid elimination and contact with a binding agent (or library of binding agents) follow. Thus, resulting extended nucleic acids on the recording tag associated with the immobilized peptide indicate the presence and order of post-translational modifications in the context of a primary amino acid sequence.

In certain embodiments, an ensemble of nucleic acids on the recording tag may be employed per polypeptide to improve the overall robustness and efficiency of coding tag information transfer. The use of an ensemble of nucleic acids associated with a given polypeptide rather than a single nucleic acid may improve the efficiency of library construction.

For embodiments involving analysis of denatured proteins, polypeptides, and peptides, the bound binding agent and annealed coding tag can be removed following transfer of the identifying information (e.g., primer extension) by using highly denaturing conditions (e.g., 0.1-0.2 N NaOH, 6M Urea, 2.4 M guanidinium isothiocyanate, 95% formamide, etc.).

a. Binding Agents for Amino Acid Recognition

In certain embodiments, the methods for the protein (e.g., polypeptide) analysis assay provided in the present disclosure comprise multiple binding cycles, where the polypeptide is contacted with a plurality of binding agents, and successive binding of binding agents transfers historical binding information in the form of a nucleic acid based coding tag to at least one nucleic acid (e.g., recording tag) associated with the polypeptide. In this way, a historical record containing information about multiple binding events is generated in a nucleic acid format.

The methods described herein use a binding agent capable of binding to the polypeptide. A binding agent can be any molecule (e.g., peptide, polypeptide, protein, nucleic acid, carbohydrate, small molecule, and the like) capable of binding to a component or feature of a polypeptide. A binding agent can be a naturally occurring, synthetically produced, or recombinantly expressed molecule. A binding agent may bind to a single monomer or subunit of a polypeptide (e.g., a single amino acid) or bind to multiple linked subunits of a polypeptide (e.g., dipeptide, tripeptide, or higher order peptide of a longer polypeptide molecule). In some embodiments, the binding agent binds to an unmodified or native amino acid. In some embodiments, the binding agent binds to a modified or labeled amino acid. A binding agent may be engineered for high or higher affinity for a native or unmodified NTAA, high or higher specificity for a native or unmodified NTAA, or both. A binding agent may be engineered for high or higher affinity for a labeled or modified NTAA, high or higher specificity for a labeled or modified NTAA, or both.

In certain embodiments, a binding agent may be designed to bind covalently. Covalent binding can be designed to be conditional or favored upon binding to the correct moiety. For example, an NTAA and its cognate NTAA-specific binding agent may each be modified with a reactive group such that once the NTAA-specific binding agent is bound to the cognate NTAA, a coupling reaction is carried out to create a covalent linkage between the two. Non-specific binding of the binding agent to other locations that lack the cognate reactive group would not result in covalent attachment. In some embodiments, the polypeptide comprises a ligand that is capable of forming a covalent bond to a binding agent. In some embodiments, the polypeptide comprises a functionalized NTAA which includes a ligand group that is capable of covalent binding to a binding agent. Covalent binding between a binding agent and its target allows for more stringent washing to be used to remove binding agents that are non-specifically bound, thus increasing the specificity of the assay.

In certain embodiments, a binding agent may be a selective binding agent. As used herein, selective binding refers to the ability of the binding agent to preferentially bind to a specific ligand (e.g., amino acid or class of amino acids) relative to binding to a different ligand (e.g., amino acid or class of amino acids). Selectivity is commonly referred to as the equilibrium constant for the reaction of displacement of one ligand by another ligand in a complex with a binding agent. Typically, such selectivity is associated with the spatial geometry of the ligand and/or the manner and degree by which the ligand binds to a binding agent, such as by hydrogen bonding, hydrophobic binding, and/or Van der Waals forces (non-covalent interactions) or by reversible or non-reversible covalent attachment to the binding agent. It should also be understood that selectivity may be relative, and as opposed to absolute, and that different factors can affect the same, including ligand concentration. Thus, in one example, a binding agent selectively binds one of the twenty standard amino acids. In an example of non-selective binding, a binding agent may bind to two or more of the twenty standard amino acids.

In some embodiments, the binding agent is partially specific or selective. In some aspects, the binding agent preferentially binds one or more amino acids. For example, a binding agent may preferentially bind the amino acids A, C, and G over other amino acids. In some other examples, the binding agent may selectively or specifically bind more than one amino acid. In some aspects, the binding agent may also have a preference for one or more amino acids at the second, third, fourth, fifth, etc. positions from the terminal amino acid. In some cases, the binding agent preferentially binds to a specific terminal amino acid and one or more penultimate amino acid. In some cases, the binding agent preferentially binds to one or more specific terminal amino acid(s) and one penultimate amino acid. For example, a binding agent may preferentially bind AA, AC, and AG or a binding agent may preferentially bind AA, CA, and GA. In some specific examples, binding agents with different specificities can share the same coding tag.

In the practice of the methods disclosed herein, the ability of a binding agent to selectively bind a feature or component of a polypeptide need only be sufficient to allow transfer of its coding tag information to the recording tag associated with the polypeptide, transfer of the recording tag information to the coding tag, or transferring of the coding tag information and recording tag information to a di-tag molecule. Thus, selectively need only be relative to the other binding agents to which the polypeptide is exposed. It should also be understood that selectivity of a binding agent need not be absolute to a specific amino acid, but could be selective to a class of amino acids, such as amino acids with nonpolar or non-polar side chains, or with electrically (positively or negatively) charged side chains, or with aromatic side chains, or some specific class or size of side chains, and the like.

In a particular embodiment, the binding agent has a high affinity and high selectivity for the polypeptide of interest. In particular, a high binding affinity with a low off-rate is efficacious for information transfer between the coding tag and recording tag. In certain embodiments, a binding agent has a Kd of <500 nM, <200 nM, <100 nM, <50 nM, <10 nM, <5 nM, <1 nM, <0.5 nM, or <0.1 nM. In a particular embodiment, the binding agent is added to the polypeptide at a concentration >10×, >100×, or >1000× its Kd to drive binding to completion. A detailed discussion of binding kinetics of an antibody to a single protein molecule is described in Chang et al. (Chang, Rissin et al. 2012).

To increase the affinity of a binding agent to small N-terminal amino acids (NTAAs) of peptides, the NTAA may be modified with an "immunogenic" hapten, such as dinitrophenol (DNP). This can be implemented in a cyclic sequencing approach using Sanger's reagent, dinitrofluorobenzene (DNFB), which attaches a DNP group to the amine group of the NTAA. Commercial anti-DNP antibodies have affinities in the low nM range (~8 nM, LO-DNP-2) (Bilgicer, Thomas et al. 2009); as such it stands to reason that it should be possible to engineer high-affinity NTAA binding agents to a number of NTAAs modified with DNP (via DNFB) and simultaneously achieve good binding selectivity for a particular NTAA. In another example, an NTAA may be modified with sulfonyl nitrophenol (SNP) using 4-sulfonyl-2-nitrofluorobenzene (SNFB). Similar affinity enhancements may also be achieved with alternative NTAA modifiers, such as an acetyl group or an amidinyl (guanidinyl) group.

In certain embodiments, a binding agent may bind to an NTAA, a CTAA, an intervening amino acid, dipeptide (sequence of two amino acids), tripeptide (sequence of three amino acids), or higher order peptide of a peptide molecule. In some embodiments, each binding agent in a library of binding agents selectively binds to a particular amino acid, for example one of the twenty standard naturally occurring amino acids. The standard, naturally-occurring amino acids include Alanine (A or Ala), Cysteine (C or Cys), Aspartic Acid (D or Asp), Glutamic Acid (E or Glu), Phenylalanine (F or Phe), Glycine (G or Gly), Histidine (H or His), Isoleucine (I or Ile), Lysine (K or Lys), Leucine (L or Leu), Methionine (M or Met), Asparagine (N or Asn), Proline (P or Pro), Glutamine (Q or Gln), Arginine (R or Arg), Serine (S or Ser), Threonine (T or Thr), Valine (V or Val), Tryptophan (W or Trp), and Tyrosine (Y or Tyr).

In certain embodiments, a binding agent may bind to a post-translational modification of an amino acid. In some embodiments, a peptide comprises one or more post-translational modifications, which may be the same of different. The NTAA, CTAA, an intervening amino acid, or a combination thereof of a peptide may be post-translationally modified. Post-translational modifications to amino acids include acylation, acetylation, alkylation (including methylation), biotinylation, butyrylation, carbamylation, carbonylation, deamidation, deiminiation, diphthamide formation, disulfide bridge formation, eliminylation, flavin attachment, formylation, gamma-carboxylation, glutamylation, glycylation, glycosylation, glypiation, heme C attachment, hydroxylation, hypusine formation, iodination, isoprenylation, lipidation, lipoylation, malonylation, methylation, myristolylation, oxidation, palmitoylation, pegylation, phosphopantetheinylation, phosphorylation, prenylation, propionylation, retinylidene Schiff base formation, S-glutathionylation, S-nitrosylation, S-sulfenylation, selenation, succinylation, sulfination, ubiquitination, and C-terminal amidation (see, also, Seo and Lee, 2004, J. Biochem. Mol. Biol. 37:35-44).

In certain embodiments, a lectin is used as a binding agent for detecting the glycosylation state of a protein, polypeptide, or peptide. Lectins are carbohydrate-binding proteins that can selectively recognize glycan epitopes of free carbohydrates or glycoproteins. A list of lectins recognizing various glycosylation states (e.g., core-fucose, sialic acids, N-acetyl-D-lactosamine, mannose, N-acetyl-glucosamine) include: A, AAA, AAL, ABA, ACA, ACG, ACL, AOL, ASA, BanLec, BC2L-A, BC2LCN, BPA, BPL, Calsepa, CGL2, CNL, Con, ConA, DBA, Discoidin, DSA, ECA, EEL, F17AG, Gal1, Gal1-S, Gal2, Gal3, Gal3C-S, Gal7-S, Gal9, GNA, GRFT, GS-I, GS-II, GSL-I, GSL-II, HHL, HIHA, HPA, I, II, Jacalin, LBA, LCA, LEA, LEL, Lentil, Lotus, LSL-N, LTL, MAA, MAH, MAL I, Malectin, MOA, MPA, MPL, NPA, Orysata, PA-IIL, PA-IL, PALa, PHA-E, PHA-L, PHA-P, PHAE, PHAL, PNA, PPL, PSA, PSL1a, PTL, PTL-I, PWM, RCA120, RS-Fuc, SAMB, SBA, SJA, SNA, SNA-I, SNA-II, SSA, STL, TJA-I, TJA-II, TxLCI, UDA, UEA-I, UEA-II, VFA, VVA, WFA, WGA (see, Zhang et al., 2016, MABS 8:524-535).

In some embodiments, a binding agent may bind to a native or unmodified or unlabeled terminal amino acid. In certain embodiments, a binding agent may bind to a modified or labeled terminal amino acid (e.g., an NTAA that has been functionalized, labeled or modified). A modified or labeled NTAA can be one that is functionalized with phenylisothiocyanate, PITC, 1-fluoro-2,4-dinitrobenzene (Sanger's reagent, DNFB), dansyl chloride (DNS-Cl, or 1-dimethylaminonaphthalene-5-sulfonyl chloride), 4-sulfonyl-2-nitrofluorobenzene (SNFB), N-Acetyl-Isatoic Anhydride, Isatoic Anhydride, 2-Pyridinecarboxaldehyde, 2-Formylphenylboronic acid, 2-Acetylphenylboronic acid, 1-Fluoro-2,4-dinitrobenzene, Succinic anhydride, 4-Chloro-7-nitrobenzofurazan, Pentafluorophenylisothiocyanate, 4-(Trifluoromethoxy)-phenylisothiocyanate, 4-(Trifluoromethyl)-phenylisothiocyanate, 3-(Carboxylic acid)-phenylisothiocyanate, 3-(Trifluoromethyl)-phenylisothiocyanate, 1-Naphthylisothiocyanate, N-nitroimidazole-1-carboximidamide, N,N,Ä≤-Bis(pivaloyl)-1H-pyrazole-1-carboxamidine, N,N,Ä≤-Bis(benzyloxycarbonyl)-1H-pyrazole-1-carboxamidine, an acetylating reagent, a guanidinylation reagent, a thioacylation reagent, a thioacetylation reagent, or a thiobenzylation reagent, or a diheterocyclic methanimine reagent. A modified or labeled NTAA can be one that is functionalized with PITC, 1-fluoro-2,4-dinitrobenzene (Sanger's reagent, DNFB), benzyloxycarbonyl chloride or carbobenzoxy chloride (Cbz-Cl), N-(Benzyloxycarbonyloxy)succinimide (Cbz-OSu or Cbz-O-NHS), dansyl chloride (DNS-Cl, or 1-dimethylaminonaphthalene-5-sulfonyl chloride), 4-sulfonyl-2-nitrofluorobenzene (SNFB), an acetylating reagent, a guanidinylation reagent, a thioacylation reagent, a thioacetylation reagent, or a thiobenzylation reagent, or a diheterocyclic methanimine reagent. In some examples, the binding agent binds to an amino acid labeled by contacting with a reagent or using a method as described in International Patent Publication No. WO 2019/089846. In some cases, the binding agent binds to an amino acid labeled by an amine modifying reagent.

In certain embodiments, a binding agent can be an aptamer (e.g., peptide aptamer, DNA aptamer, or RNA aptamer), an antibody, an anticalin, an ATP-dependent Clp protease adaptor protein (ClpS), an antibody binding fragment, an antibody mimetic, a peptide, a peptidomimetic, a protein, or a polynucleotide (e.g., DNA, RNA, peptide nucleic acid (PNA), a γPNA, bridged nucleic acid (BNA), xeno nucleic acid (XNA), glycerol nucleic acid (GNA), or threose nucleic acid (TNA), or a variant thereof).

As used herein, the terms antibody and antibodies are used in a broad sense, to include not only intact antibody molecules, for example but not limited to immunoglobulin A, immunoglobulin G, immunoglobulin D, immunoglobulin E, and immunoglobulin M, but also any immunoreactivity component(s) of an antibody molecule that immuno-specifically bind to at least one epitope. An antibody may be naturally occurring, synthetically produced, or recombinantly expressed. An antibody may be a fusion protein. An antibody may be an antibody mimetic. Examples of antibodies include but are not limited to, Fab fragments, Fab' fragments, F(ab')$_2$ fragments, single chain antibody fragments (scFv), miniantibodies, diabodies, crosslinked antibody fragments, Affibody™, nanobodies, single domain antibodies, DVD-Ig molecules, alphabodies, affimers, affitins, cyclotides, molecules, and the like. Immunoreactive products derived using antibody engineering or protein engineering techniques are also expressly within the meaning of the term antibodies. Detailed descriptions of antibody and/or protein engineering, including relevant protocols, can be found in, among other places, J. Maynard and G. Georgiou, 2000, Ann. Rev. Biomed. Eng. 2:339-76; Antibody Engineering, R. Kontermann and S. Dubel, eds., Springer Lab Manual, Springer Verlag (2001); U.S. Pat. No. 5,831,012; and S. Paul, Antibody Engineering Protocols, Humana Press (1995).

As with antibodies, nucleic acid and peptide aptamers that specifically recognize a peptide can be produced using known methods. Aptamers bind target molecules in a highly specific, conformation-dependent manner, typically with very high affinity, although aptamers with lower binding affinity can be selected if desired. Aptamers have been shown to distinguish between targets based on very small structural differences such as the presence or absence of a methyl or hydroxyl group and certain aptamers can distinguish between D- and L-enantiomers. Aptamers have been obtained that bind small molecular targets, including drugs, metal ions, and organic dyes, peptides, biotin, and proteins, including but not limited to streptavidin, VEGF, and viral proteins. Aptamers have been shown to retain functional activity after biotinylation, fluorescein labeling, and when attached to glass surfaces and microspheres. (see, Jayasena, 1999, Clin Chem 45:1628-50; Kusser 2000, J. Biotechnol. 74: 27-39; Colas, 2000, Curr Opin Chem Biol 4:54-9). Aptamers which specifically bind arginine and AMP have been described as well (see, Patel and Suri, 2000, J. Biotech. 74:39-60). Oligonucleotide aptamers that bind to a specific amino acid have been disclosed in Gold et al. (1995, Ann. Rev. Biochem. 64:763-97). RNA aptamers that bind amino acids have also been described (Ames and Breaker, 2011, RNA Biol. 8; 82-89; Mannironi et al., 2000, RNA 6:520-27; Famulok, 1994, J. Am. Chem. Soc. 116:1698-1706).

A binding agent can be made by modifying naturally-occurring or synthetically-produced proteins by genetic engineering to introduce one or more mutations in the amino acid sequence to produce engineered proteins that bind to a specific component or feature of a polypeptide (e.g., NTAA, CTAA, or post-translationally modified amino acid or a peptide). For example, exopeptidases (e.g., aminopeptidases, carboxypeptidases), exoproteases, mutated exoproteases, mutated anticalins, mutated ClpSs, antibodies, or tRNA synthetases can be modified to create a binding agent that selectively binds to a particular NTAA. In another example, carboxypeptidases can be modified to create a binding agent that selectively binds to a particular CTAA. A binding agent can also be designed or modified, and utilized, to specifically bind a modified NTAA or modified CTAA, for example one that has a post-translational modification (e.g., phosphorylated NTAA or phosphorylated CTAA) or one that has been modified with a label (e.g., PTC, 1-fluoro-2,4-dinitrobenzene (using Sanger's reagent, DNFB), dansyl chloride (using DNS-Cl, or 1-dimethylaminonaphthalene-5-sulfonyl chloride), or using a thioacylation reagent, a thioacetylation reagent, an acetylation reagent, an amidination (guanidinylation) reagent, or a thiobenzylation reagent). Strategies for directed evolution of proteins are known in the art (e.g., reviewed by Yuan et al., 2005, Microbiol. Mol. Biol. Rev. 69:373-392), and include phage display, ribosomal display, mRNA display, CIS display, CAD display, emulsions, cell surface display method, yeast surface display, bacterial surface display, etc.

In some embodiments, a binding agent that selectively binds to a functionalized NTAA can be utilized. For example, the NTAA may be reacted with phenylisothiocyanate (PITC) to form a phenylthiocarbamoyl-NTAA derivative. In this manner, the binding agent may be fashioned to selectively bind both the phenyl group of the phenylthiocarbamoyl moiety as well as the alpha-carbon R group of the NTAA. Use of PITC in this manner allows for subsequent elimination of the NTAA by Edman degradation as discussed below. In another embodiment, the NTAA may be reacted with Sanger's reagent (DNFB), to generate a DNP-labeled NTAA. Optionally, DNFB is used with an ionic liquid such as 1-ethyl-3-methylimidazolium bis[(trifluoromethyl)sulfonyl]imide ([emim][Tf2N]), in which DNFB is highly soluble. In this manner, the binding agent may be engineered to selectively bind the combination of the DNP and the R group on the NTAA. The addition of the DNP moiety provides a larger "handle" for the interaction of the binding agent with the NTAA, and should lead to a higher affinity interaction. In yet another embodiment, a binding agent may be an aminopeptidase that has been engineered to recognize the DNP-labeled NTAA providing cyclic control of aminopeptidase degradation of the peptide. Once the DNP-labeled NTAA is eliminated, another cycle of DNFB derivatization is performed in order to bind and eliminate the newly exposed NTAA. In preferred particular embodiment, the aminopeptidase is a monomeric metallo-protease, such an aminopeptidase activated by zinc (Calcagno and Klein 2016). In another example, a binding agent may selectively bind to an NTAA that is modified with sulfonyl nitrophenol (SNP), e.g., by using 4-sulfonyl-2-nitrofluorobenzene (SNFB).

Other reagents that may be used to functionalize the NTAA include trifluoroethyl isothiocyanate, allyl isothiocyanate, and dimethylaminoazobenzene isothiocyanate, or a reagent as described in International Patent Application No. PCT/US2018/58575.

A binding agent may be engineered for high affinity for a modified NTAA, high specificity for a modified NTAA, or both. In some embodiments, binding agents can be developed through directed evolution of promising affinity scaffolds using phage display.

In another example, highly-selective engineered ClpSs have also been described in the literature. Emili et al. describe the directed evolution of an E. coli ClpS protein via phage display, resulting in four different variants with the ability to selectively bind NTAAs for aspartic acid, arginine, tryptophan, and leucine residues (U.S. Pat. No. 9,566,335, incorporated by reference in its entirety). In one embodiment, the binding moiety of the binding agent comprises a member of the evolutionarily conserved ClpS family of adaptor proteins involved in natural N-terminal protein recognition and binding or a variant thereof. See e.g., Schuenemann et al., (2009) EMBO Reports 10(5); Roman-Hernandez et al., (2009) PNAS 106(22):8888-93; Guo et al., (2002) JBC 277(48): 46753-62; Wang et al., (2008) Molecular Cell 32: 406-414. In some embodiments, the amino acid residues corresponding to the ClpS hydrophobic binding pocket identified in Schuenemann et al. are modified in order to generate a binding moiety with the desired selectivity.

In one embodiment, the binding moiety comprises a member of the UBR box recognition sequence family, or a variant of the UBR box recognition sequence family. UBR recognition boxes are described in Tasaki et al., (2009), JBC 284(3): 1884-95. For example, the binding moiety may comprise UBR1, UBR2, or a mutant, variant, or homologue thereof.

In certain embodiments, the binding agent further comprises one or more detectable labels such as fluorescent labels, in addition to the binding moiety. In some embodiments, the binding agent does not comprise a polynucleotide such as a coding tag. Optionally, the binding agent comprises a synthetic or natural antibody. In some embodiments, the binding agent comprises an aptamer. In one embodiment, the binding agent comprises a polypeptide, such as a modified member of the ClpS family of adaptor proteins, such as a variant of a E. coli ClpS binding polypeptide, and a detectable label. In one embodiment, the detectable label is optically detectable. In some embodiments, the detectable label comprises a fluorescently moiety, a color-coded nanoparticle, a quantum dot or any combination thereof. In one embodiment the label comprises a polystyrene dye encompassing a core dye molecule such as a FluoSphere™, Nile Red, fluorescein, rhodamine, derivatized rhodamine dyes, such as TAMRA, phosphor, polymethadine dye, fluorescent phosphoramidite, TEXAS RED, green fluorescent protein, acridine, cyanine, cyanine 5 dye, cyanine 3 dye, 5-(2'-aminoethyl)-aminonaphthalene-1-sulfonic acid (EDANS), BODIPY, 120 ALEXA or a derivative or modification of any of the foregoing. In one embodiment, the detectable label is resistant to photobleaching while producing lots of signal (such as photons) at a unique and easily detectable wavelength, with high signal-to-noise ratio.

In a particular embodiment, anticalins are engineered for both high affinity and high specificity to labeled NTAAs (e.g. PTC, modified-PTC, Cbz, DNP, SNP, acetyl, guanidinyl, diheterocyclic methanimine, etc.). Certain varieties of anticalin scaffolds have suitable shape for binding single amino acids, by virtue of their beta barrel structure. An N-terminal amino acid (either with or without modification) can potentially fit and be recognized in this "beta barrel" bucket. High affinity anticalins with engineered novel binding activities have been described (reviewed by Skerra, 2008, FEBS J. 275: 2677-2683). For example, anticalins with high affinity binding (low nM) to fluorescein and digoxygenin have been engineered (Gebauer and Skerra 2012). Engineering of alternative scaffolds for new binding functions has also been reviewed by Banta et al. (2013, Annu. Rev. Biomed. Eng. 15:93-113).

The functional affinity (avidity) of a given monovalent binding agent may be increased by at least an order of magnitude by using a bivalent or higher order multimer of the monovalent binding agent (Vauquelin and Charlton 2013). Avidity refers to the accumulated strength of multiple, simultaneous, non-covalent binding interactions. An individual binding interaction may be easily dissociated. However, when multiple binding interactions are present at the same time, transient dissociation of a single binding interaction does not allow the binding protein to diffuse away and the binding interaction is likely to be restored. An alternative method for increasing avidity of a binding agent is to include complementary sequences in the coding tag attached to the binding agent and the recording tag associated with the polypeptide.

In some embodiments, a binding agent can be utilized that selectively binds a modified C-terminal amino acid (CTAA). Carboxypeptidases are proteases that cleave/eliminate terminal amino acids containing a free carboxyl group. A number of carboxypeptidases exhibit amino acid preferences, e.g., carboxypeptidase B preferentially cleaves at basic amino acids, such as arginine and lysine. A carboxypeptidase can be modified to create a binding agent that selectively binds to particular amino acid. In some embodiments, the carboxypeptidase may be engineered to selectively bind both the modification moiety as well as the alpha-carbon R group of the CTAA. Thus, engineered carboxypeptidases may specifically recognize 20 different CTAAs representing the standard amino acids in the context of a C-terminal label. Control of the stepwise degradation from the C-terminus of the peptide is achieved by using engineered carboxypeptidases that are only active (e.g., binding activity or catalytic activity) in the presence of the label. In one example, the CTAA may be modified by a para-Nitroanilide or 7-amino-4-methylcoumarinyl group.

Other potential scaffolds that can be engineered to generate binders for use in the methods described herein include: an anticalin, an amino acid tRNA synthetase (aaRS), ClpS, an Affilin®, an Adnectin™, a T cell receptor, a zinc finger protein, a thioredoxin, GST A1-1, DARPin, an affimer, an affitin, an alphabody, an avimer, a Kunitz domain peptide, a monobody, a single domain antibody, EETI-II, HPSTI, intrabody, lipocalin, PHD-finger, V(NAR) LDTI, evibody, Ig(NAR), knottin, maxibody, neocarzinostatin, pVIII, tendamistat, VLR, protein A scaffold, MTI-II, ecotin, GCN4, Im9, kunitz domain, microbody, PBP, trans-body, tetranectin, WW domain, CBM4-2, DX-88, GFP, iMab, Ldl receptor domain A, Min-23, PDZ-domain, avian pancreatic polypeptide, charybdotoxin/10Fn3, domain antibody (Dab), a2p8 ankyrin repeat, insect defensing A peptide, Designed AR protein, C-type lectin domain, staphylococcal nuclease, Src homology domain 3 (SH3), or Src homology domain 2 (SH2).

Any binding agent described also comprises a coding tag containing identifying information regarding the binding agent. A coding tag is a nucleic acid molecule of about 3 bases to about 100 bases that provides unique identifying information for its associated binding agent. A coding tag may comprise about 3 to about 90 bases, about 3 to about 80 bases, about 3 to about 70 bases, about 3 to about 60 bases, about 3 bases to about 50 bases, about 3 bases to about 40 bases, about 3 bases to about 30 bases, about 3 bases to about 20 bases, about 3 bases to about 10 bases, or about 3 bases to about 8 bases. In some embodiments, a coding tag is about 3 bases, 4 bases, 5 bases, 6 bases, 7 bases, 8 bases, 9 bases, 10 bases, 11 bases, 12 bases, 13 bases, 14 bases, 15 bases, 16 bases, 17 bases, 18 bases, 19 bases, 20 bases, 25 bases, 30 bases, 35 bases, 40 bases, 55 bases, 60 bases, 65 bases, 70 bases, 75 bases, 80 bases, 85 bases, 90 bases, 95 bases, or 100 bases in length. A coding tag may be composed of DNA, RNA, polynucleotide analogs, or a combination thereof. Polynucleotide analogs include PNA, γPNA, BNA, GNA, TNA, LNA, morpholino polynucleotides, 2'-O-Methyl polynucleotides, alkyl ribosyl substituted polynucleotides, phosphorothioate polynucleotides, and 7-deaza purine analogs.

A coding tag comprises an encoder sequence that provides identifying information regarding the associated binding agent. An encoder sequence is about 3 bases to about 30 bases, about 3 bases to about 20 bases, about 3 bases to about 10 bases, or about 3 bases to about 8 bases. In some embodiments, an encoder sequence is about 3 bases, 4 bases, 5 bases, 6 bases, 7 bases, 8 bases, 9 bases, 10 bases, 11 bases, 12 bases, 13 bases, 14 bases, 15 bases, 20 bases, 25 bases, or 30 bases in length. The length of the encoder sequence determines the number of unique encoder sequences that can be generated. Shorter encoding sequences generate a smaller number of unique encoding sequences, which may be useful when using a small number of binding agents. In a specific embodiment, a set of >50 unique encoder sequences are used for a binding agent library.

In some embodiments, each unique binding agent within a library of binding agents has a unique encoder sequence. For example, 20 unique encoder sequences may be used for a library of 20 binding agents that bind to the 20 standard amino acids. Additional coding tag sequences may be used to identify modified amino acids (e.g., post-translationally modified amino acids). In another example, 30 unique encoder sequences may be used for a library of 30 binding agents that bind to the 20 standard amino acids and 10 post-translational modified amino acids (e.g., phosphorylated amino acids, acetylated amino acids, methylated amino acids). In other embodiments, two or more different binding agents may share the same encoder sequence. For example, two binding agents that each bind to a different standard amino acid may share the same encoder sequence.

In some embodiments, a binding agent is joined to a coding tag via SpyCatcher-SpyTag interaction. The SpyTag peptide forms an irreversible covalent bond to the SpyCatcher protein via a spontaneous isopeptide linkage, thereby offering a genetically encoded way to create peptide interactions that resist force and harsh conditions (Zakeri et al., 2012, Proc. Natl. Acad. Sci. 109:E690-697; Li et al., 2014, J. Mol. Biol. 426:309-317). A binding agent may be expressed as a fusion protein comprising the SpyCatcher protein. In some embodiments, the SpyCatcher protein is appended on the N-terminus or C-terminus of the binding agent. The SpyTag peptide can be coupled to the coding tag using standard conjugation chemistries (Bioconjugate Techniques, G. T. Hermanson, Academic Press (2013)).

In other embodiments, a binding agent is joined to a coding tag via SnoopTag-SnoopCatcher peptide-protein interaction. The SnoopTag peptide forms an isopeptide bond with the SnoopCatcher protein (Veggiani et al., Proc. Natl. Acad. Sci. USA, 2016, 113:1202-1207). A binding agent may be expressed as a fusion protein comprising the SnoopCatcher protein. In some embodiments, the SnoopCatcher protein is appended on the N-terminus or C-terminus of the binding agent. The SnoopTag peptide can be coupled to the coding tag using standard conjugation chemistries.

In yet other embodiments, a binding agent is joined to a coding tag via the HaloTag® protein fusion tag and its chemical ligand. HaloTag is a modified haloalkane dehalogenase designed to covalently bind to synthetic ligands (HaloTag ligands) (Los et al., 2008, ACS Chem. Biol. 3:373-382). The synthetic ligands comprise a chloroalkane linker attached to a variety of useful molecules. A covalent bond forms between the HaloTag and the chloroalkane linker that is highly specific, occurs rapidly under physiological conditions, and is essentially irreversible.

In certain embodiments, a polypeptide is also contacted with a non-cognate binding agent. As used herein, a non-cognate binding agent is referring to a binding agent that is selective for a different polypeptide feature or component than the particular polypeptide being considered. For example, if the n NTAA is phenylalanine, and the peptide is contacted with three binding agents selective for phenylalanine, tyrosine, and asparagine, respectively, the binding agent selective for phenylalanine would be first binding agent capable of selectively binding to the $n^{th}$ NTAA (i.e., phenylalanine), while the other two binding agents would be non-cognate binding agents for that peptide (since they are selective for NTAAs other than phenylalanine). The tyrosine and asparagine binding agents may, however, be cognate binding agents for other peptides in the sample. If the n NTAA (phenylalanine) was then cleaved from the peptide, thereby converting the n-1 amino acid of the peptide to the n-1 NTAA (e.g., tyrosine), and the peptide was then contacted with the same three binding agents, the binding agent selective for tyrosine would be second binding agent capable of selectively binding to the n-1 NTAA (i.e., tyrosine), while the other two binding agents would be non-cognate binding agents (since they are selective for NTAAs other than tyrosine).

Thus, it should be understood that whether an agent is a binding agent or a non-cognate binding agent will depend on the nature of the particular polypeptide feature or component currently available for binding. Also, if multiple polypeptides are analyzed in a multiplexed reaction, a binding agent for one polypeptide may be a non-cognate binding agent for another, and vice versa. Accordingly, it should be understood that the following description concerning binding agents is applicable to any type of binding agent described herein (i.e., both cognate and non-cognate binding agents).

In certain embodiments, the concentration of the binding agents in a solution is controlled to reduce background and/or false positive results of the assay.

In some embodiments, the concentration of a binding agent can be at any suitable concentration, e.g., at about 0.0001 nM, about 0.001 nM, about 0.01 nM, about 0.1 nM, about 1 nM, about 2 nM, about 5 nM, about 10 nM, about 20 nM, about 50 nM, about 100 nM, about 200 nM, about 500 nM, or about 1000 nM. In other embodiments, the concentration of a soluble conjugate used in the assay is between about 0.0001 nM and about 0.001 nM, between about 0.001 nM and about 0.01 nM, between about 0.01 nM and about 0.1 nM, between about 0.1 nM and about 1 nM, between about 1 nM and about 2 nM, between about 2 nM and about 5 nM, between about 5 nM and about 10 nM, between about 10 nM and about 20 nM, between about 20 nM and about 50 nM, between about 50 nM and about 100 nM, between about 100 nM and about 200 nM, between about 200 nM and about 500 nM, between about 500 nM and about 1000 nM, or more than about 1000 nM.

In some embodiments, the ratio between the soluble binding agent molecules and the immobilized polypeptides can be at any suitable range, e.g., at about 0.00001:1, about 0.0001:1, about 0.001:1, about 0.01:1, about 0.1:1, about 1:1, about 2:1, about 5:1, about 10:1, about 15:1, about 20:1, about 25:1, about 30:1, about 35:1, about 40:1, about 45:1, about 50:1, about 55:1, about 60:1, about 65:1, about 70:1, about 75:1, about 80:1, about 85:1, about 90:1, about 95:1, about 100:1, about $10^4$:1, about $10^5$:1, about $10^6$:1, or higher, or any ratio in between the above listed ratios. Higher ratios between the soluble binding agent molecules and the immobilized polypeptide(s) and/or the nucleic acids can be used to drive the binding and/or the coding tag information transfer to completion. This may be particularly useful for detecting and/or analyzing low abundance polypeptides in a sample.

In the methods described herein, upon binding of a binding agent to a polypeptide, identifying information of its linked coding tag is transferred to a recording tag associated with the polypeptide, thereby generating an "extended recording tag." An extended recording tag may comprise information from a binding agent's coding tag representing each binding cycle performed. However, an extended recording tag may also experience a "missed" binding cycle, e.g., because a binding agent fails to bind to the polypeptide, because the coding tag was missing, damaged, or defective, because the primer extension reaction failed. Even if a binding event occurs, transfer of information from the coding tag to the recording tag may be incomplete or less than 100% accurate, e.g., because a coding tag was damaged or defective, because errors were introduced in the primer extension reaction). Thus, an extended recording tag may represent 100%, or up to 95%, 90%, 85%, 80%, 75%, 70%, 65%, 60%, 65%, 55%, 50%, 45%, 40%, 35%, 30% of binding events that have occurred on its associated polypeptide. Moreover, the coding tag information present in the extended recording tag may have at least 30%, 35%, 40%, 45%, 50%, 55%, 60%, 65%, 70%, 75%, 80%, 85%, 90%, 95%, or 100% identity the corresponding coding tags.

In certain embodiments, an extended recording tag may comprise information from multiple coding tags representing multiple, successive binding events. In these embodiments, a single, concatenated extended recording tag can be representative of a single polypeptide. As referred to herein, transfer of coding tag information to a recording tag also includes transfer to an extended recording tag as would occur in methods involving multiple, successive binding events.

In certain embodiments, the binding event information is transferred from a coding tag to a recording tag in a cyclic fashion. Cross-reactive binding events can be informatically filtered out after sequencing by requiring that at least two different coding tags, identifying two or more independent binding events, map to the same class of binding agents (cognate to a particular protein). An optional sample or compartment barcode can be included in the recording tag, as well an optional UMI sequence. The coding tag can also contain an optional UMI sequence along with the encoder and spacer sequences. Universal priming sequences may also be included in extended recording tags for amplification and NGS sequencing.

Coding tag information associated with a specific binding agent may be transferred to a recording tag using a variety of methods. In certain embodiments, information of a coding tag is transferred to a recording tag via primer extension (Chan et al. (2015) Curr Opin Chem Biol 26: 55-61). A spacer sequence on the 3'-terminus of a recording tag or an extended recording tag anneals with complementary spacer sequence on the 3' terminus of a coding tag and a polymerase (e.g., strand-displacing polymerase) extends the recording tag sequence, using the annealed coding tag as a template. In some embodiments, oligonucleotides complementary to coding tag encoder sequence and 5' spacer can be pre-annealed to the coding tags to prevent hybridization of the coding tag to internal encoder and spacer sequences present in an extended recording tag. The 3' terminal spacer, on the coding tag, remaining single stranded, preferably binds to the terminal 3' spacer on the recording tag. In other embodiments, a nascent recording tag can be coated with a single stranded binding protein to prevent annealing of the coding tag to internal sites. Alternatively, the nascent recording tag can also be coated with RecA (or related homologues such as uvsX) to facilitate invasion of the 3' terminus into a completely double stranded coding tag (Bell et al., 2012, Nature 491:274-278). This configuration prevents the double stranded coding tag from interacting with internal recording tag elements, yet is susceptible to strand invasion by the RecA coated 3' tail of the extended recording tag (Bell, et al., 2015, Elife 4: e08646). The presence of a single-stranded binding protein can facilitate the strand displacement reaction.

In some embodiments, a DNA polymerase that is used for primer extension possesses strand-displacement activity and has limited or is devoid of 3'-5 exonuclease activity. Several of many examples of such polymerases include Klenow exo-(Klenow fragment of DNA Pol 1), T4 DNA polymerase exo-, T7 DNA polymerase exo (Sequenase 2.0), Pfu exo-, Vent exo-, Deep Vent exo-, Bst DNA polymerase large fragment exo-, Bca Pol, 9° N Pol, and Phi29 Pol exo-. In a preferred embodiment, the DNA polymerase is active at room temperature and up to 45° C. In another embodiment, a "warm start" version of a thermophilic polymerase is employed such that the polymerase is activated and is used at about 40° C.-50° C. An exemplary warm start polymerase is Bst 2.0 Warm Start DNA Polymerase (New England Biolabs).

Additives useful in strand-displacement replication include any of a number of single-stranded DNA binding proteins (SSB proteins) of bacterial, viral, or eukaryotic origin, such as SSB protein of E. coli, phage T4 gene 32 product, phage T7 gene 2.5 protein, phage Pf3 SSB, replication protein A RPA32 and RPA14 subunits (Wold, 1997); other DNA binding proteins, such as adenovirus DNA-binding protein, herpes simplex protein ICP8, BMRF1 polymerase accessory subunit, herpes virus UL29 SSB-like protein; any of a number of replication complex proteins known to participate in DNA replication, such as phage T7 helicase/primase, phage T4 gene 41 helicase, E. coli Rep helicase, E. coli recBCD helicase, recA, E. coli and eukaryotic topoisomerases (Champoux, 2001).

Mis-priming or self-priming events, such as when the terminal spacer sequence of the recoding tag primes extension self-extension may be minimized by inclusion of single stranded binding proteins (T4 gene 32, E. coli SSB, etc.), DMSO (1-10%), formamide (1-10%), BSA (10-100 ug/ml), TMACl (1-5 mM), ammonium sulfate (10-50 mM), betaine (1-3 M), glycerol (5-40%), or ethylene glycol (5-40%), in the primer extension reaction.

Most type A polymerases are devoid of 3' exonuclease activity (endogenous or engineered removal), such as Klenow exo-, T7 DNA polymerase exo-(Sequenase 2.0), and Taq polymerase catalyzes non-templated addition of a nucleotide, preferably an adenosine base (to lesser degree a G base, dependent on sequence context) to the 3' blunt end of a duplex amplification product. For Taq polymerase, a 3' pyrimidine (C>T) minimizes non-templated adenosine addition, whereas a 3' purine nucleotide (G>A) favours non-templated adenosine addition. In embodiments using Taq polymerase for primer extension, placement of a thymidine base in the coding tag between the spacer sequence distal from the binding agent and the adjacent barcode sequence (e.g., encoder sequence or cycle specific sequence) accommodates the sporadic inclusion of a non-templated adenosine nucleotide on the 3' terminus of the spacer sequence of the recording tag. In this manner, the extended recording tag (with or without a non-templated adenosine base) can anneal to the coding tag and undergo primer extension.

Alternatively, addition of non-templated base can be reduced by employing a mutant polymerase (mesophilic or thermophilic) in which non-templated terminal transferase activity has been greatly reduced by one or more point mutations, especially in the O-helix region (see U.S. Pat. No. 7,501,237) (Yang et al. (2002) Nucleic Acids Res. 30(19): 4314-4320). Pfu exo-, which is 3' exonuclease deficient and has strand-displacing ability, also does not have non-templated terminal transferase activity. Self-priming/mis-priming events initiated by self-annealing of the terminal spacer sequence of the extended recording tag with internal regions of the extended recording tag may be minimized by including pseudo-complementary bases in the recording/extended recording tag (Lahoud, Timoshchuk et al. 2008), (Hoshika, Chen et al. 2010). Pseudo-complementary bases show significantly reduced hybridization affinities for the formation of duplexes with each other due the presence of chemical modification. However, many pseudo-complementary modified bases can form strong base pairs with natural DNA or RNA sequences. In certain embodiments, the coding tag spacer sequence is comprised of multiple A and T bases, and commercially available pseudo-complementary bases 2-aminoadenine and 2-thiothymine are incorporated in the recording tag using phosphoramidite oligonucleotide synthesis. Additional pseudocomplementary bases can be incorporated into the extended recording tag during primer extension by adding pseudo-complementary nucleotides to the reaction (Gamper et al., Biochemistry. (2006) 45(22):6978-6986).

b. Amino Acid Cleavage

In embodiments relating to methods of analyzing peptides or polypeptides using an N-terminal degradation based approach, following contacting and binding of a first binding agent to an n NTAA of a peptide of n amino acids and transfer of the first binding agent's coding tag information to a nucleic acid associated with the peptide, thereby generating a first order extended nucleic acid (e.g., on the recording tag), the n NTAA is eliminated as described herein. Removal of the n labeled NTAA by contacting with an enzyme or chemical reagents converts the n-1 amino acid of the peptide to an N-terminal amino acid, which is referred to herein as an n-1 NTAA. A second binding agent is contacted with the peptide and binds to the n-1 NTAA, and the second binding agent's coding tag information is transferred to the first order extended nucleic acid thereby generating a second order extended nucleic acid (e.g., for generating a concatenated $n^{th}$ order extended nucleic acid representing the peptide). Elimination of the n-1 labeled NTAA converts the n-2 amino acid of the peptide to an N-terminal amino acid, which is referred to herein as n-2 NTAA. Additional binding, transfer, labeling, and removal, can occur as described above up to n amino acids to generate an $n^{th}$ order extended nucleic acid or n separate extended nucleic acids, which collectively represent the peptide. As used herein, an n "order" when used in reference to a binding agent, coding tag, or extended nucleic acid, refers to the n binding cycle, wherein the binding agent and its associated coding tag is used or the n binding cycle where the extended nucleic acid is created (e.g. on recording tag). In some embodiments, steps including the NTAA in the described exemplary approach can be performed instead with a C terminal amino acid (CTAA).

In some embodiments, contacting of the first binding agent and second binding agent to the polypeptide, and optionally any further binding agents (e.g., third binding agent, fourth binding agent, fifth binding agent, and so on), are performed at the same time. For example, the first binding agent and second binding agent, and optionally any further order binding agents, can be pooled together, for example to form a library of binding agents. In another example, the first binding agent and second binding agent, and optionally any further order binding agents, rather than being pooled together, are added simultaneously to the polypeptide. In one embodiment, a library of binding agents comprises at least 20 binding agents that selectively bind to the 20 standard, naturally occurring amino acids. In some embodiments, a library of binding agents may comprise binding agents that selectively bind to the modified amino acids.

In other embodiments, the first binding agent and second binding agent, and optionally any further order binding agents, are each contacted with the polypeptide in separate binding cycles, added in sequential order. In certain embodiments, multiple binding agents are used at the same time, in parallel. This parallel approach saves time and reduces non-specific binding by non-cognate binding agents to a site that is bound by a cognate binding agent (because the binding agents are in competition).

In certain embodiments relating to analyzing peptides, following binding of a terminal amino acid (N-terminal or C-terminal) by a binding agent and transfer of coding tag information to a recording tag, transfer of recording tag information to a coding tag, transfer of recording tag information and coding tag information to a di-tag construct, the terminal amino acid is removed or cleaved from the peptide to expose a new terminal amino acid. In some embodiments, the terminal amino acid is an NTAA. In other embodiments, the terminal amino acid is a CTAA. Cleavage of a terminal amino acid can be accomplished by any number of known techniques, including chemical cleavage and enzymatic cleavage. In some embodiments, an engineered enzyme that catalyzes or reagent that promotes the removal of the PITC-derivatized or other labeled N-terminal amino acid is used. In some embodiments, the terminal amino acid is removed or eliminated using any of the methods as described in International Patent Publication No. WO 2019/089851 or U.S. provisional patent application No. 62/841,171.

In some cases, the reagent for removing a terminal amino acid or eliminating the functionalized NTAA comprises trifluoroacetic acid or hydrochloric acid. In some examples, the reagent comprises acylpeptide hydrolase (APH). In some embodiments, the reagent includes a carboxypeptidase or an aminopeptidase, a dipeptidyl peptidase, dipeptidyl aminopeptidase or a variant, mutant, or modified protein thereof; a hydrolase or a variant, mutant, or modified protein thereof; a mild Edman degradation reagent; an Edmanase enzyme; anhydrous TFA, a base; or any combination thereof. In some embodiments, the mild Edman degradation uses a dichloro or monochloro acid; the mild Edman degradation uses TFA, TCA, or DCA; or the mild Edman degradation uses triethylamine, triethanolamine, or triethylammonium acetate ($Et_3NHOAc$).

In some cases, the reagent for removing the amino acid comprises a base. In some embodiments, the base is a hydroxide, an alkylated amine, a cyclic amine, a carbonate buffer, trisodium phosphate buffer, or a metal salt. In some examples, the hydroxide is sodium hydroxide; the alkylated amine is selected from methylamine, ethylamine, propylamine, dimethylamine, diethylamine, dipropylamine, trimethylamine, triethylamine, tripropylamine, cyclohexylamine, benzylamine, aniline, diphenylamine, N,N-Diisopropylethylamine (DIPEA), and lithium diisopropylamide (LDA); the cyclic amine is selected from pyridine, pyrimidine, imidazole, pyrrole, indole, piperidine, prolidine, 1,8-diazabicyclo[5.4.0]undec-7-ene (DBU), and 1,5-diazabicyclo[4.3.0]non-5-ene (DBN); the carbonate buffer comprises sodium carbonate, potassium carbonate, calcium carbonate, sodium bicarbonate, potassium bicarbonate, or calcium bicarbonate; the metal salt comprises silver; or the metal salt is $AgClO_4$.

Enzymatic cleavage of a NTAA may be accomplished by an aminopeptidase or other peptidases. Aminopeptidases naturally occur as monomeric and multimeric enzymes, and may be metal or ATP-dependent. Natural aminopeptidases have very limited specificity, and generically cleave N-terminal amino acids in a processive manner, cleaving one amino acid off after another. For the methods described here, aminopeptidases (e.g., metalloenzymatic aminopeptidase) may be engineered to possess specific binding or catalytic activity to the NTAA only when modified with an N-terminal label. For example, an aminopeptidase may be engineered such than it only cleaves an N-terminal amino acid if it is modified by a group such as PTC, modified-PTC, Cbz, DNP, SNP, acetyl, guanidinyl, diheterocyclic methanimine, etc. In this way, the aminopeptidase cleaves only a single amino acid at a time from the N-terminus, and allows control of the degradation cycle. In some embodiments, the modified aminopeptidase is non-selective as to amino acid residue identity while being selective for the N-terminal label. In other embodiments, the modified aminopeptidase is selective for both amino acid residue identity and the N-terminal label. Engineered aminopeptidase mutants that bind to and cleave individual or small groups of labelled (biotinylated) NTAAs have been described (see, PCT Publication No. WO2010/065322).

Engineered aminopeptidase mutants that bind to and cleave individual or small groups of labelled (biotinylated) NTAAs have been described (see, PCT Publication No. WO2010/065322, incorporated by reference in its entirety). Aminopeptidases are enzymes that cleave amino acids from the N-terminus of proteins or peptides. Natural aminopeptidases have very limited specificity, and generically eliminate N-terminal amino acids in a processive manner, cleaving one amino acid off after another (Kishor et al., 2015, Anal. Biochem. 488:6-8). However, residue specific aminopeptidases have been identified (Eriquez et al., J. Clin. Microbiol. 1980, 12:667-71; Wilce et al., 1998, Proc. Natl. Acad. Sci. USA 95:3472-3477; Liao et al., 2004, Prot. Sci. 13:1802-10). Aminopeptidases may be engineered to specifically bind to 20 different NTAAs representing the standard amino acids that are labeled with a specific moiety (e.g., PTC, DNP, SNP, etc.). Control of the stepwise degradation of the N-terminus of the peptide is achieved by using engineered aminopeptidases that are only active (e.g., binding activity or catalytic activity) in the presence of the label. In another example, Havranak et al. (U.S. Patent Publication No. US 2014/0273004) describes engineering aminoacyl tRNA synthetases (aaRSs) as specific NTAA binders. The amino acid binding pocket of the aaRSs has an intrinsic ability to bind cognate amino acids, but generally exhibits poor binding affinity and specificity. Moreover, these natural amino acid binders don't recognize N-terminal labels. Directed evolution of aaRS scaffolds can be used to generate higher affinity, higher specificity binding agents that recognized the N-terminal amino acids in the context of an N-terminal label.

In certain embodiments, the aminopeptidase may be engineered to be non-specific, such that it does not selectively recognize one particular amino acid over another, but rather just recognizes the labeled N-terminus. In yet another embodiment, cyclic cleavage is attained by using an engineered acylpeptide hydrolase (APH) to cleave an acetylated NTAA. In yet another embodiment, amidination (guanidinylation) of the NTAA is employed to enable mild cleavage of the labeled NTAA using NaOH (Hamada, (2016) Bioorg Med Chem Lett 26(7): 1690-1695).

For embodiments relating to CTAA binding agents, methods of cleaving CTAA from peptides are also known in the art. For example, U.S. Pat. No. 6,046,053 discloses a method of reacting the peptide or protein with an alkyl acid anhydride to convert the carboxy-terminal into oxazolone, liberating the C-terminal amino acid by reaction with acid and alcohol or with ester. Enzymatic cleavage of a CTAA may also be accomplished by a carboxypeptidase. Several carboxypeptidases exhibit amino acid preferences, e.g., carboxypeptidase B preferentially cleaves at basic amino acids, such as arginine and lysine. As described above, carboxypeptidases may also be modified in the same fashion as aminopeptidases to engineer carboxypeptidases that specifically bind to CTAAs having a C-terminal label. In this way, the carboxypeptidase cleaves only a single amino acid at a time from the C-terminus, and allows control of the degradation cycle. In some embodiments, the modified carboxypeptidase is non-selective as to amino acid residue identity while being selective for the C-terminal label. In other embodiments, the modified carboxypeptidase is selective for both amino acid residue identity and the C-terminal label.

2. Processing and Analysis

The length of the final extended nucleic acids (e.g., on the extended recording tag) generated by the methods described herein is dependent upon multiple factors, including the length of the coding tag (e.g., encoder sequence and spacer), the length of the nucleic acids (e.g., on the recording tag, optionally including any unique molecular identifier, spacer, universal priming site, barcode, or combinations thereof), the number of binding cycles performed, and whether coding tags from each binding cycle are transferred to the same extended nucleic acid or to multiple extended nucleic acids. In some examples, if the coding tag has an encoder sequence of 5 bases that is flanked on each side by a spacer of 5 bases, the coding tag information on the final extended nucleic acid, which represents the peptide's binding agent history, is 10 bases×number of cycles.

After the final binding cycle and transfer of the final binding agent's coding tag information to the extended nucleic acid (e.g., on the recording tag), the tag can be capped by addition of a universal reverse priming site via ligation, primer extension or other methods known in the art. In some embodiments, the universal forward priming site in the nucleic acid (e.g., on the recording tag) is compatible with the universal reverse priming site that is appended to the final extended nucleic acid. In some embodiments, a universal reverse priming site is an Illumina P7 primer (5'-CAAGCAGAAGACGGCATACGAGAT-3'—SEQ ID NO:2) or an Illumina P5 primer (5'-AATGATACGGCGAC-CACCGA-3'—SEQ ID NO:1). The sense or antisense P7 may be appended, depending on strand sense of the nucleic acid to which the identifying information from the coding tag is transferred to. An extended nucleic acid library can be cleaved or amplified directly from the solid support (e.g., beads) and used in traditional next generation sequencing assays and protocols.

In some embodiments, a primer extension reaction is performed on a library of single stranded extended nucleic acids (e.g., extended on the recording tag) to copy complementary strands thereof. In some embodiments, the peptide sequencing assay (e.g., ProteoCode assay), comprises several chemical and enzymatic steps in a cyclical progression. In some cases, one advantage of a single molecule assay is the robustness to inefficiencies in the various cyclical chemical/enzymatic steps. In some embodiments, the use of cycle-specific barcodes present in the coding tag sequence allows an advantage to the assay.

Extended nucleic acids (e.g., extended recording tags) associated with the peptides with identifying information from one or more coding tags and any other tags (barcodes, UMI, etc.) representing the polypeptide(s) of interest can be processed and analysed using a variety of nucleic acid sequencing methods. In some embodiments, extended recording tags containing the localization tag and any other nucleic acid components are processed and analysed. In some embodiments, the collection of extended recording tags (comprising localization tags) can be concatenated. In some embodiments, the extended recording tag (comprising the localization tag and any other nucleic acid components) can be amplified prior to determining the sequence.

In some embodiments, the recording tag or extended recording is also associated with a localization tag. In some embodiments, the associated localization tag is analysed and/or sequenced. In some embodiments, the method includes analyzing the identifying information regarding the binding agent transferred to the recording tag. Examples of sequencing methods include, but are not limited to, chain termination sequencing (Sanger sequencing); next generation sequencing methods, such as sequencing by synthesis, sequencing by ligation, sequencing by hybridization, polony sequencing, ion semiconductor sequencing, and pyrosequencing; and third generation sequencing methods, such as single molecule real time sequencing, nanopore-based sequencing, duplex interrupted sequencing, and direct imaging of DNA using advanced microscopy.

Suitable sequencing methods for use in the invention include, but are not limited to, sequencing by hybridization, sequencing by synthesis technology (e.g., HiSeq™ and Solexa™, Illumina), SMRT™ (Single Molecule Real Time) technology (Pacific Biosciences), true single molecule sequencing (e.g., HeliScope™, Helicos Biosciences), massively parallel next generation sequencing (e.g., SOLiD™, Applied Biosciences; Solexa and HiSeq™, Illumina), massively parallel semiconductor sequencing (e.g., Ion Torrent), pyrosequencing technology (e.g., GS FLX and GS Junior Systems, Roche/454), nanopore sequence (e.g., Oxford Nanopore Technologies).

A library of nucleic acids (e.g., extended nucleic acids and localization tags) may be amplified in a variety of ways. A library of nucleic acids (e.g., recording tags comprising extended nucleic acids and localization tags) undergo exponential amplification, e.g., via PCR or emulsion PCR. Emulsion PCR is known to produce more uniform amplification (Hori, Fukano et al., Biochem Biophys Res Commun (2007) 352(2): 323-328). Alternatively, a library of nucleic acids (e.g., extended nucleic acids and localization tags) may undergo linear amplification, e.g., via in vitro transcription of template DNA using T7 RNA polymerase. The library of nucleic acids (e.g., extended nucleic acids) can be amplified using primers compatible with the universal forward priming site and universal reverse priming site contained therein. A library of nucleic acids (e.g., the recording tag and localization tags) can also be amplified using tailed primers to add sequence to either the 5'-end, 3'-end or both ends of the extended nucleic acids. Sequences that can be added to the termini of the extended nucleic acids include library specific index sequences to allow multiplexing of multiple libraries in a single sequencing run, adaptor sequences, read primer sequences, or any other sequences for making the library of extended nucleic acids compatible for a sequencing platform. An example of a library amplification in preparation for next generation sequencing is as follows: a 20 µl PCR reaction volume is set up using an extended nucleic acid library eluted from ~1 mg of beads (~10 ng), 200 µM dNTP, 1 µM of each forward and reverse amplification primers, 0.5 µl (1U) of Phusion Hot Start enzyme (New England Biolabs) and subjected to the following cycling conditions: 98° C. for 30 sec followed by 20 cycles of 98° C. for 10 sec, 60° C. for 30 sec, 72° C. for 30 sec, followed by 72° C. for 7 min, then hold at 4° C.

In certain embodiments, either before, during or following amplification, the library of nucleic acids (e.g., extended nucleic acids and localization tags) can undergo target enrichment. In some embodiments, target enrichment can be used to selectively capture or amplify extended nucleic acids representing polypeptides of interest from a library of extended nucleic acids before sequencing. In some aspects, target enrichment for protein sequencing is challenging because of the high cost and difficulty in producing highly-specific binding agents for target proteins. In some cases, antibodies are notoriously non-specific and difficult to scale production across thousands of proteins. In some embodiments, the methods of the present disclosure circumvent this problem by converting the protein code into a nucleic acid code which can then make use of a wide range of targeted DNA enrichment strategies available for DNA libraries. In some cases, peptides of interest can be enriched in a sample by enriching their corresponding extended nucleic acids. Methods of targeted enrichment are known in the art, and include hybrid capture assays, PCR-based assays such as TruSeq custom Amplicon (Illumina), padlock probes (also referred to as molecular inversion probes), and the like (see, Mamanova et al., (2010) Nature Methods 7: 111-118; Bodi et al., J. Biomol. Tech. (2013) 24:73-86; Ballester et al., (2016) Expert Review of Molecular Diagnostics 357-372; Mertes et al., (2011) Brief Funct. Genomics 10:374-386; Nilsson et al., (1994) *Science* 265:2085-8; each of which are incorporated herein by reference in their entirety).

In one embodiment, a library of nucleic acids (e.g., extended nucleic acids and localization tags) is enriched via a hybrid capture-based assay. In a hybrid-capture based assay, the library of extended nucleic acids is hybridized to target-specific oligonucleotides that are labeled with an affinity tag (e.g., biotin). Extended nucleic acids hybridized to the target-specific oligonucleotides are "pulled down" via their affinity tags using an affinity ligand (e.g., streptavidin coated beads), and background (non-specific) extended nucleic acids are washed away. The enriched extended nucleic acids (e.g., extended nucleic acids) are then obtained for positive enrichment (e.g., eluted from the beads). In some embodiments, oligonucleotides complementary to the corresponding extended nucleic acid library representations of peptides of interest can be used in a hybrid capture assay. In some embodiments, sequential rounds or enrichment can also be carried out, with the same or different bait sets.

To enrich the entire length of a polypeptide in a library of extended nucleic acids representing fragments thereof (e.g., peptides), "tiled" bait oligonucleotides can be designed across the entire nucleic acid representation of the protein.

In another embodiment, primer extension and ligation-based mediated amplification enrichment (AmpliSeq, PCR, TruSeq TSCA, etc.) can be used to select and module fraction enriched of library elements representing a subset of polypeptides. Competing oligonucleotides can also be employed to tune the degree of primer extension, ligation, or amplification. In the simplest implementation, this can be accomplished by having a mix of target specific primers comprising a universal primer tail and competing primers lacking a 5' universal primer tail. After an initial primer extension, only primers with the 5' universal primer sequence can be amplified. The ratio of primer with and without the universal primer sequence controls the fraction of target amplified. In other embodiments, the inclusion of hybridizing but non-extending primers can be used to modulate the fraction of library elements undergoing primer extension, ligation, or amplification.

Targeted enrichment methods can also be used in a negative selection mode to selectively remove extended nucleic acids from a library before sequencing. Examples of undesirable extended nucleic acids that can be removed are those representing over abundant polypeptide species, e.g., for proteins, albumin, immunoglobulins, etc.

A competitor oligonucleotide bait, hybridizing to the target but lacking a biotin moiety, can also be used in the hybrid capture step to modulate the fraction of any particular locus enriched. The competitor oligonucleotide bait competes for hybridization to the target with the standard biotinylated bait effectively modulating the fraction of target pulled down during enrichment. The ten orders dynamic range of protein expression can be compressed by several orders using this competitive suppression approach, especially for the overly abundant species such as albumin. Thus, the fraction of library elements captured for a given locus relative to standard hybrid capture can be modulated from 100% down to 0% enrichment.

Additionally, library normalization techniques can be used to remove overly abundant species from the extended nucleic acid library. This approach works best for defined length libraries originating from peptides generated by site-specific protease digestion such as trypsin, LysC, GluC, etc. In one example, normalization can be accomplished by denaturing a double-stranded library and allowing the library elements to re-anneal. The abundant library elements re-anneal more quickly than less abundant elements due to the second-order rate constant of bimolecular hybridization kinetics (Bochman, Paeschke et al. 2012). The ssDNA library elements can be separated from the abundant dsDNA library elements using methods known in the art, such as chromatography on hydroxyapatite columns (VanderNoot, et al., 2012, Biotechniques 53:373-380) or treatment of the library with a duplex-specific nuclease (DSN) from Kamchatka crab (Shagin et al., (2002) Genome Res. 12:1935-42) which destroys the dsDNA library elements.

Any combination of fractionation, enrichment, and subtraction methods, of the polypeptides before attachment to the solid support and/or of the resulting extended nucleic acid library can economize sequencing reads and improve measurement of low abundance species.

In some embodiments, a library of nucleic acids (e.g., extended nucleic acids and localization tags) is concatenated by ligation or end-complementary PCR to create a long DNA molecule comprising multiple different extended recorder tags, extended coding tags, or di-tags, respectively (Du et al., (2003) BioTechniques 35:66-72; Muecke et al., (2008) Structure 16:837-841; U.S. Pat. No. 5,834,252, each of which is incorporated by reference in its entirety). This embodiment is preferable for nanopore sequencing in which long strands of DNA are analyzed by the nanopore sequencing device.

In some embodiments, direct single molecule analysis is performed on the nucleic acids (e.g., extended nucleic acids and localization tags) (see, e.g., Harris et al., (2008) Science 320:106-109). The nucleic acids (e.g., extended nucleic acids) can be analysed directly on the solid support, such as a flow cell or beads that are compatible for loading onto a flow cell surface (optionally microcell patterned), wherein the flow cell or beads can integrate with a single molecule sequencer or a single molecule decoding instrument. For single molecule decoding, hybridization of several rounds of pooled fluorescently-labeled of decoding oligonucleotides (Gunderson et al., (2004) Genome Res. 14:970-7) can be used to ascertain both the identity and order of the coding tags within the extended nucleic acids (e.g., on the recording tag). In some embodiments, the binding agents may be labeled with cycle-specific coding tags as described above (see also, Gunderson et al., (2004) Genome Res. 14:970-7).

Following sequencing of the nucleic acid libraries (e.g., of extended nucleic acids), the resulting sequences can be collapsed by their UMIs and then associated to their corresponding polypeptides and aligned to the totality of the proteome. Resulting sequences can also be collapsed by their compartment tags and associated to their corresponding compartmental proteome, which in a particular embodiment contains only a single or a very limited number of protein molecules. Both protein identification and quantification can easily be derived from this digital peptide information.

In some embodiments, the coding tag sequence can be optimized for the particular sequencing analysis platform. In a particular embodiment, the sequencing platform is nanopore sequencing. In some embodiments, the sequencing platform has a per base error rate of >1%, >5%, >10%, >15%, >20%, >25%, or >30%. For example, if the extended nucleic acid is to be analyzed using a nanopore sequencing instrument, the barcode sequences (e.g., sequences comprising identifying information from the coding tag) can be designed to be optimally electrically distinguishable in transit through a nanopore. Moreover, a technique called duplex interrupted nanopore sequencing (DI) can be employed with nanopore strand sequencing without the need for a molecular motor, greatly simplifying the system design (Derrington et al., Proc Natl Acad Sci USA (2010) 107(37): 16060-16065). Readout of the extended nucleic acids via DI nanopore sequencing requires that the spacer elements in the concatenated extended nucleic acid library be annealed with complementary oligonucleotides. The oligonucleotides used herein may comprise LNAs, or other modified nucleic acids or analogs to increase the effective Tm of the resultant duplexes. As the single-stranded extended nucleic acid decorated with these duplex spacer regions is passed through the pore, the double strand region will become transiently stalled at the constriction zone enabling a current readout of about three bases adjacent to the duplex region. In a particular embodiment for DI nanopore sequencing, the encoder sequence comprising identifying information from the coding tag is designed in such a way that the three bases adjacent to the spacer element create maximally electrically distinguishable nanopore signals (Derrington et al., Proc Natl Acad Sci USA (2010) 107(37): 16060-16065). As an alternative to motor-free DI sequencing, the spacer element can be designed to adopt a secondary structure such as a G-quartet, which will transiently stall the extended nucleic acid as it passes through the nanopore enabling readout of the adjacent encoder sequence (Shim et al., Nucleic Acids Res (2009) 37(3): 972-982; Zhang et al., mAbs (2016) 8, 524-535). After proceeding past the stall, the next spacer will again create a transient stall, enabling readout of the next encoder sequence, and so forth.

The methods disclosed herein can be used for analysis, including detection, quantitation and/or sequencing, of a plurality of polypeptides simultaneously (multiplexing). Multiplexing as used herein refers to analysis of a plurality of polypeptides in the same assay. The plurality of polypeptides can be derived from the same sample or different samples. The plurality of polypeptides can be derived from the same subject or different subjects. The plurality of polypeptides that are analyzed can be different polypeptides, or the same polypeptide derived from different samples. A plurality of polypeptides includes 2 or more polypeptides, 5 or more polypeptides, 10 or more polypeptides, 50 or more polypeptides, 100 or more polypeptides, 500 or more polypeptides, 1000 or more polypeptides, 5,000 or more polypeptides, 10,000 or more polypeptides, 50,000 or more polypeptides, 100,000 or more polypeptides, 500,000 or more polypeptides, or 1,000,000 or more polypeptides.

Sample multiplexing can be achieved by upfront barcoding of the nucleic acid (e.g., recording tag) associated with the polypeptide samples. Each barcode represents a different sample, and samples can be pooled prior to cyclic binding assays or sequence analysis. In this way, many barcode-labeled samples can be simultaneously processed in a single tube. This approach is a significant improvement on immunoassays conducted on reverse phase protein arrays (RPPA) (Akbani et al., Mol Cell Proteomics (2014) 13(7): 1625-1643; Creighton et al., Drug Des Devel Ther (2015) 9: 3519-3527; Nishizuka et al., Drug Metab Pharmacokinet (2016) 31(1): 35-45). In this way, the present disclosure essentially provides a highly digital sample and analyte multiplexed alternative to the RPPA assay with a simple workflow.

3. Correlation of Sequences

The present methods can be used for any suitable purpose including to assess spatial information of one or more polypeptides in a spatial sample. In still other embodiments, the present methods can be used to assess spatial information or origin of a plurality of polypeptides in a spatial sample. In some embodiments, the spatial information of one or more polypeptides within a region or between various regions in a spatial sample is analyzed. In some embodiments, the identity or at least partial sequence of a plurality of polypeptides from the same region is determined.

In some embodiments, the provided methods can be used in conjunction with existing methods to analyze the spatial distribution of both protein and RNA molecules in a spatial sample.

In some embodiments, the method further comprises correlating the sequence of the recording tag and the associated localization tag with the information of the spatial location of the protein in the sample via the localization sequence generated as described in Section IA. In some embodiments, the localization sequence generated in situ and the sequence of the localization tag associated with a recording tag (e.g., extended recording tag) after performing a polypeptide analysis assay is matched. In some embodiments, the provided methods allow determination of the sequence or a partial sequence of the protein and the spatial location of the protein in the spatial sample. In some embodiments, the provided methods allow determination of the identity of the protein and the spatial location of the protein in the spatial sample. In some embodiments, the provided methods allow determination of at least a portion of the sequence of the protein and the location of the protein in the spatial sample, e.g., the anatomical, morphological, cellular or subcellular origin of the protein in the spatial sample.

In some embodiments, the provided methods can be used with imaging methods and processes. In some cases, different images can be registered to each other (including correcting for distortions or warping of image and/or sample) by making use of features in the image. For example, fiducial registration markers can be introduced for this purpose or other types of marker detectable across images can be used. In some embodiments, additional staining or immunohistochemistry can be performed on the spatial sample. For example, the provided methods can be used with other methods to identify features of a spatial sample, e.g. optical images of the spatial sample and/or images of histological staining. By combining other types of information, a richer spatial context for interpreting the protein information may be useful.

II. KITS AND ARTICLES OF MANUFACTURE

Provided herein are kits and articles of manufacture comprising components for preparing and analyzing polypeptides, e.g., proteins, including spatial information regarding the protein and the sequence or identity of the protein. The kits and articles of manufacture may include any one or more of the reagents and components used in the methods described in Section I. In some embodiments, the kits optionally include instructions for use. In some embodiments, the kits comprise one or more of the following components: localization tags, reagents for sequencing, recoding tags, reagents for attaching the recording tag, reagents for attaching the localization tag to proteins, reagents for generating or transferring the localization tag, binding agent(s), reagent(s) for transferring identifying information from the coding tag to the recording tag, sequencing reagents, and/or solid supports, as described in the methods for analyzing the proteins (e.g., polypeptides, peptides).

In some embodiments, the kits also include other components for treating the polypeptides and analysis of the polypeptides, including other reagents for polypeptide analysis. In one aspect, provided herein are components used to prepare a reaction mixture. In preferred embodiments, the reaction mixture is a solution. In preferred embodiments, the reaction mixture includes one or more of the following: localization tag, recording tag, solid supports, binding agents with associated coding tags, one or more reagents for attaching a tag to a polypeptide, enzymes, and buffers, sample processing reagents (fixation and permeabilization reagents and buffers.

In another aspect, disclosed herein is a kit for analyzing a polypeptide, comprising: a library of binding agents, wherein each binding agent comprises a binding moiety and a coding tag comprising identifying information regarding the binding moiety, wherein the binding moiety is capable of binding to one or more N-terminal, internal, or C-terminal amino acids of the fragment, or capable of binding to the one or more N-terminal, internal, or C-terminal amino acids modified by a functionalizing reagent.

In some embodiments, the kits and articles of manufacture further comprise a plurality of barcodes. The barcode may include a compartment barcode, a partition barcode, a sample barcode, a fraction barcode, or any combination thereof. In some cases, the barcode comprises a unique molecule identifier (UMI). In some examples, the barcode comprises a DNA molecule, DNA with pseudo-complementary bases, an RNA molecule, a BNA molecule, an XNA molecule, a LNA molecule, a PNA molecule, a γPNA molecule, a non-nucleic acid sequenceable polymer, e.g., a polysaccharide, a polypeptide, a peptide, or a polyamide, or a combination thereof. In some embodiments, the barcodes are configured to attach the proteins in the sample or to attach to nucleic components associated with the proteins.

In some embodiments, the kit further comprises reagents for treating the proteins. Any combination of fractionation, enrichment, and subtraction methods, of the proteins may be performed. For example, the reagent may be used to fragment or digest the proteins. In some cases, the kit comprises reagents and components to fractionate, isolate, subtract, enrich proteins. In some examples, the kits further comprises a protease such as trypsin, LysN, or LysC.

In some embodiments, the kit also comprises one or more buffers or reaction fluids necessary for any of the desired reaction to occur. Buffers including wash buffers, reaction buffers, and binding buffers, elution buffers and the like are known to those or ordinary skill in the arts. In some embodiments, the kits further include buffers and other components to accompany other reagents described herein. The reagents, buffers, and other components may be provided in vials (such as sealed vials), vessels, ampules, bottles, jars, flexible packaging (e.g., sealed Mylar or plastic bags), and the like. Any of the components of the kits may be sterilized and/or sealed.

In some embodiments, the kit includes one or more reagents for nucleic acid sequence analysis. In some examples, the reagent for sequence analysis is for use in sequencing by synthesis, sequencing by ligation, single molecule sequencing, single molecule fluorescent sequencing, sequencing by hybridization, polony sequencing, ion semiconductor sequencing, pyrosequencing, single molecule real-time sequencing, nanopore-based sequencing, sequencing involving probe hybridization and detection (e.g., NanoString Technologies, Inc., Geiss et al., Nat Biotechnol. (2008) 26(3):317-25), or direct imaging of DNA using advanced microscopy, or any combination thereof.

In some embodiments, the kits or articles of manufacture may further comprise instruction(s) on the methods and uses described herein. In some embodiments, the instructions are directed to methods of analyzing the polypeptides or peptides. The kits described herein may also include other materials desirable from a commercial and user standpoint, including other buffers, diluents, filters, syringes, and package inserts with instructions for performing any methods described herein.

Any of the above-mentioned kit components, and any molecule, molecular complex or conjugate, reagent (e.g., chemical or biological reagents), agent, structure (e.g., support, surface, particle, or bead), reaction intermediate, reaction product, binding complex, or any other article of manufacture disclosed and/or used in the exemplary kits and methods, may be provided separately or in any suitable combination in order to form a kit.

III. EXEMPLARY EMBODIMENTS

Among the provided embodiments are:

1. A method of analyzing a polypeptide, e.g., a protein, comprising:
   (a) providing a protein in a spatial sample with a localization tag comprising a unique molecular identifier (UMI);
   (b) analyzing the localization tag to generate a localization sequence comprising information of the spatial location of the protein in the sample;
   (c) performing a protein analysis assay, wherein the protein is associated with a recording tag and the localization tag;
   (d) determining the sequence of the associated recording tag and the localization tag, both of which associated with or released from the same protein; and
   (e) correlating the recording tag and the associated localization tag determined in step d) with the information of the spatial location of the protein in the sample via the localization sequence generated in step (b);
   thereby determining at least a partial sequence of the protein and the spatial location of the protein in the spatial sample.

2. The method of embodiment 1, wherein the protein analysis assay comprises:
   contacting the protein with a binding agent capable of binding to the protein, wherein the binding agent comprises a coding tag with identifying information regarding the binding agent; and
   transferring the information of the coding tag to the recording tag to generate an extended recording tag.

3. The method of embodiment 2, further comprising repeating one or more times:
   contacting the protein with an additional binding agent capable of binding to the protein, wherein the additional binding agent comprises a coding tag with identifying information regarding the additional binding agent; and transferring the identifying information of the coding tag regarding the additional binding agent to the recording tag.

4. The method of embodiment 2 or embodiment 3, wherein transferring the identifying information of the coding tag to the recording tag is mediated by a DNA ligase.

5. The method of embodiment 2 or embodiment 3, wherein transferring the identifying information of the coding tag to the recording tag is mediated by a DNA polymerase.

6. The method of embodiment 2 or embodiment 3, wherein transferring the identifying information of the coding tag to the recording tag is mediated by chemical ligation.

7. The method of any one of embodiments 2-6, wherein the coding tag further comprises a spacer, a binding cycle specific sequence, a unique molecular identifier, a universal priming site, or any combination thereof.

8. The method of any one of embodiments 1-7, wherein the spatial sample comprises a tissue sample.

9. The method of any one of embodiments 1-8, wherein the spatial sample comprises one or more cells.

10. The method of any one of embodiments 1-9, wherein the localization sequence is ligated e.g., circularized.

11. The method of any one of embodiments 1-9, wherein the localization sequence comprises a circular nucleic acid.

12. The method of any one of embodiments 1-11, wherein step (b) comprises nucleic acid amplification.

13. The method of any one of embodiments 1-12, wherein analyzing the localization tag is performed in situ.

14. The method of any one of embodiments 1-13, wherein the localization tag comprises a DNA-barcoded antibody.

15. The method of any one of embodiments 1-14, wherein the localization sequence is generated using a microscope-based method.

16. The method of embodiment 15, wherein the microscope-based method is multiplexed.

17. The method of any one of embodiments 1-16, wherein the localization sequence is generated by sequencing.

18. The method of embodiment 17, wherein the sequencing comprises sequencing by ligation, single molecule sequencing, single molecule fluorescent sequencing, or nanostring sequencing.

19. The method of any one of embodiments 1-18, further comprising collecting the protein with the localization tag prior to performing the protein analysis assay.

20. The method of any one of embodiments 1-19, wherein the protein is coupled directly or indirectly to a solid support.

21. The method of any one of embodiments 1-20, wherein the protein is coupled directly or indirectly to the recording tag.

22. The method of any one of embodiments 1-21, further comprising fixing, cross-linking, and or permeabilizing the spatial sample.

23. The method of any one of embodiments 1-22, wherein the protein is a peptide.

24. The method of any one of embodiments 1-23, wherein the protein is fragmented after step (b).

25. The method of any one of embodiments 1-24, wherein the protein is fragmented prior to step (c).

26. The method of embodiment 25, wherein the fragmenting is performed by contacting the protein(s) with a protease.

27. The method of embodiment 26, wherein the protease is trypsin, LysN, or LysC.

28. The method of any one of embodiments 1-27, wherein the protein with the associated recording tag is coupled to a solid support prior to performing the protein analysis assay.

29. The method of embodiment 28, wherein the solid support comprises a bead, a porous bead, a porous matrix, an array, a glass surface, a silicon surface, a plastic surface, a filter, a membrane, nylon, a silicon wafer chip, a flow through chip, a biochip including signal transducing electronics, a microtitre well, an ELISA plate, a spinning interferometry disc, a nitrocellulose membrane, a nitrocellulose-based polymer surface, a nanoparticle, or a microsphere.

30. The method of embodiment 28, wherein the solid support comprises a polystyrene bead, a polyacrylate bead, a cellulose bead, a dextran bead, a polymer bead, an agarose bead, an acrylamide bead, a solid core bead, a porous bead, a paramagnetic bead, glass bead, or a controlled pore bead, or any combinations thereof.

31. The method of any one of embodiments 1-30, wherein the localization tag comprises a DNA molecule, DNA with pseudo-complementary bases, an RNA molecule, a BNA molecule, an XNA molecule, a LNA molecule, a PNA molecule, a γPNA molecule, a non-nucleic acid sequenceable polymer, e.g., a polysaccharide, a polypeptide, a peptide, or a polyamide, or a combination thereof.

32. The method of any one of embodiments 1-31, wherein the localization tag comprises a universal priming site.

33. The method of any one of embodiments 1-32, wherein the recording tag comprises a DNA molecule, DNA with pseudo-complementary bases, an RNA molecule, a BNA molecule, an XNA molecule, a LNA molecule, a PNA molecule, a γPNA molecule, a non-nucleic acid sequenceable polymer, e.g., a polysaccharide, a polypeptide, a peptide, or a polyamide, or a combination thereof.

34. The method of any one of embodiments 1-33, wherein the recording tag comprises a unique molecular identifier (UMI).

35. The method of any one of embodiments 1-34, wherein the recording tag comprises a compartment tag.

36. The method of any one of embodiments 1-35, wherein the recording tag comprises a universal priming site.

37. The method of any one of embodiments 1-36, wherein the recording tag comprises a spacer polymer.

38. The method of any one of embodiments 1-37, wherein:

The method of any one of embodiments 1-33, wherein:
step (a) is performed prior to step (b);
step (a) is performed prior to step (c);
step (a) is performed prior to step (d);
step (a) is performed prior to step (e);
step (b) is performed prior to step (c);
step (b) is performed prior to step (d);
step (b) is performed prior to step (e);
step (c) is simultaneously with, prior to, or after steps (a) and/or step (b);
step (d) is performed after step (c);
step (d) is simultaneously with, prior to, or after steps (a) and/or step (b);
step (e) is performed after steps (a), (b), (c), and/or (d).

39. A method of analyzing a polypeptide comprising:
(a) providing a polypeptide in a spatial sample with a recording tag comprising a localization tag;
(b) analyzing the localization tag to generate a localization sequence comprising information of the spatial location of polypeptide in the sample;
(c) performing a polypeptide analysis assay to generate an extended recording tag, wherein the polypeptide is associated with the recording tag;

(d) determining the sequence of the extended recording tag and the localization tag associated with the polypeptide; and (e) correlating the sequence of the localization tag determined in step (d) with the localization sequence generated in step (b);

thereby associating information from the sequence determined in step (d) with the spatial location of the polypeptide in the sample.

40. The method of embodiment 39, wherein the localization tag comprises a barcode.

41. The method of embodiment 39, wherein the localization tag comprises a unique molecular identifier (UMI).

42. The method of any one of embodiments 39-41, wherein a plurality of polypeptides in a region of the spatial sample is provided with a recording tag comprising the same localization tag.

43. The method of embodiment 42, wherein the region of the spatial sample comprises one or more cells.

44. The method of embodiment 42 or embodiment 43, wherein the region of the spatial sample comprises one or more subcellular components.

45. The method of any one of embodiments 39-44, wherein the recording tag and the localization tag are both a part of the same nucleic acid molecule.

46. The method of any one of embodiments 39-45, wherein the localization tag is transferred from a substrate to the recording tag in step (a).

47. The method of any one of embodiments 39-46, wherein the localization tag is generated on the recording tag in situ.

48. The method of any one of embodiments 39-47, further comprising releasing the polypeptide associated with the recording tag from the spatial sample prior to performing the polypeptide analysis assay.

49. The method of any one of embodiments 39-48, wherein the polypeptide analysis assay comprises:

contacting the polypeptide with a binding agent capable of binding to the polypeptide, wherein the binding agent comprises a coding tag with identifying information regarding the binding agent; and transferring the information of the coding tag to the recording tag to generate the extended recording tag.

50. The method of embodiment 49, further comprising in step (c) repeating one or more times:

contacting the polypeptide with an additional binding agent capable of binding to the polypeptide, wherein the additional binding agent comprises a coding tag with identifying information regarding the additional binding agent; and transferring the identifying information of the coding tag regarding the additional binding agent to the extended recording tag.

51. The method of embodiment 49 or embodiment 50, wherein the extended recording tag is amplified prior to step (d).

52. The method of any one of embodiments 49-51, wherein transferring the identifying information of the coding tag to the recording tag is mediated by a DNA ligase.

53. The method of any one of embodiments 49-51, wherein transferring the identifying information of the coding tag to the recording tag is mediated by a DNA polymerase.

54. The method of any one of embodiments 49-51, wherein transferring the identifying information of the coding tag to the recording tag is mediated by chemical ligation.

55. The method of any one of embodiments 49-52, wherein the coding tag further comprises a spacer, a binding cycle specific sequence, a unique molecular identifier, a universal priming site, or any combination thereof.

56. The method of embodiment 55, wherein the coding tag comprises a spacer at its 3'-terminus.

57. The method of any one of embodiments 49-56, wherein the binding agent and the coding tag are joined by a linker.

58. The method of any one of embodiments 49-57, wherein the binding agent is a polypeptide or protein.

59. The method of embodiment 58, wherein the binding agent is a modified aminopeptidase, a modified amino acyl tRNA synthetase, a modified anticalin, or an antibody or binding fragment thereof.

60. The method of any one of embodiments 49-59, wherein the binding agent binds to a single amino acid residue, a dipeptide, a tripeptide or a post-translational modification of the peptide.

61. The method of embodiment 60, wherein the binding agent binds to an N-terminal amino acid residue, a C-terminal amino acid residue, or an internal amino acid residue.

62. The method of embodiment 60, wherein the binding agent binds to a chemically modified N-terminal amino acid residue or C-terminal amino acid residue.

63. The method of embodiment 61 or embodiment 62, wherein the binding agent binds to the N-terminal amino acid residue and the N-terminal amino acid residue is cleaved after transferring the information of the coding tag to the recording tag.

64. The method of embodiment 61 or embodiment 62, wherein the binding agent binds to the C-terminal amino acid residue and the C-terminal amino acid residue is cleaved after transferring the information of the coding tag to the recording tag.

65. The method of any one of embodiments 39-64, wherein step (d) comprises sequencing by synthesis, sequencing by ligation, sequencing by hybridization, polony sequencing, ion semiconductor sequencing, pyrosequencing, single molecule real-time sequencing, nanopore-based sequencing, or direct imaging of DNA using advanced microscopy.

66. The method of any one of embodiments 39-65, wherein the spatial sample comprises a tissue sample.

67. The method of any one of embodiments 39-66, wherein the spatial sample is provided on a solid support.

68. The method of any one of embodiments 39-66, wherein the spatial sample is embedded in paraffin.

69. The method of any one of embodiments 39-68, wherein the spatial sample comprises one or more cells.

70. The method of any one of embodiments 39-69, wherein the localization sequence is ligated e.g., circularized.

71. The method of any one of embodiments 39-70, wherein generating the localization sequence comprises rolling circle amplification (RCA).

72. The method of any one of embodiments 39-71, wherein step (b) comprises nucleic acid amplification.

73. The method of any one of embodiments 39-72, wherein analyzing the localization tag is performed in situ.

74. The method of any one of embodiments 39-73, wherein the localization sequence is generated using a microscope-based method.

75. The method of embodiment 74, wherein the microscope-based method is multiplexed.

76. The method of any one of embodiments 39-75, wherein the localization sequence is generated by sequencing.

77. The method of embodiment 76, wherein the sequencing comprises sequencing by ligation, single molecule sequencing, single molecule fluorescent sequencing, or sequencing by probe detection.

78. The method of any one of embodiments 39-77, further comprising collecting the polypeptide with the recording tag comprising the localization tag prior to performing the polypeptide analysis assay.

79. The method of any one of embodiments 39-78, wherein the polypeptide is coupled directly or indirectly to a solid support prior to step (c).

80. The method of any one of embodiments 39-78, wherein step (c) is performed in situ.

81. The method of any one of embodiments 39-80, wherein the polypeptide is coupled directly or indirectly to the recording tag.

82. The method of any one of embodiments 39-81, further comprising fixing, cross-linking, and/or permeabilizing the spatial sample.

83. The method of embodiment 82, wherein the fixing, cross-linking, and/or permeabilizing the spatial sample is performed prior to step (a) or performed in step (a).

84. The method of any one of embodiments 39-83, wherein the polypeptide is fragmented after step (b).

85. The method of any one of embodiments 39-84, wherein the polypeptide is fragmented prior to step (c).

86. The method of embodiment 84 or embodiment 85, wherein the fragmenting is performed by contacting the polypeptide(s) with a protease.

87. The method of embodiment 86, wherein the protease is trypsin, LysN, or LysC.

88. The method of any one of embodiments 39-87, wherein the polypeptide with the associated recording tag is coupled to a solid support prior to performing the polypeptide analysis assay.

89. The method of embodiment 88, wherein the solid support comprises a bead, a porous bead, a porous matrix, an array, a glass surface, a silicon surface, a plastic surface, a filter, a membrane, nylon, a silicon wafer chip, a flow through chip, a biochip including signal transducing electronics, a microtitre well, an ELISA plate, a spinning interferometry disc, a nitrocellulose membrane, a nitrocellulose-based polymer surface, a nanoparticle, or a microsphere.

90. The method of embodiment 88, wherein the solid support comprises a polystyrene bead, a polyacrylate bead, a cellulose bead, a dextran bead, a polymer bead, an agarose bead, an acrylamide bead, a solid core bead, a porous bead, a paramagnetic bead, glass bead, or a controlled pore bead, or any combinations thereof.

91. The method of any one of embodiments 39-90, wherein the localization tag comprises a DNA molecule, DNA with pseudo-complementary bases, an RNA molecule, a BNA molecule, an XNA molecule, a LNA molecule, a PNA molecule, a γPNA molecule, a non-nucleic acid sequenceable polymer, e.g., a polysaccharide, a polypeptide, a peptide, or a polyamide, or a combination thereof.

92. The method of any one of embodiments 39-91, wherein the localization tag comprises a universal priming site.

93. The method of any one of embodiments 39-92, wherein the recording tag comprises a DNA molecule, DNA with pseudo-complementary bases, an RNA molecule, a BNA molecule, an XNA molecule, a LNA molecule, a PNA molecule, a γPNA molecule, a non-nucleic acid sequenceable polymer, e.g., a polysaccharide, a polypeptide, a peptide, or a polyamide, or a combination thereof.

94. The method of any one of embodiments 39-93, wherein the recording tag comprises a unique molecular identifier (UMI).

95. The method of any one of embodiments 39-94, wherein the recording tag comprises a compartment tag.

96. The method of any one of embodiments 39-95, wherein the recording tag comprises a universal priming site.

97. The method of any one of embodiments 39-96, wherein the recording tag comprises a spacer polymer.

98. The method of embodiment 97, wherein the spacer is at the 3'-terminus of the recording tag.

99. The method of any one of embodiments 39-98, wherein:
 step (a) is performed prior to step (b);
 step (a) is performed prior to step (c);
 step (a) is performed prior to step (d);
 step (a) is performed prior to step (e);
 step (b) is performed prior to step (c);
 step (b) is performed prior to step (d);
 step (b) is performed prior to step (e);
 step (c) is simultaneously with or prior to step (b);
 step (d) is performed after step (c);
 step (d) is simultaneously with or prior to step (b);
 step (e) is performed after steps (a), (b), (c), and/or (d).

100. The method of any one of embodiments 1-99, wherein a plurality of polypeptides from the spatial sample is analyzed.

101. The of any one of embodiments 1-100, wherein a plurality of extended recording tags representing the plurality of polypeptides are analyzed in parallel.

102. The method of embodiment 101, wherein the plurality of extended recording tags representing a plurality of polypeptides is analyzed in a multiplexed assay.

103. The method of embodiment 101 or embodiment 102, wherein the plurality of extended recording tags undergoes a target enrichment assay prior to analysis.

104. The method of any one of embodiments 101-103, wherein the plurality of extended recording tags undergoes a subtraction assay prior to analysis.

105. The method of any one of embodiments 101-104, wherein the plurality of extended recording tags undergoes a normalization assay to reduce highly abundant species prior to analysis.

106. The method of any one of embodiments 39-105, wherein the method is used to determine at least a partial sequence of the polypeptide and the spatial location of the polypeptide in the spatial sample.

IV. EXAMPLES

The following examples are offered to illustrate but not to limit the methods, compositions, and uses provided herein.

Example 1: Sample Preparation, Spatial Barcoding with Barcoded Beads, and Collecting Polypeptides for Analysis This example describes an exemplary workflow for providing polypeptides in a tissue section with recording tags containing localization tags (DNA barcode) and other preparation steps for spatial analysis, as generally depicted in FIG. 1A-1E.

In general, localization tags are introduced to a mounted tissue section by assembling DNA barcoded beads on the surface of the mounted tissue section post-sectioning and mounting on the slide. The tissue surface is covered with beads attached non-specifically to the tissue surface through adhesive forces such as charge interactions, DNA hybridization, or reversible chemical coupling. Alternatively, other methods may be used to deliver barcoded beads to the tissue surface. For example, the beads can be embedded in a hydrogel coated over the tissue section surface. The beads are porous to accommodate a higher loading of barcodes on a bead (a porous 5 um bead can be loaded with more than $10^{10}$ DNA barcodes (e.g. Daisogel SP-2000-5 porous silica beads, Osaka Soda Co., LTD., Japan). DNA barcodes are attached to the bead via a photocleavable linker which enables removal and subsequent diffusive transfer of the barcodes to the tissue section. After decoding or sequencing the tissue-attached barcoded DNA beads, the DNA barcodes are released by enzymatic, chemical, or photocleavage of a cleavable linker. These barcodes permeate the tissue slice and anneal to the DNA recording tags attached to proteins within the tissue slice. Polymerase extension is performed to transfer the barcodes to the recording tags on the proteins. Particular steps in the procedure is described further below.

1. Tissue Section Permeabilization

For fresh frozen samples, the tissue section is permeabilized using standard methods such including a 0.1%-1% Tx-100 incubation prior to chemical activation of protein molecules (Fischer et al., *CSH Protoc* (2008) pdb prot4991; Fischer et al., *CSH Protoc* (2008) pdb top36; Fischer et al., CSH Protoc. (2008) pdb.prot4988). For FFPE tissue sections, the embedding media is removed (e.g. dewaxed in the case of paraffin), and the sections are permeabilized using standard methods (Ramos-Vera et al., J Vet Diagn Invest. (2008) 20(4):393-413). Standard conditions for tissue permeabilization include incubation in 0.1% to 1% TX-100 or NP-40 for 10-30 min. at 0.1 to 1%. Tween 20, Saponin, or Digitonin can also be used at 0.2%-0.5% for 10-30 min (Fischer et al., CSH Protoc (2008) pdb top36). Acetone fixation is another method that can be used to for tissue permeabilization.

2. Chemical Activation and DNA Tagging

After tissue section permeabilization and protein denaturation, proteins are chemically activated by incubation with an amine bifunctional bioconjugation reagent such as methyltetrazine-sulfo-NHS ester (Click Chemistry Tools, U.S.A.); other bifunctional amine reactive bioconjugation reagents can also be employed (Hermanson, Bioconjugate Techniques, (2013) Academic Press). The density of DNA tagging is controlled by titrating in non-activated amine modifying reagent such as mPEG-NHS ester. After activation and washing, a common DNA tag (comprising a suitable architecture configured as a recording tag) containing an iEDDA coupling label such as trans-cyclooctene (TCO), norbornene, or vinyl boronic acid is incubated with the tissue section to "click on" the DNA tags to the mTet moieties on the activated protein molecules (Knall et al., Tetrahedron Lett (2014) 55(34): 4763-4766).

3. DNA Barcoded Bead Distribution Over Tissue Section

To generate DNA barcoded beads, a split-pool synthesis strategy is used (Klein et al., Lab Chip (2017) 17(15): 2540-2541; Rodrigues et al., Science (2019) 363(6434): 1463-1467). Each bead has a single population of DNA barcodes. The beads are 0.5-10 μm in diameter and contain a DNA barcode flanked by an upstream spacer sequence and a downstream primer extension sequence complementary to the DNA tag sequence of the recording tag (or a portion thereof) attached to the proteins. In some cases, the DNA barcodes are attached to the bead with a photo-cleavable linker, such as PC linker (PC Linker-CE Phosphoramidite, Glenn Research, U.S.A.). In some cases, tissue section slides are assembled in a capillary gap flow-cell (~50 μm gap) such as the Te-Flow system from Tecan (Gunderson, Methods Mol Biol (2009) 529: 197-213), which provides a format for easily exchanging solutions on the slide surface. For example, DNA barcoded beads are distributed across the surface of the tissue section, using the capillary gap flow cell system. The DNA barcode beads contain complementary sequences to the DNA recording tags on the proteins (or a portion thereof). This creates a "stickiness" of the barcoded beads to the surface of the tissue section with exposed DNA tags.

4. Spatial Decoding of Barcoded Beads Assembled on Tissue Section

The assembled barcoded beads are spatially decoded in situ using fluorescent imaging and combinatorial hybridization-based approaches or in situ NGS sequencing (Gunderson et al., Genome Res (2004) 14(5): 870-877; Lee et al., Nat Protoc. (2015) 10(3): 442-458 Rodrigues et al., Science (2019) 363(6434): 1463-1467).

5. Transferring DNA Barcodes from Beads to DNA Tagged Proteins

After assembling barcode beads on the surface of the tissue section and the barcodes are spatially decoded in situ, the barcodes are photo-cleaved from the bead (via long wavelength UV exposure, e.g. 365 nm UV). A majority of linkages are cleaved since photo-cleavage is generally only 70-90% efficient and can be adjusted by UV intensity and exposure time (3-100 mW/cm2 @ 340-365 nm for 1-60 min) (Bai et al., Proc Natl Acad Sci USA 100(2): 409-413). The cleaved barcodes diffuse into the tissue section and hybridize with their complement on DNA recording tags attached to proteins. After incubation for about 30 min., the tissue section is exposed to a polymerase extension mix to transfer barcode information from the hybridized barcode to the DNA recording tag associated with the protein.

6. Harvesting of Barcoded Proteins from Tissue Section

After providing the proteins with localization tags including a barcode onto the recording tags attached using the spatially barcoding procedure as described above, the tissue sections are scraped into a tube and standard trypsin digestion used to extract barcode labeled peptides. The peptide-recording tag DNA chimera (containing the barcode) can be directly ligated to sequencing beads using a hybridization-based capture method and used in a polypeptide analysis assay (e.g., ProteoCode assay). The barcode attached as described forms a portion of the recording tag attached to peptides for use in a ProteoCode assay as described in International Patent Publication No. WO 2017/192633.

The present disclosure is not intended to be limited in scope to the particular disclosed embodiments, which are provided, for example, to illustrate various aspects of the invention. Various modifications to the compositions and methods described will become apparent from the description and teachings herein. Such variations may be practiced without departing from the true scope and spirit of the disclosure and are intended to fall within the scope of the present disclosure. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

| SEQUENCE TABLE SEQUENCE TABLE | | |
|---|---|---|
| SEQ ID NO | Sequence (5'-3') | Description |
| 1 | AATGATACGGCGACCACCGA | P5 primer |
| 2 | CAAGCAGAAGACGGCATACGAGAT | P7 primer |

What is claimed is:

1. A method of analyzing a polypeptide, comprising:
   (a) providing a spatial sample comprising a polypeptide at a spatial location in the spatial sample, wherein the polypeptide is associated with a nucleic acid recording tag comprising a nucleic acid localization tag, and wherein the nucleic acid recording tag and the nucleic acid localization tag are both a part of the same nucleic acid molecule;
   (b) analyzing the nucleic acid localization tag in situ at the spatial location in the spatial sample using fluorescent imaging, a combinatorial hybridization-based approach and/or in situ sequencing to generate a localization sequence comprising information of the spatial location of the polypeptide in the spatial sample;
   (c) performing a polypeptide analysis assay on the polypeptide associated with the nucleic acid recording tag to generate an extended nucleic acid recording tag from the nucleic acid recording tag, wherein the polypeptide analysis assay comprises:
      (i) contacting the polypeptide with a binding agent, wherein the binding agent binds to the polypeptide, and wherein the binding agent comprises a nucleic acid coding tag with identifying information regarding the binding agent; and
      (ii) transferring the identifying information regarding the binding agent from the nucleic acid coding tag to the nucleic acid recording tag by primer extension and/or ligation to generate the extended nucleic acid recording tag;
   (d) determining a sequence of the extended nucleic acid recording tag associated with the polypeptide including the sequence of the nucleic acid localization tag, thereby obtaining epitope information, amino acid sequence information, post-translational modification information, or any combination thereof, regarding the polypeptide; and
   (e) matching the sequence of the nucleic acid localization tag determined in step (d) with the localization sequence generated in step (b); thereby associating the information regarding the polypeptide obtained in step (d) with the spatial location of the polypeptide in the spatial sample.

2. The method of claim 1, wherein the nucleic acid localization tag comprises a barcode or a unique molecular identifier (UMI).

3. The method of claim 1, wherein a plurality of polypeptides is provided in a region of the spatial sample, wherein each polypeptide of the plurality is associated with a nucleic acid recording tag comprising the same nucleic acid localization tag.

4. The method of claim 1, wherein the nucleic acid localization tag is transferred from a substrate to the nucleic acid recording tag in or before step (a).

5. The method of claim 1, further comprising releasing the polypeptide associated with the nucleic acid recording tag from the spatial sample prior to performing the polypeptide analysis assay.

6. The method of claim 1, further comprising in step (c) repeating one or more times:
   (i) contacting the polypeptide with an additional binding agent capable of binding to the polypeptide, wherein the additional binding agent comprises a nucleic acid coding tag with identifying information regarding the additional binding agent; and
   (ii) transferring the identifying information regarding the additional binding agent from the nucleic acid coding tag to the extended nucleic acid recording tag.

7. The method of claim 1, wherein the binding agent comprises a polypeptide.

8. The method of claim 1, wherein the binding agent binds to an N-terminal amino acid residue or a chemically modified N-terminal amino acid residue of the polypeptide, and wherein the N-terminal amino acid residue or the chemically modified N-terminal amino acid residue of the polypeptide is cleaved after transferring the identifying information from the nucleic acid coding tag to the nucleic acid recording tag.

9. The method of claim 1, wherein the spatial sample comprises a tissue sample.

10. The method of claim 1, wherein the localization sequence is circularized.

11. The method of claim 1, wherein generating the localization sequence comprises rolling circle amplification (RCA) of the nucleic acid localization tag.

12. The method of claim 1, wherein the localization sequence is generated using a microscope-based method.

13. The method of claim 1, wherein the localization sequence is generated by nucleic acid sequencing.

14. The method of claim 1, further comprising collecting the polypeptide with the nucleic acid recording tag comprising the nucleic acid localization tag prior to performing the polypeptide analysis assay on the polypeptide.

15. The method of claim 9, further comprising fixing, cross-linking, and/or permeabilizing the spatial sample, wherein the fixing, cross-linking, and/or permeabilizing the spatial sample is performed prior to step (a) or performed in step (a).

16. The method of claim 14, wherein the polypeptide is fragmented after step (b) and prior to step (c) to form polypeptide fragments.

17. The method of claim 16, further comprising coupling the polypeptide fragments associated with the nucleic acid recording tag to a solid support prior to performing the polypeptide analysis assay.

18. The method of claim 1, wherein a plurality of polypeptides from the spatial sample is analyzed, and a plurality of extended nucleic acid recording tags representing the plurality of polypeptides are sequenced in parallel in step (d).

* * * * *

SEQUENCE LISTING

<160> NUMBER OF SEQ ID NOS: 2

<210> SEQ ID NO 1
<211> LENGTH: 20
<212> TYPE: DNA
<213> ORGANISM: Artificial Sequence
<220> FEATURE:
<223> OTHER INFORMATION: P5 primer

<400> SEQUENCE: 1
aatgatacgg cgaccaccga                                              20

<210> SEQ ID NO 2
<211> LENGTH: 24
<212> TYPE: DNA
<213> ORGANISM: Artificial Sequence
<220> FEATURE:
<223> OTHER INFORMATION: P7 primer

<400> SEQUENCE: 2
caagcagaag acggcatacg agat                                         24